United States Patent
Liu et al.

(10) Patent No.: US 12,176,811 B2
(45) Date of Patent: Dec. 24, 2024

(54) SWITCHED CAPACITOR VOLTAGE CONVERTER CIRCUIT AND SWITCHED CAPACITOR CONVERTER CONTROL METHOD

(71) Applicant: Richtek Technology Corporation, Zhubei (TW)

(72) Inventors: Kuo-Chi Liu, Hsinchu (TW); Ta-Yung Yang, Taoyuan (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 130 days.

(21) Appl. No.: 18/300,266

(22) Filed: Apr. 13, 2023

(65) Prior Publication Data

US 2023/0361674 A1 Nov. 9, 2023

Related U.S. Application Data

(60) Provisional application No. 63/338,127, filed on May 4, 2022.

(30) Foreign Application Priority Data

Sep. 16, 2022 (TW) .................................. 111135074

(51) Int. Cl.
| | | |
|---|---|---|
| H02M 3/157 | (2006.01) | |
| H02M 1/00 | (2006.01) | |
| H02M 3/00 | (2006.01) | |
| H02M 3/07 | (2006.01) | |
| H02M 3/158 | (2006.01) | |

(52) U.S. Cl.
CPC .......... *H02M 3/157* (2013.01); *H02M 1/0009* (2021.05); *H02M 1/0058* (2021.05); *H02M 3/01* (2021.05); *H02M 3/07* (2013.01); *H02M 3/158* (2013.01); *H02M 3/1584* (2013.01)

(58) Field of Classification Search
CPC ...... H02M 3/07; H02M 1/0009; H02M 3/015; H02M 1/0095; H02M 1/10; H02M 1/0058; H02M 3/01; H02M 3/1584; Y02B 70/10
See application file for complete search history.

(56) References Cited

U.S. PATENT DOCUMENTS

| | | | | |
|---|---|---|---|---|
| 8,351,228 | B2 * | 1/2013 | Izumi ...................... | H02M 3/07 363/60 |
| 9,667,139 | B2 * | 5/2017 | Giuliano ............... | H02M 3/158 |
| 9,917,517 | B1 * | 3/2018 | Jiang ....................... | H02M 1/34 |
| 10,063,146 | B1 * | 8/2018 | Lee ....................... | G01R 19/003 |
| 10,651,731 | B1 * | 5/2020 | Rainer ................ | H02M 3/1588 |
| 11,165,335 | B2 * | 11/2021 | Sblano ................ | H02M 3/1584 |

(Continued)

*Primary Examiner* — Yusef A Ahmed
(74) *Attorney, Agent, or Firm* — Tung & Associates

(57) ABSTRACT

A switched capacitor voltage converter circuit includes: a switched capacitor converter and a control circuit. The switched capacitor converter includes at least one resonant capacitor, switches and at least one inductor. The control circuit generates a pulse width modulation (PWM) signal according to a first voltage or a second voltage and generates a control signal according to the PWM signal and a zero current detection signal. The control signal controls the switched capacitor converter by operating the corresponding switches to switch electrical connection of the inductor, so as to convert the first voltage to the second voltage or convert the second voltage to the first voltage.

25 Claims, 38 Drawing Sheets

(56) References Cited

U.S. PATENT DOCUMENTS

| | | | |
|---|---|---|---|
| 2005/0146311 A1* | 7/2005 | Kuo | H02M 1/38 323/282 |
| 2007/0018617 A1* | 1/2007 | Endo | H02M 3/158 323/222 |
| 2011/0031951 A1* | 2/2011 | Chen | H02M 3/1582 323/288 |
| 2012/0032748 A1* | 2/2012 | Li | H03K 5/1252 327/170 |
| 2012/0119720 A1* | 5/2012 | Li | H02M 3/158 323/284 |
| 2015/0357912 A1* | 12/2015 | Perreault | H02M 3/33569 363/126 |
| 2016/0105110 A1* | 4/2016 | Houston | H02J 7/00 323/271 |
| 2018/0375429 A1* | 12/2018 | Trichy | H02M 3/158 |
| 2019/0028025 A1* | 1/2019 | Babazadeh | H01L 27/088 |
| 2019/0068061 A1* | 2/2019 | Jiang | H02M 7/4837 |
| 2020/0177081 A1* | 6/2020 | Huang | H02M 3/07 |
| 2020/0204071 A1* | 6/2020 | Huang | H02M 3/07 |
| 2021/0328507 A1* | 10/2021 | Liu | H02M 1/0095 |
| 2021/0351695 A1* | 11/2021 | Liu | H02M 3/155 |
| 2021/0367511 A1* | 11/2021 | Liu | H02M 3/01 |
| 2021/0367520 A1* | 11/2021 | Liu | H02M 3/158 |
| 2021/0376717 A1* | 12/2021 | Liu | H02M 3/01 |
| 2021/0384820 A1* | 12/2021 | Liu | H02M 1/007 |
| 2021/0399621 A1* | 12/2021 | Liu | H02M 3/01 |
| 2022/0029531 A1* | 1/2022 | Liu | H02M 3/01 |
| 2022/0140726 A1* | 5/2022 | Liu | H02M 1/0095 323/271 |
| 2022/0352816 A1* | 11/2022 | Liu | H02M 3/07 |
| 2022/0368218 A1* | 11/2022 | Liu | H02M 3/01 |
| 2023/0028873 A1* | 1/2023 | Liu | H02M 3/07 |
| 2023/0170795 A1* | 6/2023 | Yoo | H02M 1/08 323/271 |
| 2023/0179093 A1* | 6/2023 | Liu | H02M 1/0058 323/271 |
| 2023/0223843 A1* | 7/2023 | Liu | H02M 1/083 363/21.02 |
| 2023/0231479 A1* | 7/2023 | Lee | H02M 1/083 323/235 |
| 2023/0246548 A1* | 8/2023 | Liu | H02M 3/07 323/271 |
| 2023/0361674 A1* | 11/2023 | Liu | H02M 3/158 |
| 2023/0396162 A1* | 12/2023 | Liu | H02M 1/0095 |
| 2023/0412073 A1* | 12/2023 | Ge | H02M 3/077 |
| 2024/0072633 A1* | 2/2024 | Liu | H02M 3/07 |
| 2024/0223086 A1* | 7/2024 | Liu | H02M 1/0058 |
| 2024/0235370 A1* | 7/2024 | Liu | H02M 1/0095 |
| 2024/0297580 A1* | 9/2024 | Liu | H02M 3/07 |

* cited by examiner

SWITCHED CAPACITOR VOLTAGE CONVERTER CIRCUIT AND SWITCHED CAPACITOR CONVERTER CONTROL METHOD

CROSS REFERENCE

The present invention claims priority to U.S. 63/338,127 filed on May 4, 2022 and claims priority to TW 111135074 filed on Sep. 16, 2022.

BACKGROUND OF THE INVENTION

Field of Invention

The present invention relates to a switched capacitor voltage converter circuit and a switched capacitor converter control method; particularly, it relates to such switched capacitor voltage converter circuit and such switched capacitor converter control method which are controlled by a pulse width modulation (PWM) signal and a zero current detection signal.

Description of Related Art

A literature titled "Three-Level Buck Converter for Envelope Tracking in RF Power Amplifiers" published in Applied Power Electronics Conference and Exposition, 2005, proposes a 3-level buck converter for use in package tracking such as package tracking in a radio frequency power amplifier. In order to achieve high efficiency and high power density, this prior art proposes that a voltage across a flying capacitor should be regulated to ½-fold of the input voltage.

Please refer to FIG. 1A, which shows a schematic diagram of a conventional switched tank converter (STC) disclosed U.S. Pat. No. 9,917,517B1. This conventional STC can achieve high efficiency power conversion; however, the prior art shown in FIG. 1A has the drawbacks that: this conventional STC is a voltage-divider, which is not a voltage regulator. When the input voltage of the conventional STC increases, the output voltage of the conventional STC also increases; this conventional STC cannot regulate its output voltage.

Please refer to FIG. 1B, which shows a schematic diagram of a conventional buck converter circuit 10. An inductor L of the conventional buck converter circuit 10 needs to withstand a voltage stress of the level of the input voltage, so it requires a large size inductor with a high inductance. In general, by operating in a higher switching frequency, the converter can use a smaller size inductor. However, the switching power loss also increases significantly along with the high switching frequency and the high input voltage (with respect to the switches).

In view of the above, to overcome the drawbacks in the prior art, the present invention proposes an innovative switched capacitor voltage converter circuit and an innovative switched capacitor converter control method.

SUMMARY OF THE INVENTION

From one perspective, the present invention provides a switched capacitor voltage converter circuit, which is configured to operably convert a first voltage to a second voltage or convert the second voltage to the first voltage, the switched capacitor voltage converter circuit comprising: a switched capacitor converter coupled between the first voltage and the second voltage; and a control circuit, which is configured to operably generate a pulse width modulation (PWM) signal according to the first voltage or the second voltage, and to operably generate a control signal according to the PWM signal and a zero current detection signal, so as to control the switched capacitor converter, thus converting the first voltage to the second voltage or converting the second voltage to the first voltage; wherein the switched capacitor converter includes: at least one resonant capacitor; a plurality of switches coupled to the at least one resonant capacitor; and at least one inductor; wherein when the switched capacitor voltage converter circuit converts the first voltage to the second voltage, the control signal includes: a unidirectional conduction operation signal, a first operation signal and a second operation signal, which correspond to a unidirectional conduction process, a first process and a second process, respectively, wherein the unidirectional conduction operation signal, the first operation signal and the second operation signal are configured to operate corresponding ones of the plurality of switches in the unidirectional conduction process, in the first process and in the second process, respectively, so as to switch electrical connection relationships of the at least one inductor; wherein when the switched capacitor voltage converter circuit converts the first voltage to the second voltage, the control circuit is configured to operably generate the PWM signal according to the second voltage, and wherein the switched capacitor voltage converter circuit performs a combination of processes including the unidirectional conduction process, the first process and the second process as following: in the unidirectional conduction process, the unidirectional conduction operation signal being configured to control the plurality of switches, so as to form a unidirectional conduction path between a first DC potential and the second voltage, so that an inductor current flowing through the at least one inductor flows toward the second voltage via the unidirectional conduction path; in the first process, the first operation signal being configured to control the plurality of switches, so that the at least one resonant capacitor and a corresponding one of the at least one inductor are connected in series between the second voltage and a second DC potential, so as to form a first current path, so that the inductor current flowing through the at least one inductor and flowing toward the second voltage is a resonant current having a first resonant frequency; in the second process, the second operation signal being configured to control the plurality of switches, so that the at least one resonant capacitor and a corresponding one of the at least one inductor are connected in series between the first voltage and the second voltage, so as to form a second current path, so that the inductor current flowing through the at least one inductor and flowing toward the second voltage is a resonant current having a second resonant frequency; wherein the unidirectional conduction operation signal, the first operation signal and the second operation signal have respective ON periods which do not overlap one another, so that the unidirectional conduction process, the first process and the second process do not overlap one another; wherein the unidirectional conduction process, the first process and the second process are performed sequentially and repetitively, so that the at least one inductor executes an inductive power conversion through the unidirectional conduction process, the first process and the second process, thereby converting the first voltage to the second voltage; wherein the control circuit is further configured to operably generate the zero current detection signal according to a time point at which the inductor current reaches zero.

From another perspective, the present invention provides a switched capacitor converter control method, configured to convert a first voltage to a second voltage or convert the second voltage to the first voltage, the switched capacitor converter control method comprising: generating a pulse width modulation (PWM) signal according to the first voltage or the second voltage; generating a zero current detection signal according to a time point at which an inductor current reaches zero; and generating a control signal according to the PWM signal and the zero current detection signal, so as to control a switched capacitor converter, thus converting the first voltage to the second voltage or converting the second voltage to the first voltage; wherein when the first voltage is converted to the second voltage, the PWM signal is generated according to the second voltage and the control signal includes: a unidirectional conduction operation signal, a first operation signal and a second operation signal, which correspond to a unidirectional conduction process, a first process and a second process, respectively, wherein the unidirectional conduction operation signal, the first operation signal and the second operation signal are configured to operate corresponding ones of the plurality of switches in the unidirectional conduction process, in the first process and in the second process, respectively, so as to switch electrical connection relationships of the at least one inductor; wherein when the first voltage is converted to the second voltage, a combination of processes including the unidirectional conduction process, the first process and the second process are performed as following: in the unidirectional conduction process, the unidirectional conduction operation signal being configured to control the plurality of switches, so as to form a unidirectional conduction path between a first DC potential and the second voltage, so that an inductor current flowing through the at least one inductor flows toward the second voltage via the unidirectional conduction path; in the first process, the first operation signal being configured to control the plurality of switches, so that at least one resonant capacitor and a corresponding one of the at least one inductor are connected in series between the second voltage and a second DC potential, so as to form a first current path, so that the inductor current flowing through the at least one inductor and flowing toward the second voltage is a resonant current having a first resonant frequency; in the second process, the second operation signal being configured to control the plurality of switches, so that the at least one resonant capacitor and a corresponding one of the at least one inductor are connected in series between the first voltage and the second voltage, so as to form a second current path, so that the inductor current flowing through the at least one inductor and flowing toward the second voltage is a resonant current having a second resonant frequency; wherein the unidirectional conduction operation signal, the first operation signal and the second operation signal have respective ON periods which do not overlap with one another, so that the unidirectional conduction process, the first process and the second process do not overlap with one another; wherein the unidirectional conduction process, the first process and the second process are performed sequentially and repetitively, so that the at least one inductor executes an inductive power conversion through the unidirectional conduction process, the first process and the second process, thereby converting the first voltage to the second voltage.

In one embodiment, the control circuit includes: a PWM circuit, wherein the PWM circuit is configured to operably generate the PWM signal according to the second voltage when the first voltage is converted to the second voltage, and the PWM circuit is configured to operably generate the PWM signal according to the first voltage when the second voltage is converted to the first voltage; a zero current detection circuit, which is configured to operably generate the zero current detection signal at the time point at which the inductor current reaches zero; and a control signal generation circuit, which is configured to operably generate the control signal according to the PWM signal and the zero current detection signal, wherein the control signal generation circuit is configured to operably generate a plurality of switch operation signals corresponding to the plurality of switches according to the control signal in the unidirectional conduction process, the first process and the second process.

In one embodiment, the unidirectional conduction process, the first process and the second process constitute a switching period, wherein in the switching period, the unidirectional conduction process, the first process and the second process are performed in any order, wherein an ending time point of an earliest process in the switching period is determined by the PWM signal, and ending time points of the processes other than the earliest process in the switching period are determined by the zero current detection signal.

In one embodiment, in the unidirectional conduction process, the inductor current is one of the following: the inductor current is a resonant current having a third resonant frequency; or the inductor current is a non-resonant current; wherein when the inductor current is the non-resonant current, the inductor current is a linear ramp current which gradually decreases or another linear ramp current which gradually increases.

In one embodiment, in the unidirectional conduction process, in a case where the inductor current is the non-resonant current and the inductor current is the linear ramp current which gradually decreases, the unidirectional conduction path includes a body diode of at least one of the plurality of switches which is in an OFF state and the inductor current flows through the body diode.

In one embodiment, in the unidirectional conduction process, the unidirectional conduction path includes at least one of the plurality of switches which is in an ON state and the inductor current flows through this switch.

In one embodiment, the first DC potential is the first voltage or a ground potential, whereas, the second DC potential is the first voltage or the ground potential.

In one embodiment, the PWM circuit includes: a lock-up circuit, which is configured to operably lock-up the second voltage at a reference voltage, so as to generate a voltage lock-up signal; a ramp circuit, which is configured to operably generate a ramp signal; and a comparison circuit, which is configured to operably compare the voltage lock-up signal with the ramp signal, to generate the PWM signal.

In one embodiment, the ramp circuit includes: a reset circuit, which is configured to operably reset the ramp signal according to the control signal or a clock signal.

In one embodiment, the control signal adjusts the ON period of the first process and/or the second process, to achieve zero voltage switching or zero current switching of soft switching.

In one embodiment, the switching period is a constant period.

In one embodiment, after the unidirectional conduction process, the first process and the second process in the switching period have all ended, the plurality of switches are kept OFF for a zero current period until the constant period ends.

In one embodiment, the switched capacitor voltage converter circuit further comprises: a non-resonant capacitor coupled to the at least one resonant capacitor, wherein a voltage across the non-resonant capacitor is kept as a constant DC voltage in the first process and the second process.

In one embodiment, when the switched capacitor voltage converter circuit converts the second voltage to the first voltage, the control circuit is configured to operably generate the PWM signal according to the first voltage, to generate the control signal, thus converting the second voltage to the first voltage. When the switched capacitor voltage converter circuit converts the second voltage to the first voltage, the control signal includes: a reverse-unidirectional conduction operation signal, a third operation signal and a fourth operation signal, which correspond to a reverse-unidirectional conduction process, a third process and a fourth process, respectively, wherein the reverse-unidirectional conduction operation signal, the third operation signal and the fourth operation signal are configured to operate corresponding ones of the plurality of switches in the reverse-unidirectional conduction process, in the third process and in the fourth process, respectively, so as to switch electrical connection relationships of the at least one inductor; wherein when the switched capacitor voltage converter circuit converts the second voltage to the first voltage, the switched capacitor voltage converter circuit performs a combination of processes including the reverse-unidirectional conduction process, the third process and the fourth process as following: in the reverse-unidirectional conduction process, the reverse-unidirectional conduction operation signal being configured to control the plurality of switches, so as to form a reverse-unidirectional conduction path between a third DC potential and the first voltage, so that an inductor current flowing through the at least one inductor flows toward the first voltage via the reverse-unidirectional conduction path; in the third process, the third operation signal being configured to control the plurality of switches, so that the at least one resonant capacitor and a corresponding one of the at least one inductor are connected in series between the first voltage and a fourth DC potential, so as to form a third current path, so that the inductor current flowing through the at least one inductor and flowing toward the first voltage is a resonant current having a fourth resonant frequency; in the fourth process, the fourth operation signal being configured to control the plurality of switches, so that the at least one resonant capacitor and a corresponding one of the at least one inductor are connected in series between the first voltage and the second voltage, so as to form a fourth current path, so that the inductor current flowing through the at least one inductor and flowing toward the first voltage is a resonant current having a fifth resonant frequency; wherein the reverse-unidirectional conduction operation signal, the third operation signal and the fourth operation signal have respective ON periods which do not overlap one another, so that the reverse-unidirectional conduction process, the third process and the fourth process do not overlap one another; wherein the unidirectional conduction process, the first process and the second process are performed sequentially and repetitively, so that the at least one inductor executes an inductive power conversion through the unidirectional conduction process, the first process and the second process, thereby converting the second voltage to the first voltage.

In one embodiment, the switched capacitor converter includes: a distributed switched capacitor converter, a distributed switched capacitor converter, a series-parallel switched capacitor converter, a Dickson switched capacitor converter, a ladder switched capacitor converter, a doubler switched capacitor converter, a Fibonacci switched capacitor converter, a pipelined switched capacitor converter, or a switched tank converter.

In one embodiment, the series-parallel switched capacitor converter includes: a 2-to-1 series-parallel switched capacitor converter, a 3-to-1 series-parallel switched capacitor converter or a 4-to-1 series-parallel switched capacitor converter.

In one embodiment, the third DC potential is the second voltage or a ground potential, whereas, the fourth DC potential is the second voltage or the ground potential.

In one embodiment, the zero current detection circuit includes: a current sensing circuit, which is configured to operably sense a current flowing through the at least one inductor, to generate a at least one corresponding current sensing signal; and a comparator coupled to the current sensing circuit, wherein the comparator is configured to operably compare the at least one current sensing signal with a reference signal, so as to generate the at least one zero current detection signal, wherein the at least one corresponding zero current detection signal indicates the time point at which the at least one inductor current reaches zero.

In one embodiment, the combination includes: the unidirectional conduction process and another unidirectional conduction process, the first process and the second process, wherein the two unidirectional conduction processes, the first process and the second process constitute a switching period, wherein in the switching period, the two unidirectional conduction processes, the first process and the second process are performed in any order, wherein an ending time point of an earliest process in the switching period is determined by the PWM signal, and ending time points of the processes other than the earliest process in the switching period are determined by the zero current detection signal.

In one embodiment, the reverse-unidirectional conduction process, the third process and the fourth process constitute a switching period, wherein in the switching period, the reverse-unidirectional conduction process, the third process and the fourth process are performed in any order, wherein an ending time point of an earliest process in the switching period is determined by the PWM signal, and ending time points of the processes other than the earliest process in the switching period are determined by the zero current detection signal.

In one embodiment, in the reverse-unidirectional conduction process, the inductor current is one of the following: the inductor current is a resonant current having a sixth resonant frequency; or the inductor current is a non-resonant current; wherein when the inductor current is the non-resonant current, the inductor current is a linear ramp current which gradually decreases or another linear ramp current which gradually increases.

In one embodiment, the third DC potential is the second voltage or a ground potential, whereas, the fourth DC potential is the second voltage or the ground potential.

In one embodiment, the switching period is a constant period, wherein after the reverse-unidirectional conduction process, the third process and the fourth process in the switching period have all ended, the plurality of switches are kept OFF for a zero current period until the constant period ends.

Advantages of the present invention include: that, it is not required for the present invention to balance the voltage of a resonant capacitor to ½-fold of an input voltage; and that, the present invention can achieve zero current switching and zero voltage switching to reduce switching loss; and that, the present invention can adopt an inductor having a relatively smaller size, to reduce component size and cost; and that, switches, resonant capacitors and inductors of the present invention are subject to a relatively lower voltage stress; and that, as compared to a resonant switched capacitor converter circuit having a constant voltage conversion ratio, the present invention can adjust the output voltage and has a relatively higher efficiency.

The objectives, technical details, features, and effects of the present invention will be better understood with regard to the detailed description of the embodiments below, with reference to the attached drawings.

BRIEF DESCRIPTION OF THE DRAWINGS

FIG. 3C shows a schematic circuit diagram of a zero current detection circuit of a control circuit of a switched capacitor voltage converter circuit according to an embodiment of the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
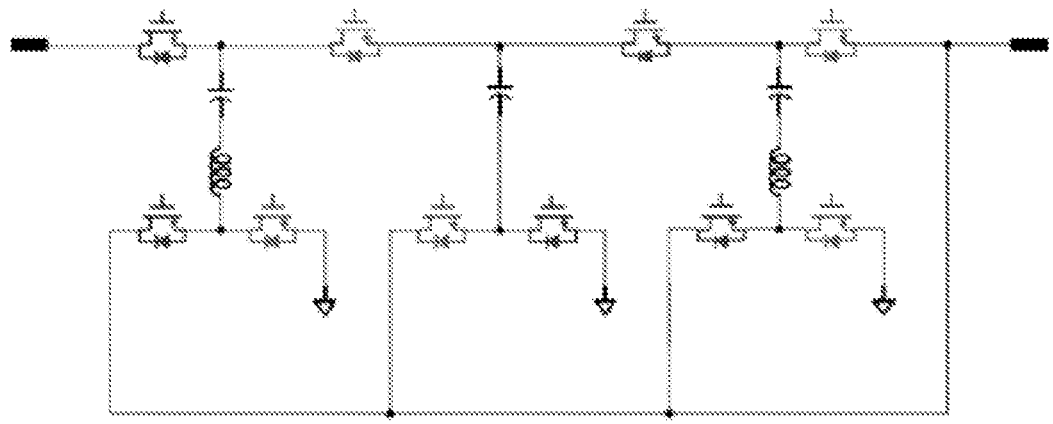
FIG. 1A shows a schematic diagram of a conventional switched tank converter disclosed in U.S. Pat. No. 9,917,517B1.
Figure 1B:
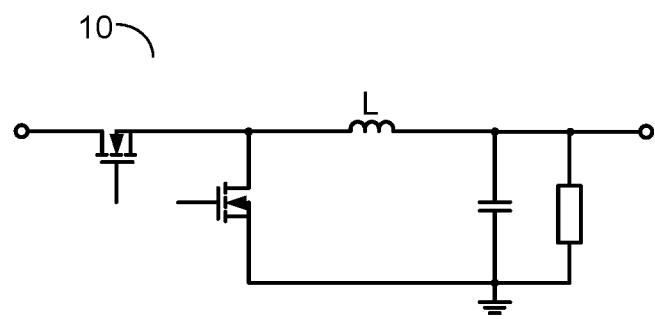
FIG. 1B shows a schematic diagram of a conventional buck converter circuit.
Figure 2A:
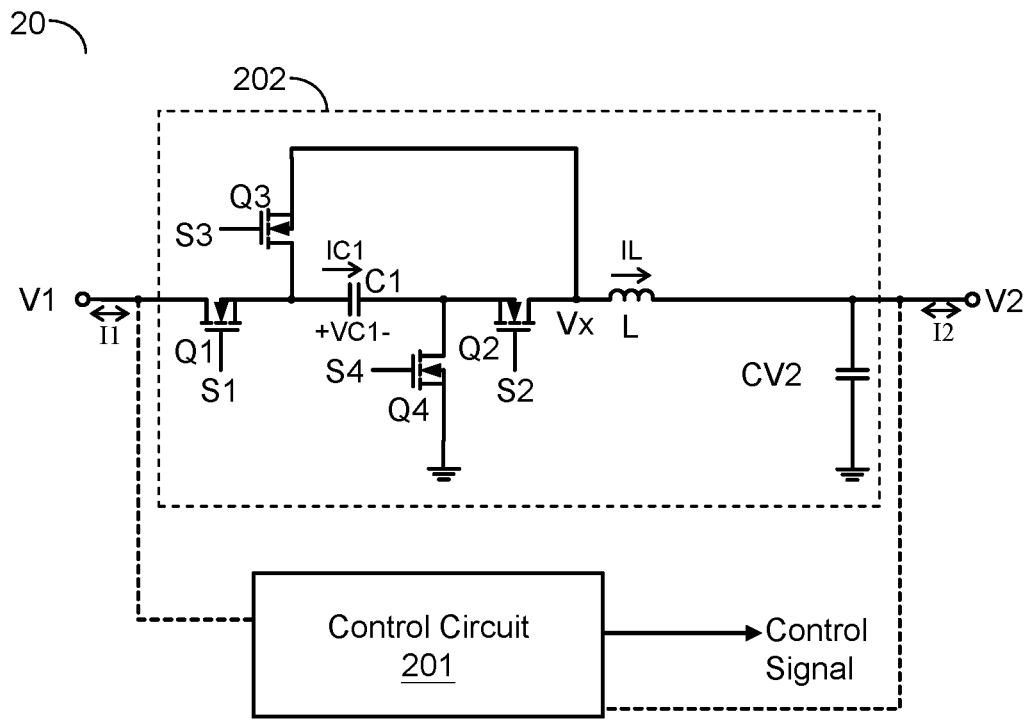
FIG. 2A shows a schematic circuit diagram of a switched capacitor voltage converter circuit according to an embodiment of the present invention.
Figure 2B:
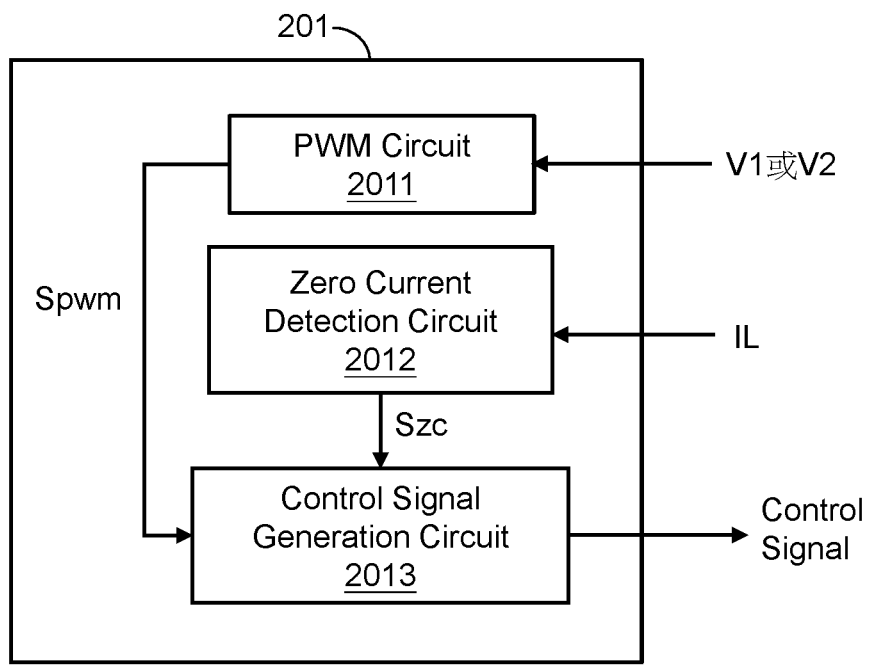
FIG. 2B shows a schematic circuit diagram of a control circuit of a switched capacitor voltage converter circuit according to an embodiment of the present invention.

FIG. 2A shows a schematic circuit diagram of a switched capacitor voltage converter circuit according to an embodiment of the present invention. FIG. 2B shows a schematic circuit diagram of a control circuit of a switched capacitor voltage converter circuit according to an embodiment of the present invention. As shown in FIG. 2A, the switched capacitor voltage converter circuit 20 is configured to convert the first voltage V1 to the second voltage V2 or to convert the second voltage V2 to the first voltage V1. The switched capacitor voltage converter circuit 20 includes: a control circuit 201 and a switched capacitor converter 202. The switched capacitor converter 202 is coupled between the first voltage V1 and the second voltage V2. As shown in FIG. 2B, the control circuit 201 is configured to operably generate a pulse width modulation (PWM) signal Spwm according to the first voltage V1 or the second voltage V2, and the control circuit 201 is configured to operably generate a control signal according to the PWM signal Spwm and a zero current detection signal Szc, so as to control the switched capacitor converter 202, thus converting the first voltage V1 to the second voltage V2 or converting the second voltage V2 to the first voltage V1. The switched capacitor converter 202 includes at least one resonant capacitor C1, plural switches (e.g., the switches Q1~Q4), and at least one inductor L. The inductor L is coupled to the at least one resonant capacitor C1.

Figure 3A:
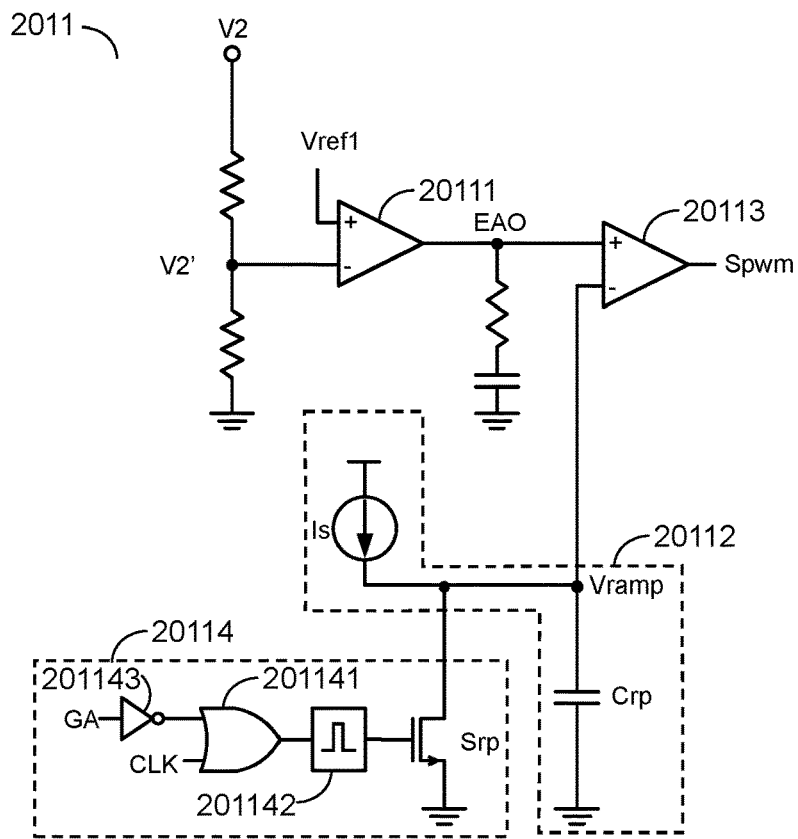
FIG. 3A shows a schematic circuit diagram of a PWM circuit of a control circuit of a switched capacitor voltage converter circuit according to an embodiment of the present invention.
Figure 3B:
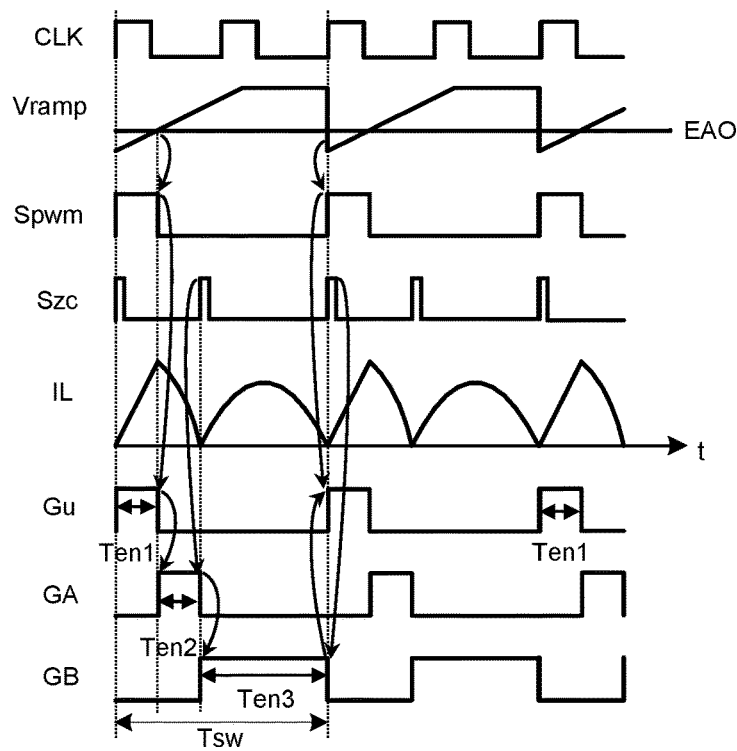
FIG. 3B illustrates a signal waveform diagram depicting the operation of a PWM circuit of a control circuit of a switched capacitor voltage converter circuit according to an embodiment of the present invention.

Please refer to FIG. 2A along with FIG. 3B. The control circuit 201 is configured to operably generate a control signal. The control signal includes: a unidirectional conduction operation signal Gu, a first operation signal GA and a second operation signal GB, which correspond to a unidirectional conduction process, a first process and a second process, respectively. The unidirectional conduction operation signal Gu, the first operation signal GA and the second operation signal GB are configured to operate switch operation signals S1~S4 to control the corresponding switches Q1~Q4 in the unidirectional conduction process, in the first process and in the second process, respectively, so as to switch electrical connection relationships of the at least one inductor L.

When the first voltage V1 is converted to the second voltage V2 (i.e., when the switched capacitor voltage converter circuit 20 converts the first voltage V1 to the second voltage V2), the PWM circuit 2011 of the control circuit 201 is configured to operably generate the PWM signal Spwm according to the second voltage V2. In this case, the switched capacitor voltage converter circuit 20 performs a combination of processes including the unidirectional conduction process, the first process and the second process, as following:

In the unidirectional conduction process, the unidirectional conduction operation signal Gu controls the switches Q1~Q4, so as to form a unidirectional conduction path between a first DC potential and the second voltage V2, so that an inductor current IL flowing through the at least one inductor L flows toward the second voltage V2 via the unidirectional conduction path. In this embodiment, the first DC potential is, for example but not limited to, the first voltage V1. In another embodiment, the first DC potential is, for example but not limited to, a ground potential. The unidirectional conduction operation signal Gu serves to control the switches Q1 and Q3 to be ON and control the switches Q2 and Q4 to be OFF during a first ON period Ten1 in the unidirectional conduction process. That is, in the unidirectional conduction process, the unidirectional conduction operation signal Gu is switched to enable level (as shown by the high level in FIG. 3) for the first ON period Ten1, so as to control the switch operation signals S1 and S3 to be switched to an ON level and control the switch operation signals S2 and S4 to be switched to an OFF level, so that one end (i.e., voltage end Vx) of the inductor L is electrically connected to the first voltage V1.

In the first process, the first operation signal GA controls the switches Q1~Q4, so that the resonant capacitor C1 and the corresponding inductor L are connected in series between the second voltage V2 and a second DC potential, so as to form a first current path, so that the inductor current IL flowing through the inductor L and flowing toward the second voltage V2 is a resonant current having a first resonant frequency. In this embodiment, the second DC potential is, for example but not limited to, the ground potential. In another embodiment, the second DC potential is, for example but not limited to, the first voltage V1. The first operation signal GA serves to control the switches Q3 and Q4 to be ON and control the switches Q1 and Q2 to be OFF during a second ON period Ten2 in the first process. That is, in the first process, the first operation signal GA is switched to enable level for the second ON period Ten2, so as to control the switch operation signals S3 and S4 to be switched to an ON level and control the switch operation signals S1 and S2 to be switched to an OFF level, so that the resonant capacitor C1 and the corresponding inductor L are connected in series between the second voltage V2 and the ground potential.

In the second process, the second operation signal GB controls the switches Q1~Q4, so that the resonant capacitor C1 and the corresponding inductor L are connected in series between the first voltage V1 and the second voltage V2, so as to form a second current path, so that the inductor current IL flowing through the inductor L and flowing toward the second voltage V2 is a resonant current having a second resonant frequency. The second operation signal GB serves to control the switches Q1 and Q2 to be ON and control the switches Q3 and Q4 to be OFF during a third ON period Ten3 in the second process. That is, in the second process, the second operation signal GB is switched to enable level for the third ON period Ten3, so as to control the switch operation signals S1 and S2 to be switched to an ON level and control the switch operation signals S3 and S4 to be switched to an OFF level, so that the resonant capacitor C1 and the corresponding inductor L are connected in series between the first voltage V1 and the second voltage V2.

In this embodiment, as shown in FIG. 3B, the unidirectional conduction operation signal Gu, the first operation signal GA and the second operation signal GB have respective ON period which do not overlap one another, so that the unidirectional conduction process, the first process and the second process do not overlap one another.

In this embodiment, as shown in FIG. 3B, the unidirectional conduction process, the first process and the second process are performed sequentially and repetitively, so that the inductor L executes an inductive power conversion through the unidirectional conduction process, the first process and the second process, thereby converting the first voltage V1 to the second voltage V2. As shown in FIG. 3B, the control circuit 201 is further configured to operably generate the zero current detection signal Szc according to a time point at which the inductor current IL reaches zero.

In the unidirectional conduction process, in one embodiment, the inductor current IL flowing toward the second voltage V2 is a resonant current having a third resonant frequency, wherein the third resonant frequency can be different from the first resonant frequency of the first process and the second resonant frequency of the second process, or the third resonant frequency can be the same as one of the first resonant frequency of the first process and the second resonant frequency of the second process. The first resonant frequency of the first process and the second resonant frequency of the second process can be the same as each other or different from each other, depending upon the corresponding inductor and the corresponding capacitor coupled to the first current path and the corresponding inductor and the corresponding capacitor coupled to the second current path.

In the unidirectional conduction process, in another embodiment, the inductor current IL flowing toward the second voltage V2 is a non-resonant current. In one implementation wherein the inductor current IL is a non-resonant current, the inductor current IL flowing toward the second voltage V2 is a linear ramp current which gradually decreases. In another implementation where the inductor current IL is a non-resonant current, the inductor current IL flowing toward the second voltage V2 is a linear ramp current which gradually increases.

In one embodiment, the unidirectional conduction process, the first process and the second process constitute a switching period Tsw, wherein in the switching period Tsw, the unidirectional conduction process, the first process and the second process are performed in any order (e.g., in this embodiment, the unidirectional conduction process, the first process and the second process are arranged according to the listing order). As a result, in this case, as shown in FIG. 3B, the ending time point of the earliest process in the switching period Tsw is determined by the PWM signal Spwm (e.g., in this embodiment, the earliest process is the unidirectional conduction process). And, as shown in FIG. 3B, ending time points of the processes other than the earliest process in the switching period Tsw are determined by the zero current detection signal Szc. It is worthwhile noting that, within a switching period Tsw, the occurrence numbers of the unidirectional conduction process, the first process and the second process are not limited, and the sequential order of the unidirectional conduction process, the first process and the second process also are not limited, as long as the ending time point of an earliest process in the switching period Tsw is determined by the PWM signal Spwm and the ending time points of the processes other than the earliest process in the switching period Tsw are determined by the zero current detection signal Szc.

Please refer to FIG. 2A in conjugation with FIG. 2B and FIG. 3B. The control circuit 201 includes: a PWM circuit 2011, a zero current detection circuit 2012 and a control signal generation circuit 2013. The PWM circuit 2011 is configured to operably generate the PWM signal Spwm according to the first voltage V1 or the second voltage V2. The zero current detection circuit 2012 is configured to operably generate the zero current detection signal Szc at the time point at which the inductor current IL reaches zero. The control signal generation circuit 2013 is coupled to the zero current detection circuit 2012 and the control signal generation circuit 2013 is configured to operably generate the control signal according to the PWM signal Spwm and the zero current detection signal Szc. Besides, the control signal generation circuit 2013 is configured to operably generate switch operation signals S1-S4 corresponding to the switches Q1~Q4 according to the control signal in the unidirectional conduction process, the first process and the second process.

Figure 2C:
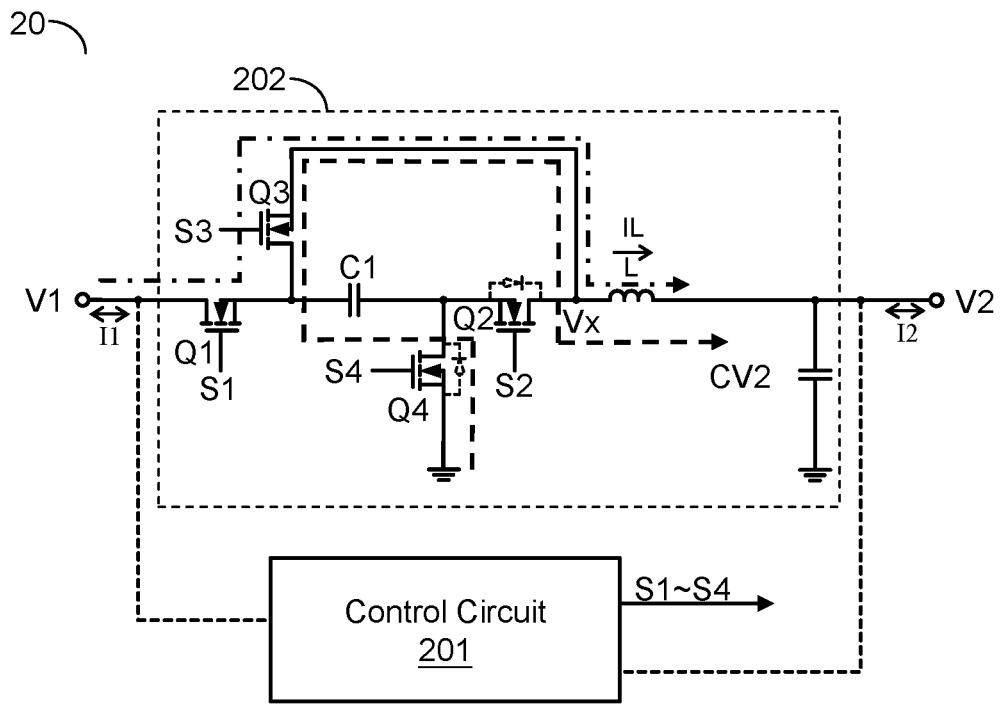
FIG. 2C shows a schematic circuit diagram of a switched capacitor voltage converter circuit according to an embodiment of the present invention.

FIG. 2C shows a schematic circuit diagram of a switched capacitor voltage converter circuit 20 according to an embodiment of the present invention. Please refer to FIG. 2C. In the unidirectional conduction process, the unidirectional conduction operation signal Gu controls the switches Q1~Q4 (e.g., the switches Q1 and Q3 are ON, whereas, the switches Q2 and Q4 are OFF), so as to form the unidirectional conduction path between the first voltage V1 and the second voltage V2, so that an inductor current IL flows toward the second voltage V2 via the unidirectional conduction path (as indicated by the dot-dash line arrow shown in FIG. 2C), wherein, in this case, the inductor current IL is a linear ramp current which gradually increases.

Please refer to FIG. 2C along with FIG. 3B. In the first process, the switches Q1~Q4 (e.g., the switches Q3 and Q4 are ON, whereas, the switches Q1 and Q2 are OFF) are controlled by the first operation signal GA, so as to form the first current path between the ground potential and the second voltage V2, so that the inductor current IL flows toward the second voltage V2 via the first current path (as indicated by the dash line arrow shown in FIG. 2C), wherein, in this case, the inductor current IL is a resonant current having a first resonant frequency.

Please still refer to FIG. 2C along with FIG. 3B. In the second process, the switches Q1~Q4 (e.g., the switches Q1 and Q2 are ON, whereas, the switches Q3 and Q4 are OFF) are controlled by the second operation signal GB, so as to form the second current path between the first voltage V1 and the second voltage V2, so that the inductor current IL flows toward the second voltage V2 via the second current path, wherein, in this case, the inductor current IL is a resonant current having a second resonant frequency. In this embodiment, the first resonant frequency is the same as the second resonant frequency.

The aforementioned unidirectional conduction process can be embodied by various ways. For example, please refer to FIG. 2C along with FIG. 4E. In the unidirectional conduction process (e.g., as shown by the period from the time point t1 to the time point t2 in FIG. 4E), the unidirectional conduction operation signal Gu controls the switches, for example turning OFF the switches Q1~Q4, so that the inductor current IL flowing through the corresponding inductor L flows toward the second voltage V2 via a unidirectional conduction path through the body diode(s) of at least one switch (e.g., the switches Q2 and Q4), whereby the inductor current IL flowing toward the second voltage V2 is a linear ramp current which gradually decreases. In this case, the unidirectional conduction path includes the body diodes of the switches Q2 and Q4 in OFF state.

Figure 4A:
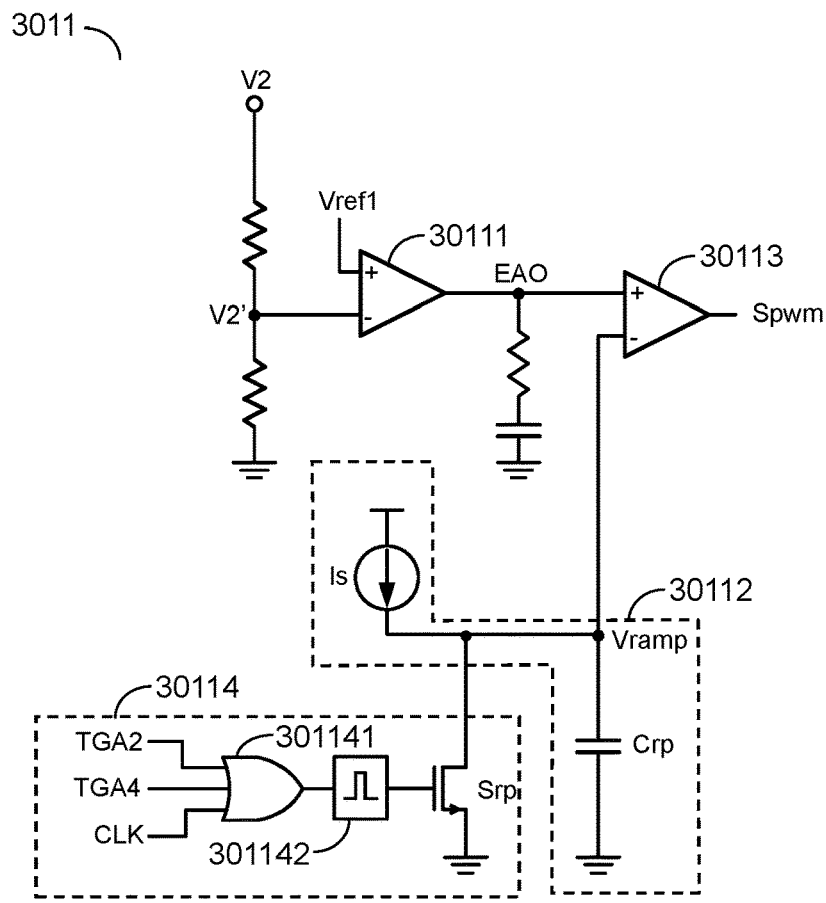
FIG. 4A shows a schematic circuit diagram of a PWM circuit of a control circuit of a switched capacitor voltage converter circuit according to another embodiment of the present invention.
Figure 4B:
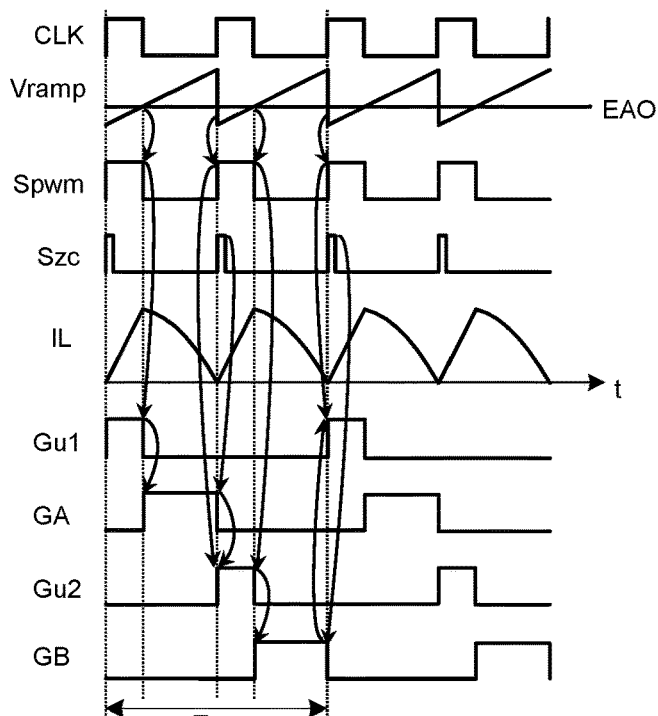
FIG. 4B illustrates a signal waveform diagram depicting the operation of a PWM circuit of a control circuit of a switched capacitor voltage converter circuit of FIG. 4A according to an embodiment of the present invention.
Figure 4C:
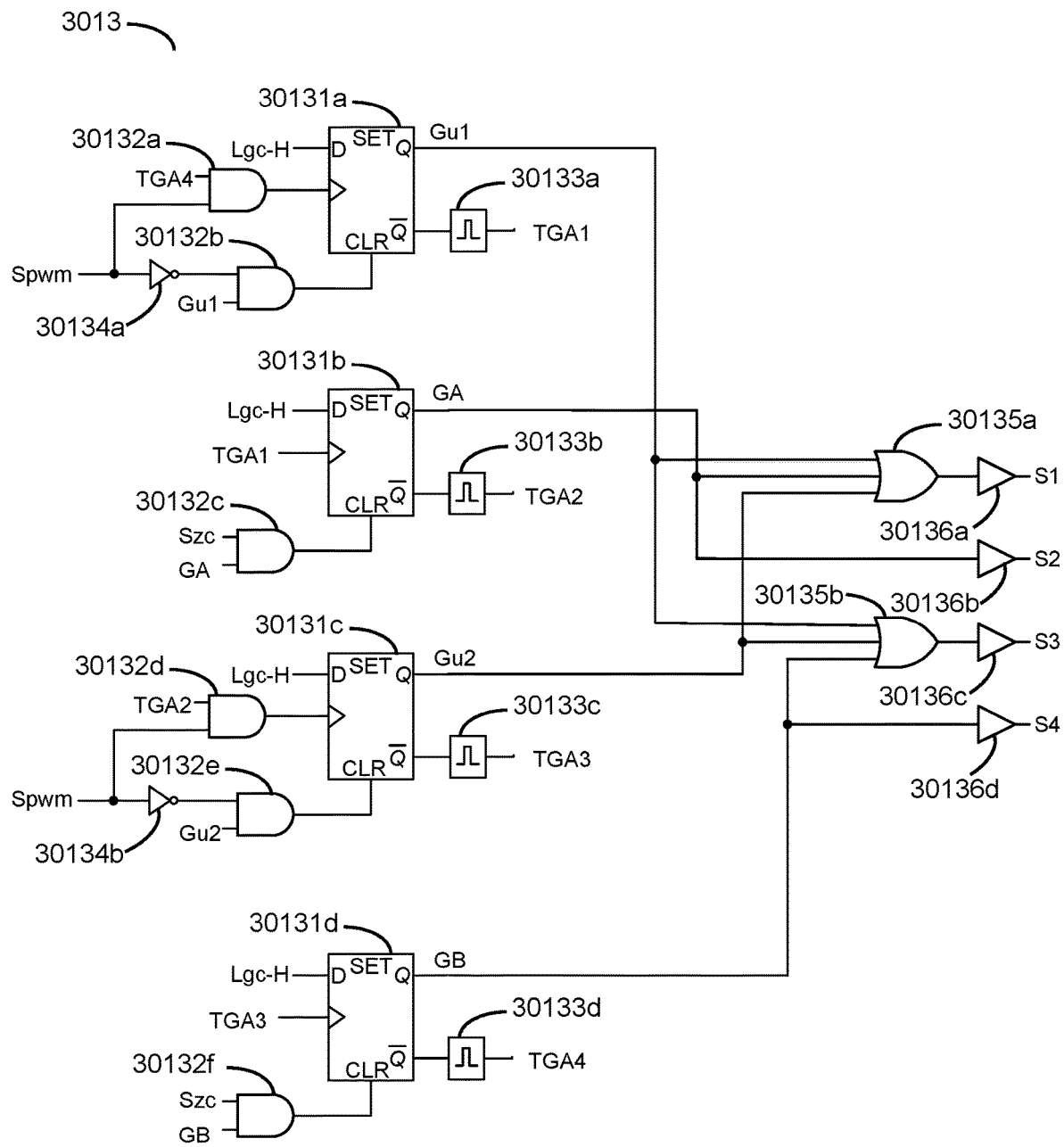
FIG. 4C shows a schematic circuit diagram of a control signal generation circuit of a control circuit of a switched capacitor voltage converter circuit according to another embodiment of the present invention.
Figure 4D:
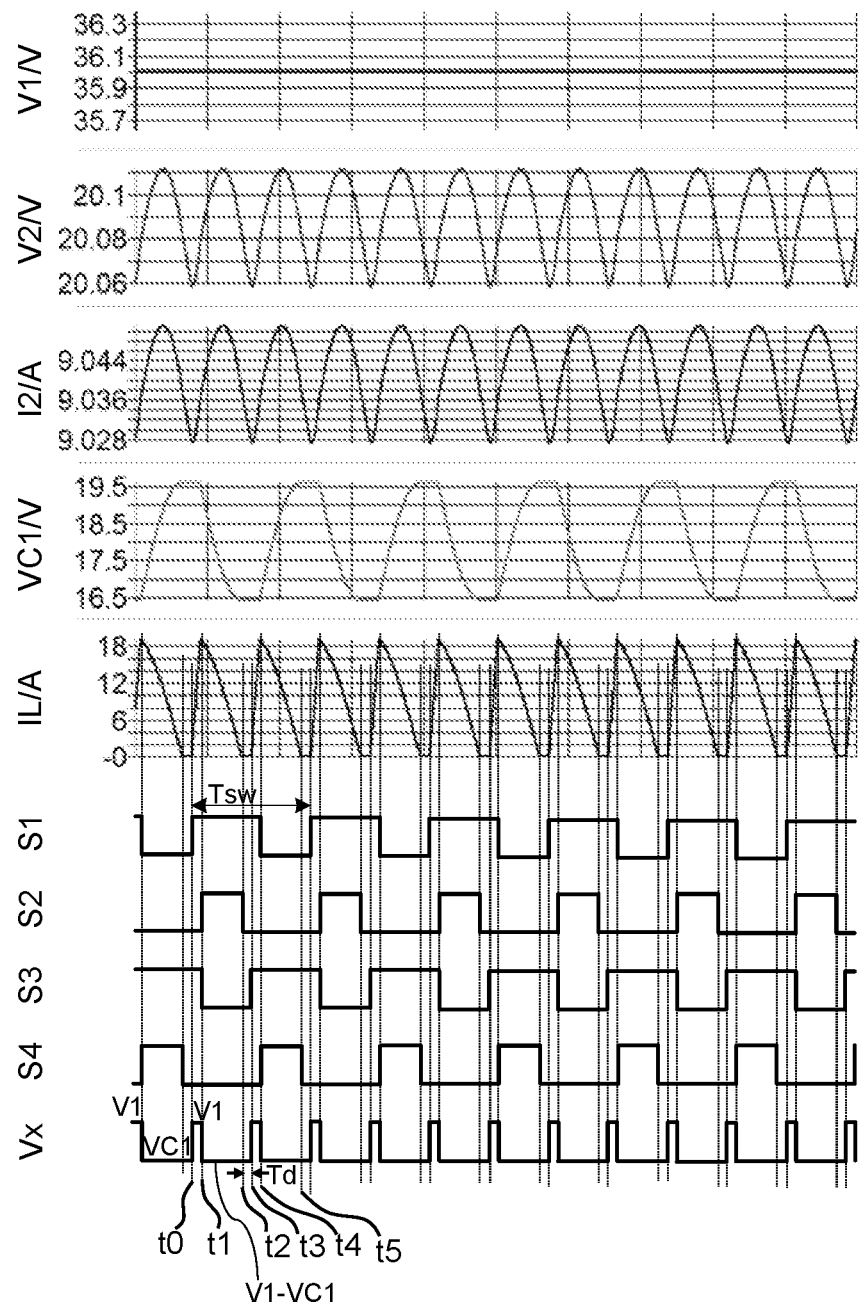
FIG. 4D illustrates a signal waveform diagram depicting the operation of a switched capacitor voltage converter circuit of FIG. 2A employing a PWM circuit of FIG. 4A according to an embodiment of the present invention.
Figure 4E:
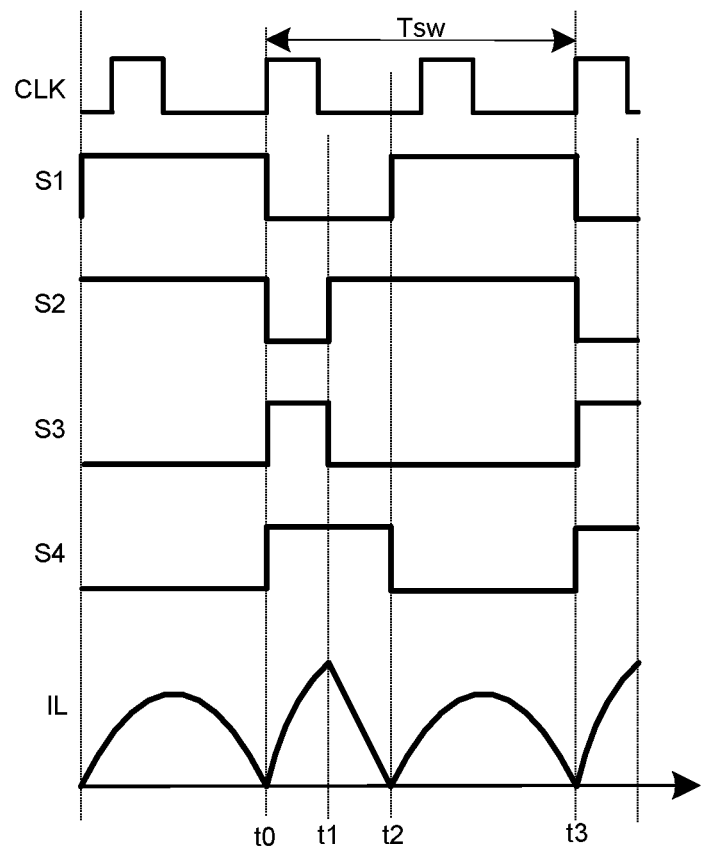
FIG. 4E illustrates a signal waveform diagram depicting the operation of a switched capacitor voltage converter circuit of FIG. 2A employing a PWM circuit of FIG. 3A according to an embodiment of the present invention, wherein the unidirectional conduction process forms a unidirectional conduction path to a ground potential.

For another example, please refer to FIG. 2C along with FIG. 4E. In another implementation of the unidirectional conduction process, in the unidirectional conduction process, the unidirectional conduction operation signal Gu controls the switches, for example turning OFF the switches Q1 and Q3 and turning ON the switches Q2 and Q4, so that the inductor current IL flowing through the corresponding inductor L flows toward the second voltage V2 via a unidirectional conduction path through the switches Q2 and Q4 which are in conductive state, whereby the inductor current IL flowing toward the second voltage V2 is a linear ramp current which gradually decreases. In this case, the unidirectional conduction path includes the switches Q2 and Q4 in conductive state.

For yet another example, please refer to FIG. 2C along with FIG. 3B. In yet another implementation of the unidirectional conduction process, in the unidirectional conduction process, the unidirectional conduction operation signal Gu controls the switches, for example turning ON the switches Q1 and Q3 and turning OFF the switches Q2 and Q4, so that the inductor current IL flowing through the corresponding inductor L flows toward the second voltage V2 via a unidirectional conduction path (as indicated by the dot-dash line arrow shown in FIG. 2C) through the switches Q1 and Q3 which are in conductive state, whereby the inductor current IL flowing toward the second voltage V2 is a linear ramp current which gradually increases. In this case, the unidirectional conduction path includes the switches Q1 and Q3 in conductive state.

Figure 2D:
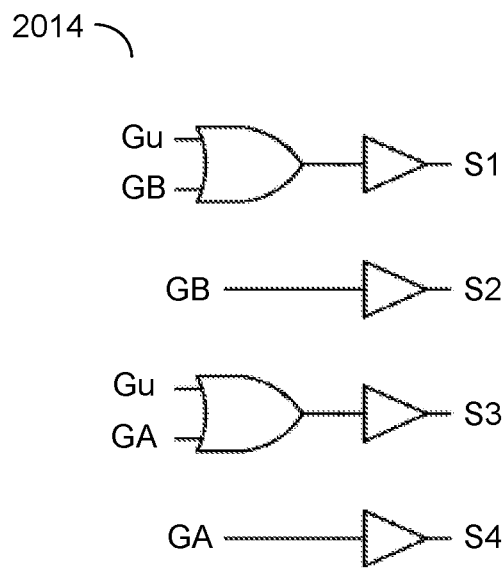
FIG. 2D shows a schematic circuit diagram of a logic circuit in a control signal generation circuit 2013 according to an embodiment of the present invention.

FIG. 2D shows a schematic circuit diagram of a logic circuit in a control signal generation circuit 2013 according to an embodiment of the present invention. Please refer to FIGS. 2A-2C along with the embodiment of FIG. 3B. The control circuit 201 is configured to operably generate a control signal according to the PWM signal Spwm and a zero current detection signal Szc. The control signal includes: a unidirectional conduction operation signal Gu, a first operation signal GA and a second operation signal GB, wherein the unidirectional conduction operation signal Gu, the first operation signal GA and the second operation signal GB are configured to operate the corresponding switches Q1~Q4 in the unidirectional conduction process, in the first process and in the second process by switch operation signals S1~S4, respectively. The logic circuit 2014 is configured to operably convert the unidirectional conduction operation signal Gu, the first operation signal GA and the second operation signal GB to the switch operation signals S1~S4. As shown in FIG. 2D, the unidirectional conduction operation signal Gu and the second operation signal GB are subject to logic operation by an OR gate, and the operation result of the OR gate generates the switch operation signal S1 through a buffer. The second operation signal GB passes through a buffer to generate the switch operation signal S2. The unidirectional conduction operation signal Gu and the first operation signal GA are subject to logic operation by an OR gate, and the operation result of the OR gate generates the switch operation signal S3 through a buffer. The first operation signal GA passes through a buffer to generate the switch operation signal S4. Certainly, it should be understood that the implementation of the logic circuit as shown by the above-mentioned preferred embodiment in FIG. 2D is only an illustrative example, but not for limiting the broadest scope of the present invention. In other embodiments, it is also practicable and within the broadest scope of the present invention that the logic circuit can be implemented in other ways to convert the unidirectional conduction operation signal Gu, the first operation signal GA and the second operation signal GB to the switch operation signals S1~S4 according to the required switch control operations.

FIG. 3A shows a schematic circuit diagram of a PWM circuit of a control circuit of a switched capacitor voltage converter circuit according to an embodiment of the present invention. As shown in FIG. 3A, the PWM circuit 2011 includes: a lock-up circuit 20111, a ramp circuit 20112, a comparison circuit 20113 and a reset circuit 20114. The lock-up circuit 20111 is configured to operably lock-up a second voltage related signal V2' related to the second voltage at to a reference voltage Vref1, to generate a voltage lock-up signal EAO. The ramp circuit 20112 is configured to operably generate a ramp signal Vramp. In one embodiment, the ramp circuit 20112 includes: a current source Is and a capacitor Crp. The current source Is is configured to operably charge the capacitor Crp, to generate the ramp signal Vramp. The comparison circuit 20113 is configured to operably compare the voltage lock-up signal EAO with the ramp signal Vramp, to generate the PWM signal Spwm. In one embodiment, the reset circuit 20114 includes: a switch Srp, an OR gate 201141, a pulse generator 201142 and an NOT gate 201145. In a case where the first operation signal GA is at disable level or the clock signal CLK is at enable level, the reset circuit 20114 turns ON the switch Srp for a short period via the OR gate 201141 and the pulse generator 201142, so as to pull down the level of the ramp signal Vramp to zero.

FIG. 3B illustrates a signal waveform diagram depicting the operation of a PWM circuit of a control circuit of a switched capacitor voltage converter circuit according to an embodiment of the present invention. The clock signal CLK, the ramp signal Vramp, the voltage lock-up signal EAO, the PWM signal Spwm, the zero current detection signal Szc, the inductor current IL, the first operation signal GA, the second operation signal GB, the unidirectional conduction operation signal Gu, and the switch period Tsw are shown in FIG. 3B. As shown in FIG. 3B, the first operation signal GA and the second operation signal GB and the unidirectional conduction operation signal Gu have respective ON periods which do not overlap one another, so that the first process, the second process and the unidirectional conduction process do not overlap one another.

As shown in FIG. 3B, when the voltage lock-up signal EAO is lower than the ramp signal Vramp, the PWM signal Spwm switches to disable level, which triggers the unidirectional conduction operation signal Gu to switch to disable level and the first operation signal GA to switch to enable level. When the zero current detection signal Szc switches to enable level, this triggers the first operation signal GA to switch to disable level and the second operation signal GB to switch to enable level. On the other hand, when the voltage lock-up signal EAO is higher than the ramp signal Vramp, the PWM signal Spwm switches to enable level; in this case, when the zero current detection signal Szc switches to enable level, this triggers the second operation signal GB to switch to disable level and the unidirectional conduction operation signal Gu to switch to enable level. As shown in FIG. 3B, in the switching period Tsw of this embodiment, it is arranged so that the unidirectional conduction process, the first process and the second process are performed according to the listing order. In another embodiment, in a switching period Tsw, it can be arranged so that the unidirectional conduction process, the second process and the first process are performed according to the listing order.

Figure 3C:
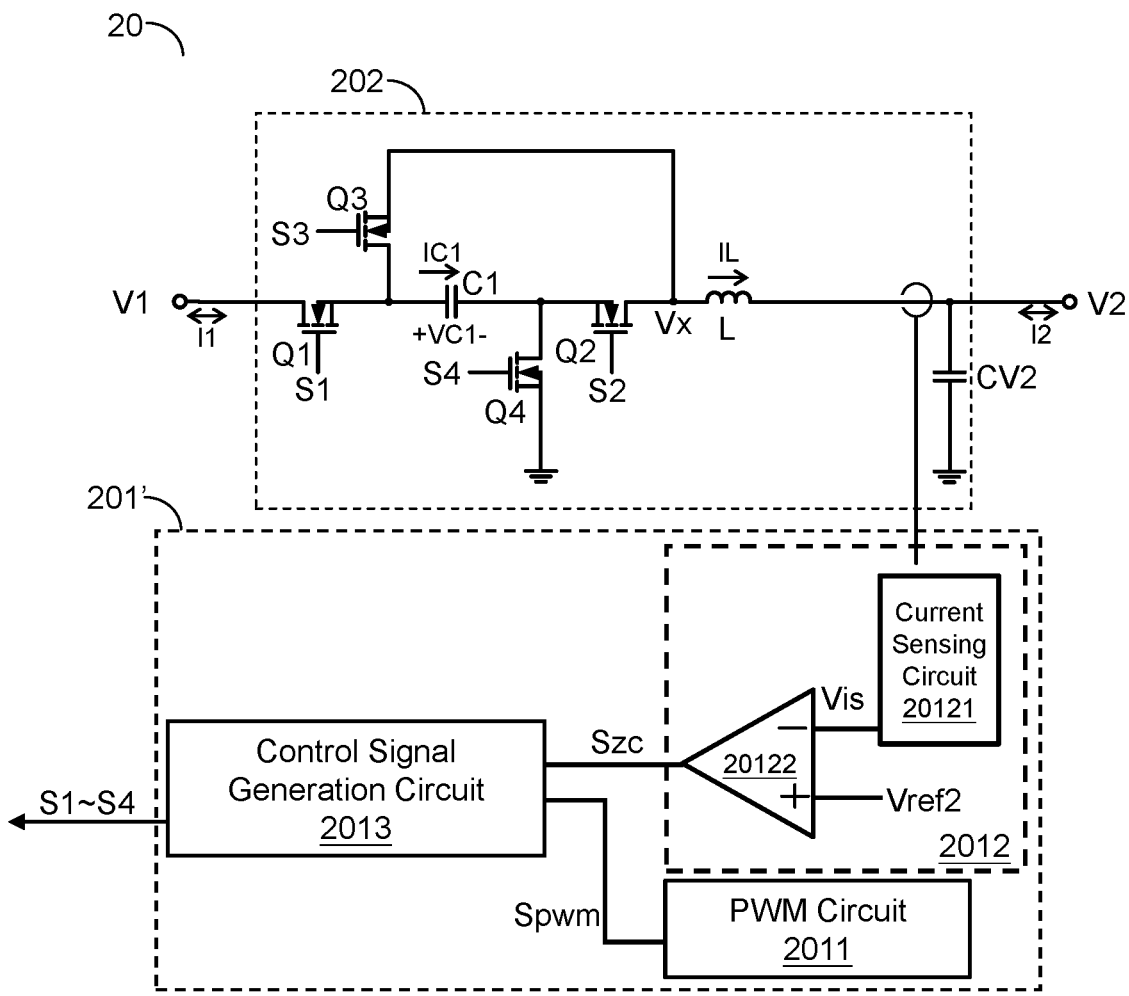
FIG. 3C shows a schematic block diagram of a zero current detection circuit of a control circuit of a switched capacitor voltage converter circuit according to an embodiment of the present invention.

FIG. 3C shows a schematic block diagram of a zero current detection circuit of a control circuit of a switched capacitor voltage converter circuit according to an embodiment of the present invention. The switched capacitor voltage converter circuit 20 of FIG. 3C includes: a switched capacitor converter 202 and a control circuit 201'. The switched capacitor converter 202 of FIG. 3C is implemented in the same configuration as the switched capacitor converter 202 of FIG. 2A. The control circuit 201' is configured to operably generate a control signal (which will generate switch operation signals S1~S4) for controlling switches (e.g., the switches Q1~Q4) of the switched capacitor converter 202. The control circuit 201' includes: a zero current detection circuit 2012, a control signal generation circuit 2013 and a PWM circuit 2011. The zero current detection circuit 2012 is configured to operably generate a zero current detection signal Szc according to the inductor current IL flowing through the inductor L. In this embodiment, the zero current detection circuit 2012 is configured to detect the inductor current IL.

Please still refer to FIG. 3C. In one embodiment, the zero current detection circuit 2012 includes: a current sensing circuit 20121 and a comparator 20122. The current sensing circuit 20121 is configured to operably sense the inductor current IL. The comparator 20122 is configured to operably compare a current related signal with a reference signal Vref2, so as to generate the zero current detection signal Szc for indicating a time point at which the inductor current IL reaches zero. The control signal generation circuit 2013 and the PWM circuit 2011 of FIG. 3C are similar to the control signal generation circuit 2013 and the PWM circuit 2011 of FIG. 2B, so the details thereof are not redundantly repeated here.

Figure 3D:
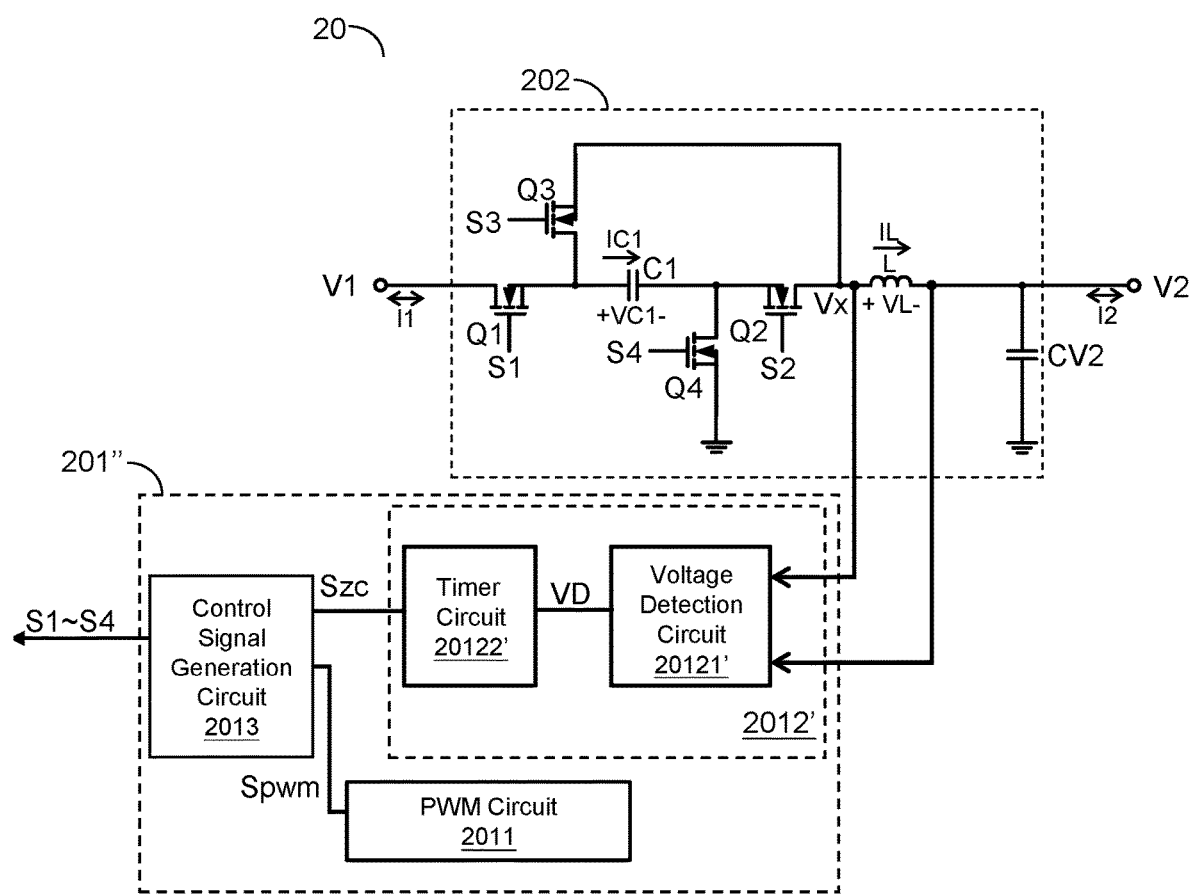
FIG. 3D and FIG. 3E show schematic block diagrams of a zero current detection circuit of a control circuit of a switched capacitor voltage converter circuit according to several embodiments of the present invention.
Figure 3E:
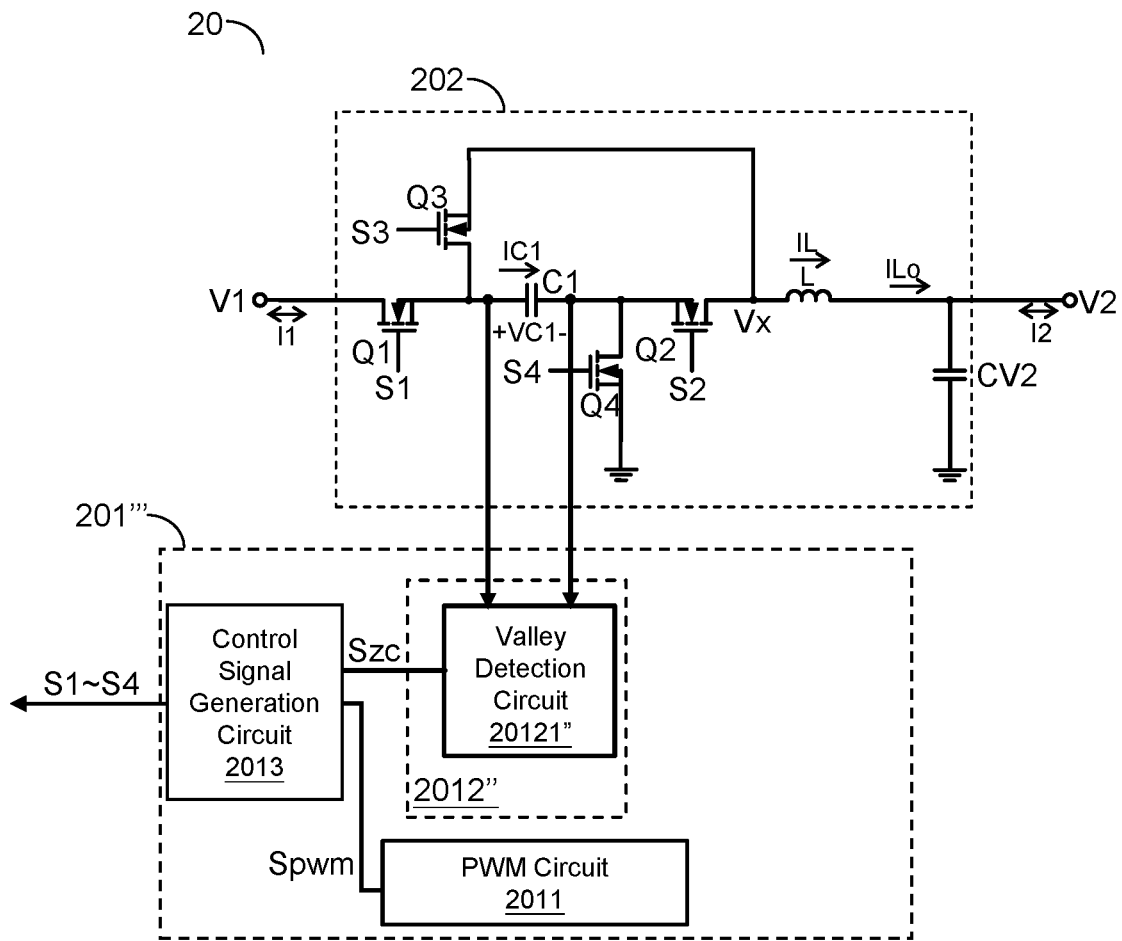

FIG. 3D and FIG. 3E show schematic block diagrams of a zero current detection circuit of a control circuit of a switched capacitor voltage converter circuit according to several embodiments of the present invention. The control circuit 201" shown in FIG. 3D is configured to operably generate a zero current detection signal Szc in a different way. The switched capacitor converter 202 of FIG. 3D corresponds to the switched capacitor converter 202 of the embodiment shown in FIG. 2A.

The control circuit 201" includes: a zero current estimation circuit 2012', which is coupled to the inductor L and which is configured to operably estimate a time point at which the inductor current IL is zero according to a voltage difference across two ends of the inductor L, so as to generate the zero current detection signal Szc. The control signal generation circuit 2013 is configured to operably generate the control signal according to the zero current detection signal Szc (thus generating switch operation signals S1~S4), so as to control operations of the switches. In regard to operation details of the above-mentioned switches, please refer to the embodiment shown in FIG. 3C.

Figure 3F:
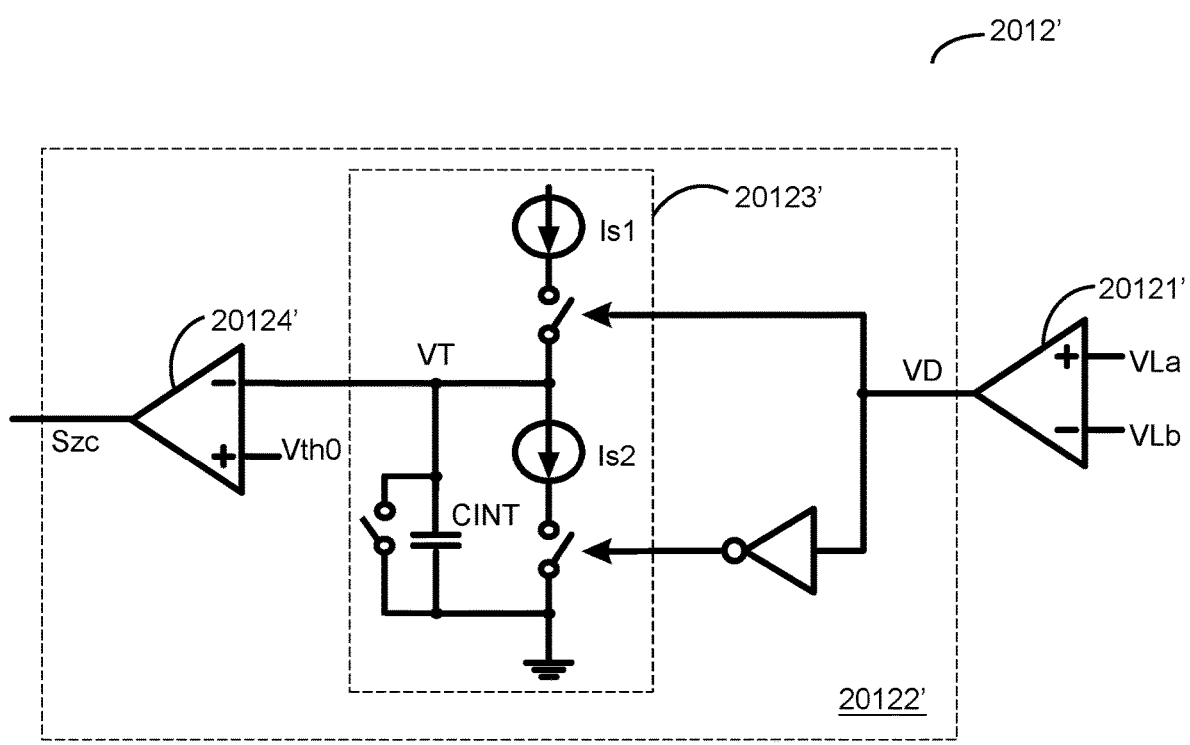
FIG. 3G illustrates a signal waveform diagram depicting the operation of a zero current detection circuit of a control circuit of a switched capacitor voltage converter circuit according to an embodiment of the present invention.
FIG. 3H shows a schematic circuit diagram of a control signal generation circuit of a control circuit of a switched capacitor voltage converter circuit according to an embodiment of the present invention.
FIG. 3I to FIG. 3K illustrate signal waveform diagrams depicting the operation of a switched capacitor voltage converter circuit according to several embodiments of the present invention.
FIG. 3L illustrates a signal waveform diagram depicting the operation of a switched capacitor voltage converter circuit of FIG. 2A employing a PWM circuit of FIG. 3A according to an embodiment of the present invention.
Figure 3G:
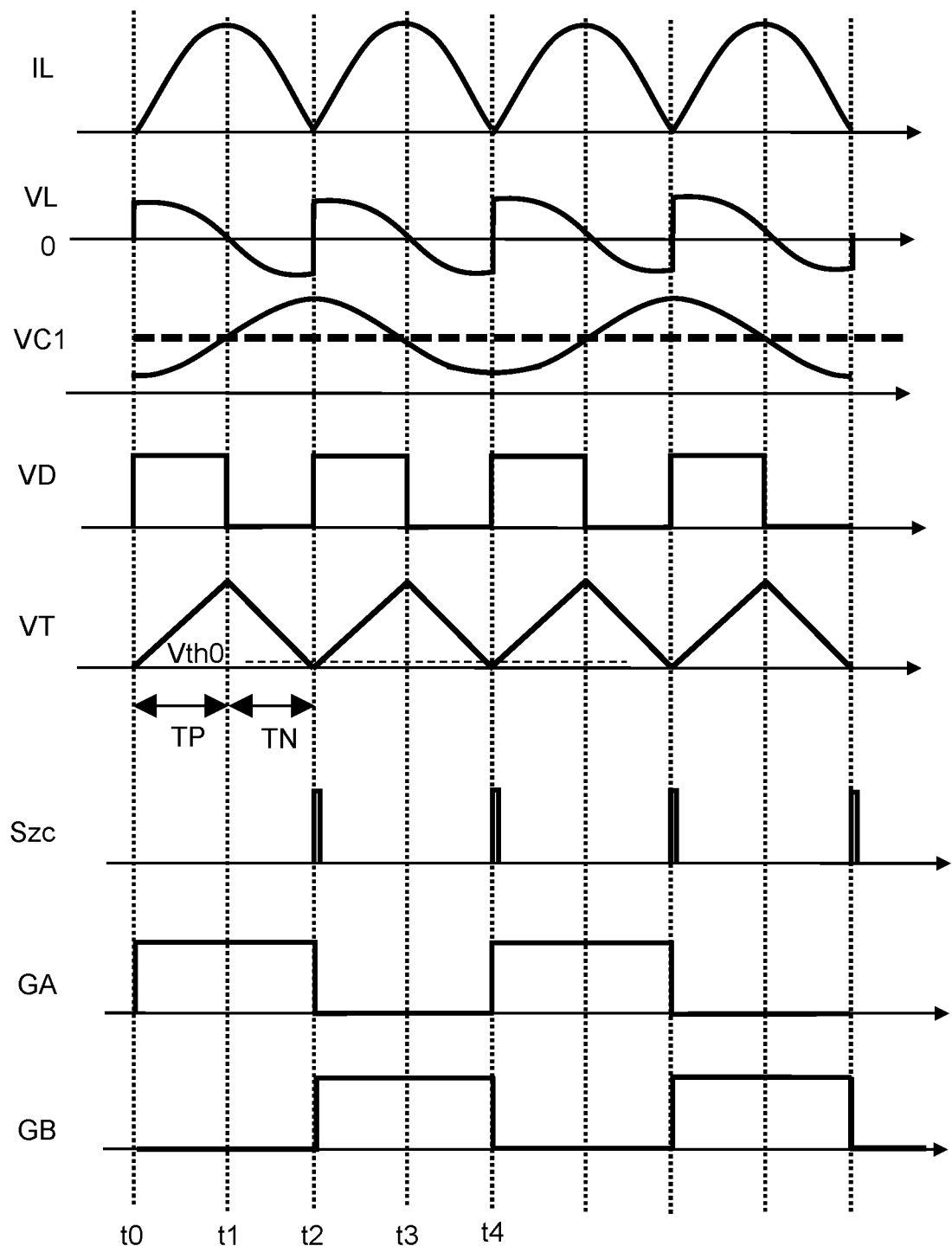

Please refer to FIG. 3D along with FIG. 3G. In one embodiment, the zero current estimation circuit 2012' includes: a voltage detection circuit 20121' and a timer circuit 20122'. The voltage detection circuit 20121' is configured to operably generate a voltage detection signal VD according to a voltage difference VL across the two ends of the inductor L, wherein the voltage detection signal VD is indicative of a positive voltage period TP wherein the voltage difference VL across the two ends of the inductor L is above zero voltage. The timer circuit 20122' is coupled to an output end of the voltage detection circuit 20121' and is configured to operably estimate a negative voltage period TN wherein the voltage difference VL across the two ends of the inductor L is not above zero voltage according to the voltage detection signal VD, so as to generate the zero current detection signal Szc which is indicative of a time point at which the inductor current IL is zero.

It is worthwhile noting that, the above-mentioned operation mechanism wherein the voltage detection signal VD is generated according to the voltage difference VL across the two ends of the inductor L is not limited to being applied in the switching converter 202 shown in FIG. 3D. In other embodiments, the above-mentioned operation mechanism can also be applied to for example the embodiments shown in FIG. 5. In the implementation wherein each resonant capacitor cooperates with a corresponding inductor (e.g., inductor L1 and inductor L2 in the embodiment shown in FIG. 5), the voltage detection circuit 20121' is configured to operably sense the inductor current IL1 flowing through the inductor L1 and the inductor current IL2 flowing through the inductor L2, so as to estimate a time point at which the inductor current IL1 reaches zero and a time point at which the inductor current IL2 reaches zero, respectively, and such information is used for switch operation control as explained in the above.

Please refer to FIG. 3E. The control circuit 201'" shown in FIG. 3E is configured to operably generate a zero current detection signal Szc in another different way. The switched capacitor converter 202 of FIG. 3E corresponds to the switched capacitor converter 202 of the embodiment shown in FIG. 2A.

In this embodiment, the control circuit 201'" includes: a zero current estimation circuit 2012", which is coupled to the resonant capacitor C1 and which is configured to operably estimate a time point at which the inductor current IL is zero according to a voltage difference VC1 across two ends of the resonant capacitor C1, so as to generate the zero current detection signal Szc. The control signal generation circuit 2013 is configured to operably generate the control signal (e.g., the switch operation signals S1~S4) according to the zero current detection signal Szc, so as to control operations of the switches. In regard to operation details of the above-mentioned switches, please refer to the embodiment shown in FIG. 3C.

Please refer to FIG. 3E along with FIG. 3G. In this embodiment, the zero current estimation circuit 2012" includes a peak detection circuit 20121". The peak detection circuit 20121" is configured to operably generate a voltage detection signal VD according to a voltage difference VC1 across the two ends of the resonant capacitor C1, wherein the generated voltage detection signal VD is indicative of a peak time point (e.g., as shown by the time point t2 in FIG. 3G) of a peak of the voltage difference VC1 across the two ends of the resonant capacitor C1 and a valley time point (e.g., as shown by the time point t4 in FIG. 3G) of a valley of the voltage difference VC1 across the two ends of the resonant capacitor C1. And, the peak detection circuit 20121" is configured to operably generate the zero current detection signal Szc according to the peak time point and the valley time point. The peak time point (e.g., as shown by the time point t2 in FIG. 3G) and the valley time point (e.g., as shown by the time point t4 in FIG. 3G) correspond to time points at which the inductor current IL is zero. There are various approaches to detect a peak and a valley of a voltage, which are well known to those skilled in the art, so the details thereof are not redundantly explained here.

Please refer to FIG. 3F, which shows an embodiment of a zero current detection circuit of a control circuit of a switched capacitor voltage converter circuit corresponding to the embodiment of FIG. 3D. The zero current estimation circuit 2012' of this embodiment includes: a comparator (corresponding to the above-mentioned voltage detection circuit 20121'), a ramp circuit 20123' and a comparator 20124'. The ramp circuit 20123' and the comparator 20124' correspond to the above-mentioned timer circuit 20122'.

Please refer to FIG. 3F along with FIG. 3G. The comparator 20121' is configured to operably compare a voltage VLa at one end of the inductor L with a voltage VLb at another end of the inductor L, so as to generate the voltage detection signal VD, wherein the voltage detection signal VD is indicative of a positive voltage period TP wherein the voltage difference across the two ends of the inductor L is above zero voltage.

Please refer to FIG. 3F along with FIG. 3G. The ramp circuit 20123' is configured to operably generate a first ramp of a ramp signal VT (e.g., as shown by the rising ramp in FIG. 3G) according to the voltage detection signal VD during the positive voltage period TP, and to operably generate a second ramp of the ramp signal VT (e.g., as shown by the falling ramp in FIG. 3G) following an end of the first ramp (i.e., a peak of the ramp signal VT) after the positive voltage period TP ends. In this embodiment, the slope of the first ramp and the slope of the second ramp have the same absolute value but opposite signs. In one embodiment, the above-mentioned first and second ramps can be generated by a current source Is1 and a current source Is2 which charge and discharge an integration capacitor (i.e., capacitor CINT) with the same level of currents, respectively.

Please refer to FIG. 3F along with FIG. 3G. The comparator 20124' is configured to operably generate the zero current detection signal Szc when the ramp signal VT (in particular the second ramp) reaches a zero current threshold Vth0, so as to indicate the time point at which the inductor current IL is zero. Note that in other embodiments, the slope of the first ramp and the slope of the second ramp can have different absolute values; under such situation, the zero current threshold Vth0 can be correspondingly adjusted.

Figure 3H:
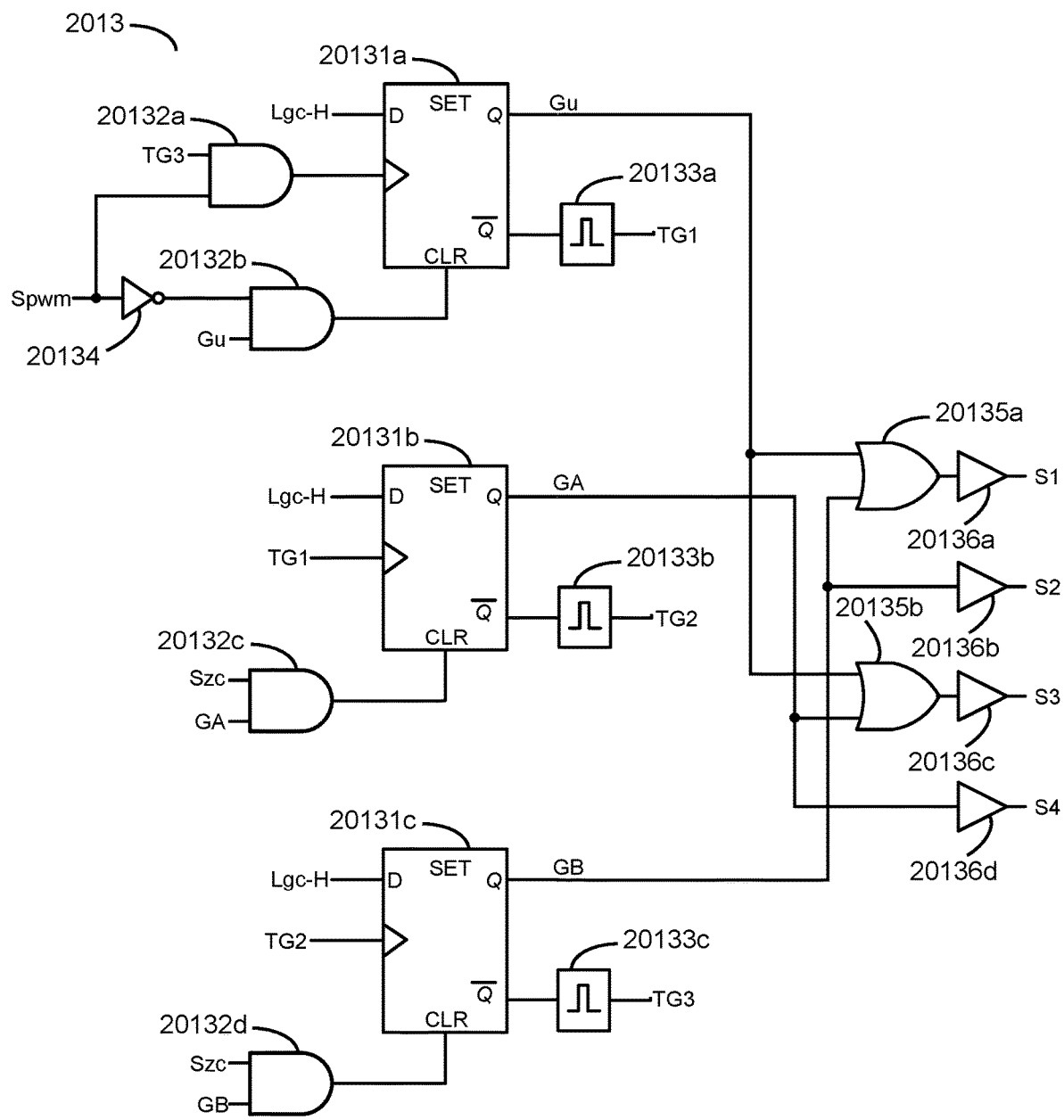

FIG. 3H shows a schematic circuit diagram of a control signal generation circuit of a control circuit of a switched capacitor voltage converter circuit according to an embodiment of the present invention. As shown in FIG. 3H, in one embodiment, the control signal generation circuit 2013 includes, for example but not limited to, flip-flops 20131a, 20131b and 20131c, AND gates 20132a, 20132b, 20132c and 20132d, pulse generators 20133a, 20133b and 20133c, an NOT gate 20134, OR gates 20135a and 20135b and buffers 20136a, 20136b, 20136c and 20136d. Note that what FIG. 3H shows is a specific example; the control signal generation circuit 2013 can be embodied in other ways.

Figure 3I:
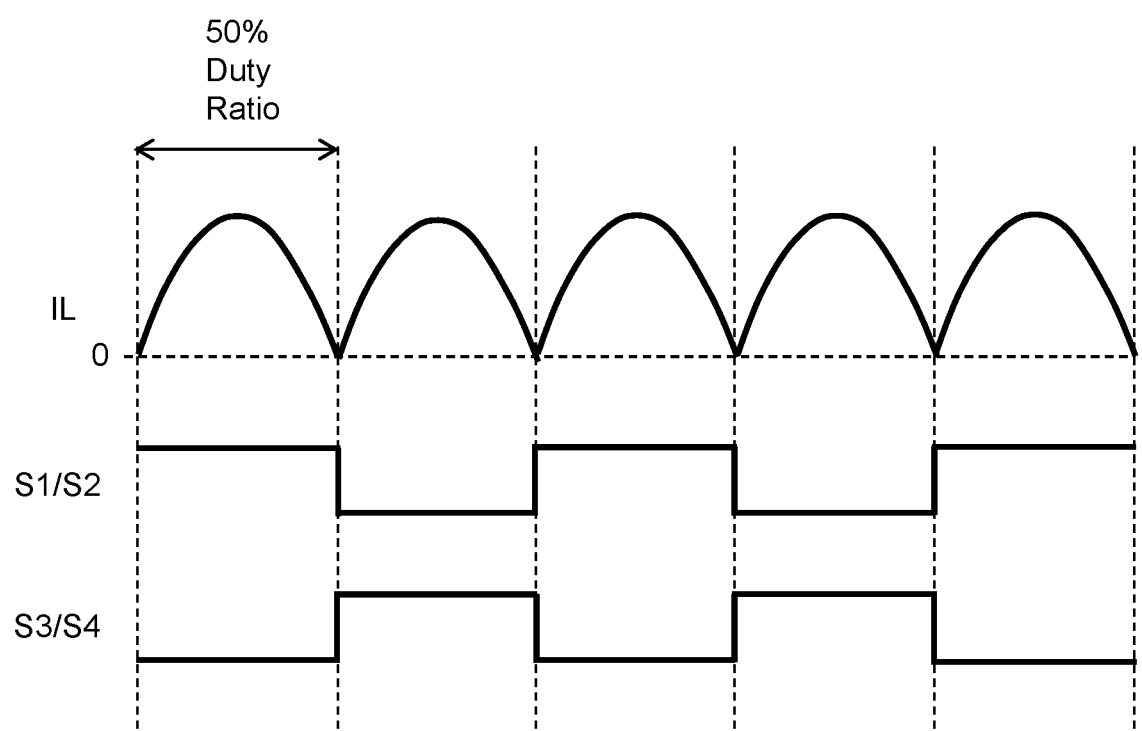
Figure 3J:
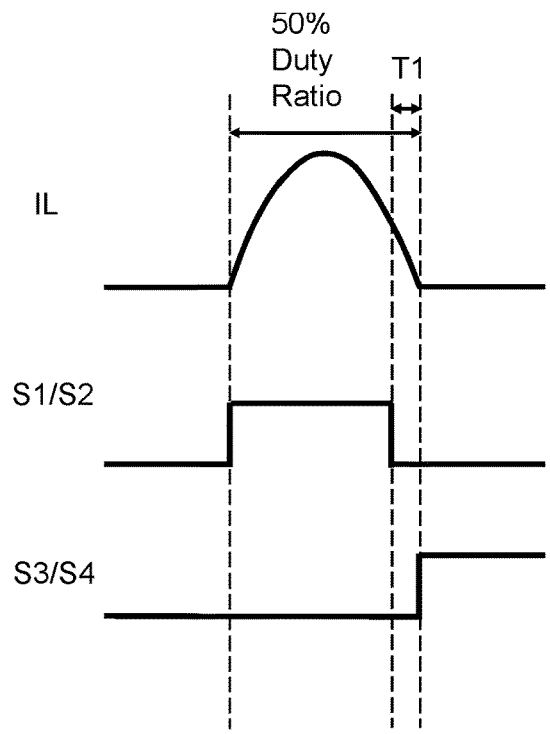
Figure 3K:
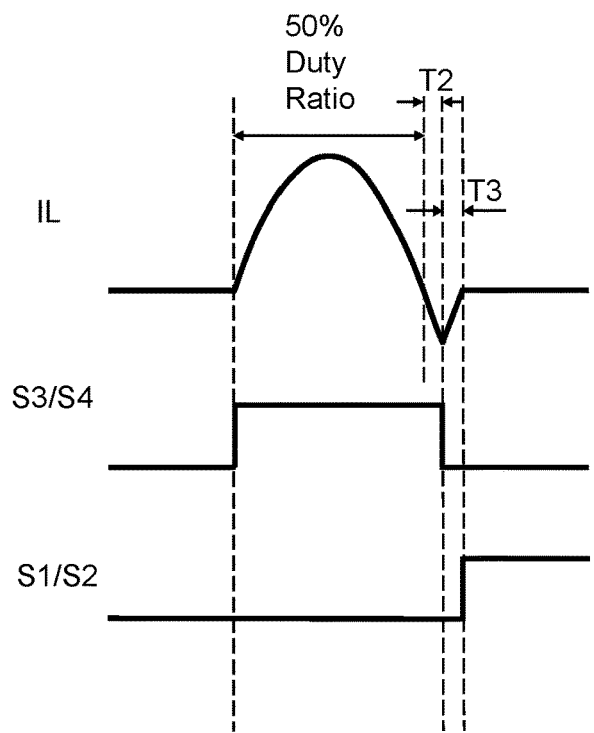

FIG. 3I to FIG. 3K illustrate signal waveform diagrams depicting the operation of a switched capacitor voltage converter circuit according to several embodiments of the present invention. In FIG. 3I, when the inductor current IL is zero, the switch operation signals S1 and S2 and the switch operation signals S3 and S4 switch their respective levels to opposite phases, to correspondingly control the switches Q1~Q4 to switch to respective opposite-phase states. In one embodiment, as shown in FIG. 3I, the time period from a time point at which the inductor current IL is zero till a next time point at which the inductor current IL is zero is 50% of a switching period, so that the ON period of the first process is equal to the ON period of the second process, thus achieving zero current switching of soft switching.

In the embodiment shown in FIG. 3J, the time point at which the switch operation signals S1 and S2 are switched to low level (i.e., OFF state) can be set earlier by adjusting the aforementioned reference signal Vref2. For example, as shown in FIG. 3J, the time point at which the switch operation signals S1 and S2 are switched to low level is earlier than the time point at which the inductor current IL reaches zero by an interval T1. In this case, because the inductor current IL is still a positive current, zero voltage switching of for example the switch Q4 is achieved.

In one embodiment, as shown in FIG. 3K, after the inductor current IL reaches zero, the switch operation signals S3 and S4 further wait for a delay period T2 and the switch operation signals S3 and S4 are turned OFF after the delay period T2 has passed, wherein the inductor current IL freewheels to become a negative current in the delay period T2. And further, the switch operation signals S1 and S2 wait for a delay period T3, and the switch operation signals S1 and S2 are turned ON after the delay period T3 has passed, so as to achieve zero voltage switching of the switch Q1.

Figure 3L:
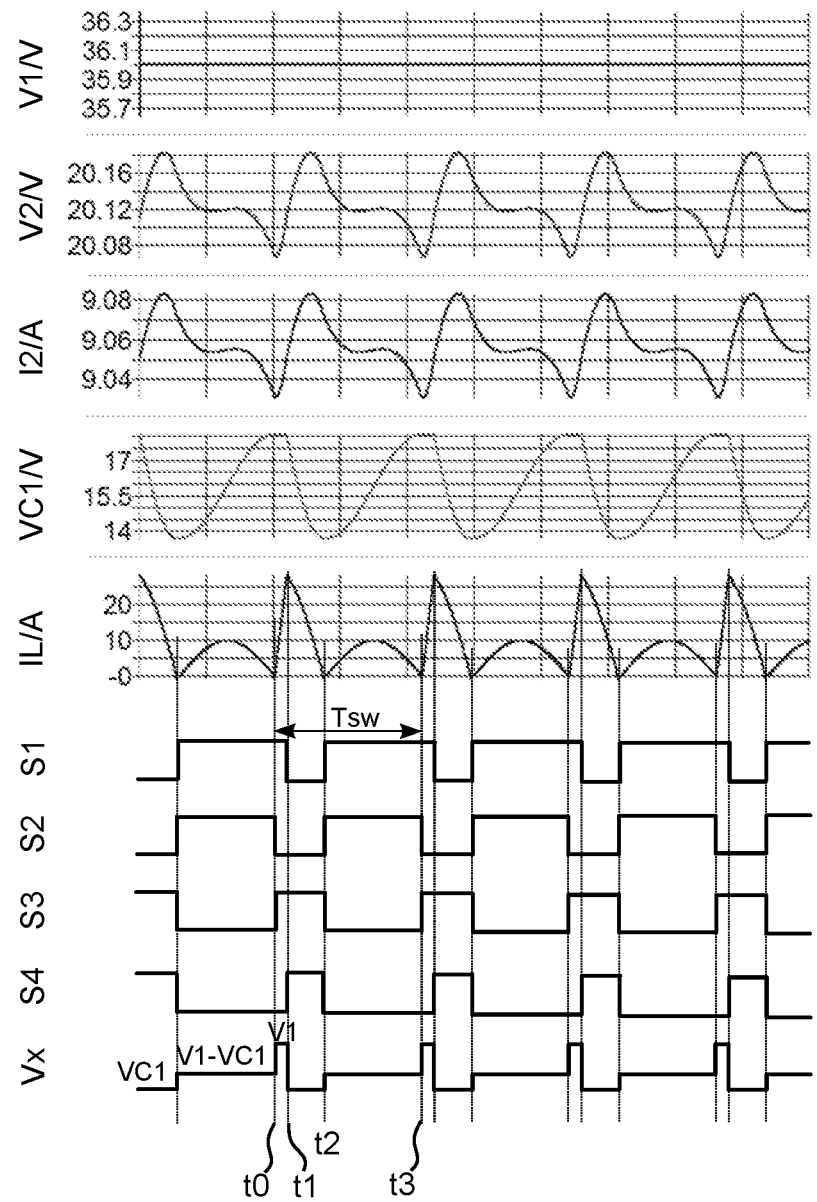

FIG. 3L illustrates a signal waveform diagram depicting the operation of a switched capacitor voltage converter circuit of FIG. 2A employing a PWM circuit of FIG. 3A according to an embodiment of the present invention. The first voltage V1, the second voltage V2, the second current I2, an across voltage VC1, the inductor current IL, the switch operation signals S1~S4, the voltage Vx and the switching period Tsw are shown in FIG. 3L. As shown in FIG. 3L, within a period from the time point t0 to the time point t1, the inductor current IL is a linear ramp current which gradually increases. On the other hand, within a period from the time point t1 to the time point t2 and within a period from the time point t2 to the time point t3, the inductor current IL is a resonant current.

FIG. 4A shows a schematic circuit diagram of a PWM circuit of a control circuit of a switched capacitor voltage converter circuit according to another embodiment of the present invention. The PWM circuit 3011 of this embodiment shown in FIG. 4A is similar to the PWM circuit 2011 of the embodiment shown in FIG. 3A, but is different in that: a reset circuit 30114 of this embodiment does not include an NOT gate and the reset circuit 30114 of this embodiment includes an OR gate 301141 having three inputs which are, namely, a clock signal CLK, an intermediate signal TGA2 and an intermediate signal TGA4. When one of the clock signal CLK, the intermediate signal TGA2 and the intermediate signal TGA4 is switched to enable level, the reset circuit 30114 turns ON the switch Srp for a short period via the OR gate 301141 and the pulse generator 301142, so as to pull down the ramp signal Vramp to zero.

FIG. 4B illustrates a signal waveform diagram depicting the operation of a PWM circuit of a control circuit of a switched capacitor voltage converter circuit of FIG. 4A according to an embodiment of the present invention. The clock signal CLK, the ramp signal Vramp, the voltage lock-up signal EAO, the PWM signal Spwm, the zero current detection signal Szc, the inductor current IL, the first operation signal GA, the second operation signal GB, the unidirectional conduction operation signals Gu1 and Gu2, the switch period Tsw are shown in FIG. 4B.

As shown in FIG. 4B, when the voltage lock-up signal EAO is lower than the ramp signal Vramp, the PWM signal Spwm switches to disable level, to trigger the unidirectional conduction operation signal Gu1 to switch to disable level and the first operation signal GA to switch to enable level. On the other hand, when the voltage lock-up signal EAO is higher than the ramp signal Vramp, the PWM signal Spwm switches to enable level, and under such circumstance when the zero current detection signal Szc is switched to enable level, the first operation signal GA is switched to disable level and the unidirectional conduction operation signal Gu2 is switched to enable level. When the voltage lock-up signal EAO is lower than the ramp signal Vramp, the PWM signal Spwm switches to disable level, to trigger the unidirectional conduction operation signal Gu2 to switch to disable level and the second operation signal GB to switch to enable level. On the other hand, when the voltage lock-up signal EAO is higher than the ramp signal Vramp, the PWM signal Spwm switches to enable level, and under such circumstance when the zero current detection signal Szc is switched to enable level, the second operation signal GB is switched to disable level and the unidirectional conduction operation signal Gu1 is switched to enable level. As shown in FIG. 4B, in the switching period Tsw of this embodiment, it is arranged so that the unidirectional conduction process, the first process, the unidirectional conduction process and the second process are performed according to the listing order. In another embodiment, in a switching period Tsw, it can be arranged so that the unidirectional conduction process, the second process, the unidirectional conduction process and the first process are performed according to the listing order.

FIG. 4C shows a schematic circuit diagram of a control signal generation circuit of a control circuit of a switched capacitor voltage converter circuit according to another embodiment of the present invention. The control signal generation circuit 3013 of this embodiment can cooperate with the PWM circuit 3011 of FIG. 4A. In one embodiment, as shown in FIG. 4C, the control signal generation circuit 3013 includes, for example but not limited to, flip-flops 30131a, 30131b, 30131c and 30131d, AND gates 30132a, 30132b, 30132c, 30132d, 30132e and 30132f, pulse generators 30133a, 30133b, 30133c and 30133d, NOT gates 30134a and 30134b, OR gates 30135a and 30135b and buffers 30136a, 30136b, 30136c and 30136d. Note that what FIG. 4C shows is a specific example; the control signal generation circuit 2013 can be embodied in other ways.

FIG. 4D illustrates a signal waveform diagram depicting the operation of a switched capacitor voltage converter circuit of FIG. 2A employing a PWM circuit of FIG. 4A according to an embodiment of the present invention. The first voltage V1, the second voltage V2, the second current I2, an across voltage VC1, the inductor current IL, the switch operation signals S1~S4, the voltage Vx and the switching period Tsw are shown in FIG. 4D. Referring FIG. 4D, within a period from the time point t0 to the time point t1 and within a period from the time point t3 to the time point t4, the inductor current IL is a linear ramp current which gradually increases. On the other hand, within a period from the time point t1 to the time point t2 and within a period from the time point t4 to the time point t5, the inductor current IL is a resonant current. The period from the time point t2 to the time point t3 is a delay period Td. OFF periods of the switches (e.g., the switches Q2, Q3 and Q4) can be adjusted via the aforementioned delay period Td, so that the control circuit 201 can operate by a constant switching frequency (i.e., the switching period Tsw is a constant period). Note that, the aforementioned delay period Td can be inserted after the first process and/or the second process and/or the unidirectional conduction process. That is, in the first process and/or the second process and/or the unidirectional conduction process, after the inductor current IL decreases to zero, the plural switches can are kept OFF for a zero current period (i.e., the delay period Td).

FIG. 4E illustrates a signal waveform diagram depicting the operation of a switched capacitor voltage converter circuit of FIG. 2A employing a PWM circuit of FIG. 3A according to an embodiment of the present invention, wherein the unidirectional conduction process forms a unidirectional conduction path to a ground potential. The clock signal CLK, the switch operation signals S1~S4 and the inductor current IL are shown in FIG. 4E. Referring FIG. 4E, within a period from the time point t1 to the time point t2, the inductor current IL is a linear ramp current which gradually decreases. On the other hand, within a period from the time point t0 to the time point t1 and within a period from the time point t2 to the time point t3, the inductor current IL is a resonant current. In this embodiment, the period from the time point t0 to the time point t1 in the switching period Tsw is when the first process is performed, that is, the period from the time point t0 to the time point t1 is a first process period, wherein the ending time point t1 (or a length of the first process period) is determined by the PWM signal Spwm, whereas, the ending time point t2 of the unidirectional conduction process and the ending time point t3 of the second process are determined by the zero current detection signal Szc. As shown in FIG. 4E, in the switching period Tsw of this embodiment, it is arranged so that the first process, the unidirectional conduction process and the second process are performed according to the listing order. In another embodiment, in a switching period Tsw, it can be arranged so that the second process, the unidirectional conduction process and the first process are performed according to the listing order.

To elaborate in more detail, in the embodiment shown in FIG. 4E, in the first process (i.e., in the period from the time point t0 to the time point t1), the switches Q1~Q4 are controlled by the first operation signal GA (e.g., the switches Q3 and Q4 are ON, whereas, the switches Q1 and Q2 are OFF), so that the resonant capacitor C1 and the corresponding inductor L are connected in series between the second voltage V2 and a second DC potential (e.g., the ground potential or the first voltage V1; in this embodiment, the second DC potential is the ground potential) to form a first current path, so that the inductor current IL flowing toward the second voltage V2 is a resonant current having a first resonant frequency.

Subsequently, in the unidirectional conduction process (i.e., the period from the time point t1 to the time point t2), the switches Q1~Q4 are controlled by the unidirectional conduction operation signal Gu (e.g., the switches Q2 and Q4 are ON, whereas, the switches Q1 and Q3 are OFF). That is, in the unidirectional conduction process, the unidirectional conduction operation signal Gu is switched to enable level for the first ON period, so as to control the switch operation signals S2 and S4 to be switched to enable level and control the switch operation signals S1 and S3 to be switched to disable level, so that one end of the inductor L is electrically connected to the DC potential (in this embodiment, the DC potential is the ground potential). In the unidirectional conduction process, the unidirectional conduction operation signal Gu controls the switches (e.g., the switches Q2 and Q4 are ON, whereas, the switches Q1 and Q3 are OFF), so that the inductor current IL flowing through the inductor L flows toward the second voltage V2 via the unidirectional conduction path.

Subsequently, in the second process, the switches Q1~Q4 are controlled by the second operation signal GB (e.g., the switches Q1 and Q2 are ON, whereas, the switches Q3 and Q4 are OFF), so that the at least one resonant capacitor C1 and the corresponding inductor L are connected in series between the first voltage V1 and the second voltage V2, so as to form a second current path, so that the inductor current IL flowing toward the second voltage V2 is a resonant current having a second resonant frequency. In this embodiment, the first resonant frequency is the same as the second resonant frequency.

Figure 4F:
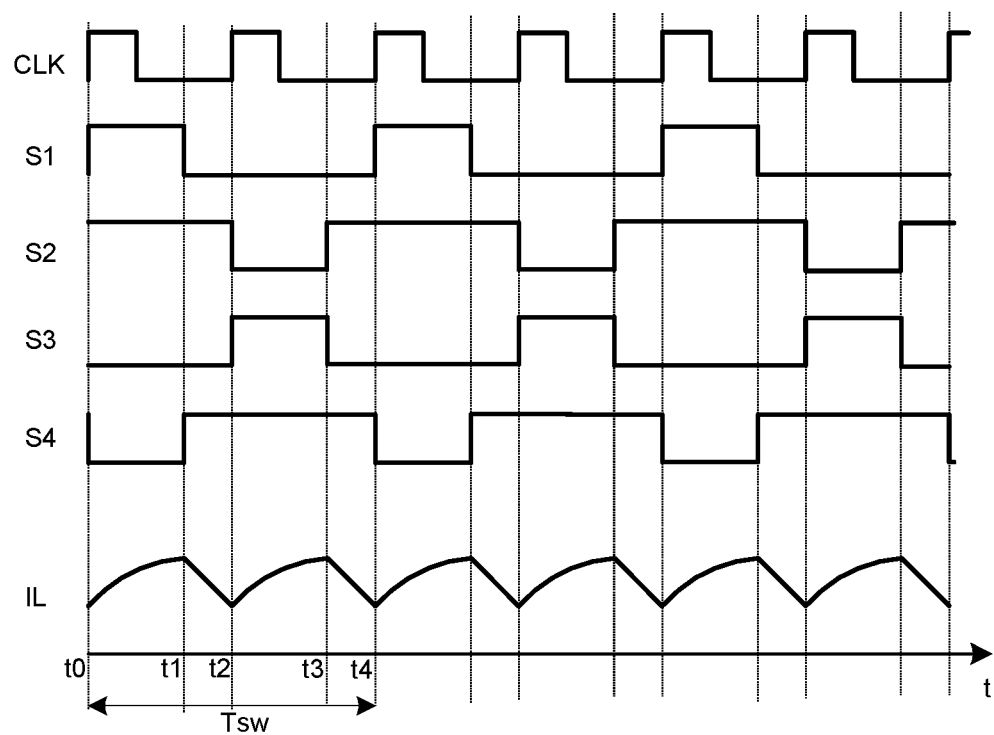
FIG. 4F illustrates a signal waveform diagram depicting the operation of a switched capacitor voltage converter circuit of FIG. 2A employing a PWM circuit of FIG. 4A according to another embodiment of the present invention, wherein the unidirectional conduction process forms a unidirectional conduction path to a ground potential.

FIG. 4F illustrates a signal waveform diagram depicting the operation of a switched capacitor voltage converter circuit of FIG. 2A employing a PWM circuit of FIG. 4A according to another embodiment of the present invention, wherein the unidirectional conduction process forms a unidirectional conduction path to a ground potential. The clock signal CLK, the switch operation signals S1~S4 and the inductor current IL are shown in FIG. 4F. Referring to FIG. 4F, within a period from the time point t1 to the time point t2 and within a period from the time point t3 to the time point t4, the inductor current IL is a linear ramp current which gradually decreases. On the other hand, within a period from the time point t0 to the time point t1 and within a period from the time point t2 to the time point t3, the inductor current IL is a resonant current. In this embodiment, the period from the time point t0 to the time point t1 in the switching period Tsw is when the second process is performed, that is, the period from the time point t0 to the time point t1 is a second process period, wherein a length for the second process period is determined by the PWM signal Spwm. As shown in FIG. 4F, in the switching period Tsw of this embodiment, it is arranged so that the second process, the unidirectional conduction process, the first process and the unidirectional conduction process are performed according to the listing order. In another embodiment, in a switching period Tsw, it can be arranged so that the first process, the unidirectional conduction process, the second process and the unidirectional conduction process are performed according to the listing order.

Figure 5:
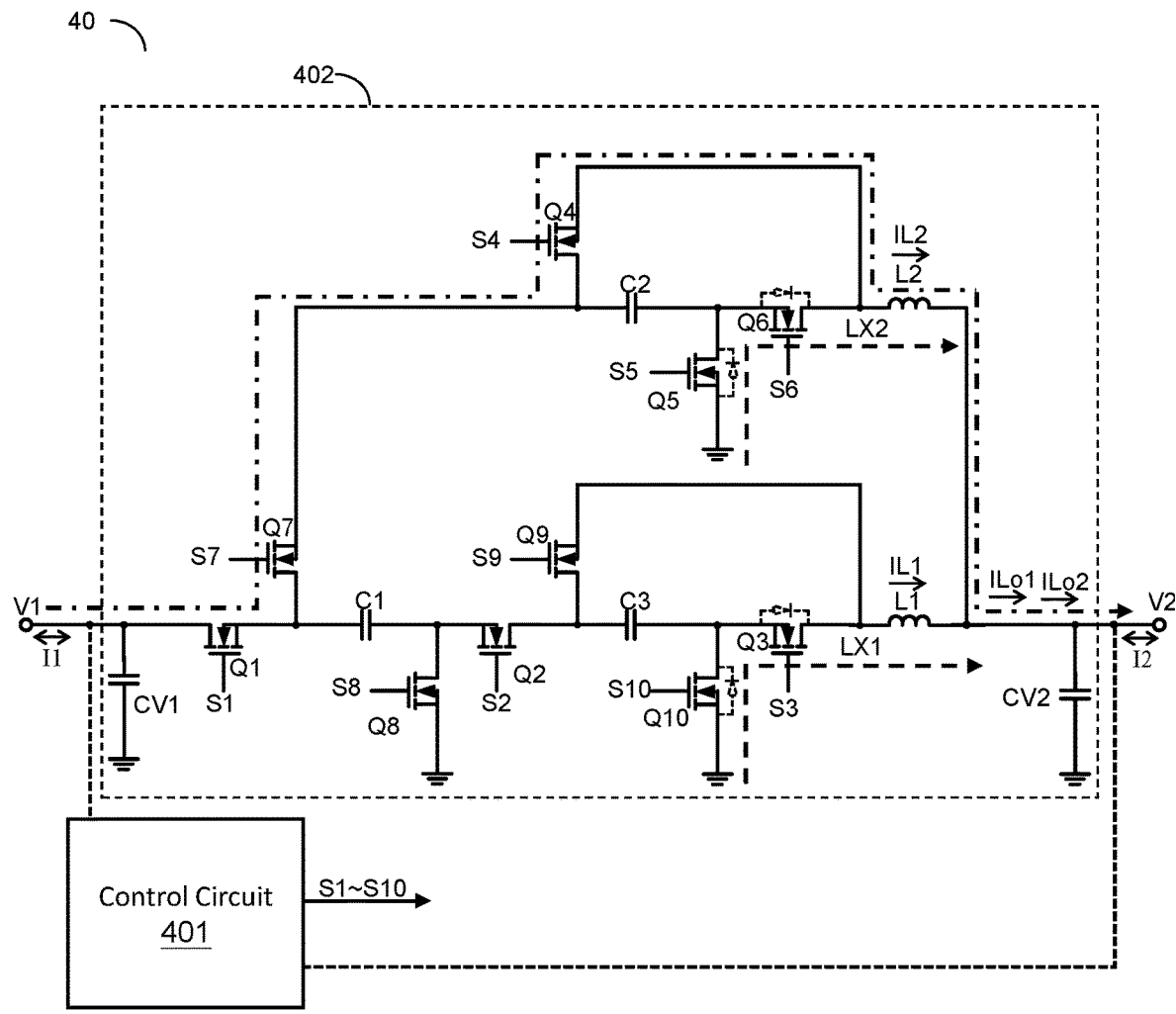
FIG. 5 shows a schematic circuit diagram of a switched capacitor voltage converter circuit according to another embodiment of the present invention.

FIG. 5 shows a schematic circuit diagram of a switched capacitor voltage converter circuit according to another embodiment of the present invention. The switched capacitor voltage converter circuit 40 is configured to operably convert a first voltage V1 to a second voltage V2 or is configured to operably convert the second voltage V2 to the first voltage V1. In this embodiment, the switched capacitor voltage converter circuit 40 includes: a control circuit 401 and a switched capacitor converter 402. The switched capacitor converter 402 includes: a non-resonant capacitor C1, a resonant capacitor C2 and a resonant capacitor C3, and a plurality of switches (e.g., the switches Q1~Q10) which are coupled with one another. Note that, when the capacitance of the capacitor C1 is much larger than the capacitances of the capacitors C2 and C3, the capacitor C1 can be considered as a non-resonant capacitor.

In one embodiment, during the second process, the switches (e.g., the switches Q1~Q10) are configured to operably control the non-resonant capacitor C1 and the resonant capacitor C3 to be electrically connected in series between the first voltage V1 and the second voltage V2, and to operably control the resonant capacitor C2 to be electrically connected in parallel to the second voltage V2, wherein the other end of the resonant capacitor C2 is controlled to be coupled to a ground potential. Specifically, the switches Q1~Q3 are ON, so as to control the non-resonant capacitor C1 and the resonant capacitor C3 to be electrically connected in series between the first voltage V1 and the second voltage V2, whereas, the switches Q4~Q5 are ON, so as to control the resonant capacitor C2 to be electrically connected in parallel to the second voltage V2; in the meantime, the switches Q6~Q10 are OFF. In this embodiment, during the second process, the switch operation signals S1~S5 are at enable level, so that the switches controlled by the switch operation signals S1~S5 are ON. On the other hand, during the second process, the switch operation signals S6~S10 are at disable level, so that the switches controlled by the switch operation signals S6~S10 are OFF.

During the first process, the switches (e.g., the switches Q1~Q10) are configured to operably control the resonant capacitor C2 and the non-resonant capacitor C1 to be electrically connected in series between the second voltage V2 and a ground potential, and to operably control the resonant capacitor C3 to be electrically connected in parallel to the second voltage V2. In one embodiment, during the first process, the resonant capacitor C2 and the non-resonant capacitor C1 are electrically connected in series in a reversed direction between the second voltage V2 and the ground potential. Specifically, the switches Q6~Q8 are ON, so as to control the resonant capacitor C2 and the non-resonant capacitor C1 to be electrically connected in series between the second voltage V2 and the ground potential, and the switches Q9~Q10 are ON, so as to control the resonant capacitor C3 to be electrically connected in parallel to the second voltage V2; in the meantime, the switches Q1~Q5 are OFF. In this embodiment, during the first process, the switch operation signals S1~S5 are at disable level, so that the switches controlled by the switch operation signals S1~S5 are OFF. On the other hand, during the first process, the switch operation signals S6~S10 are at enable level, so that the switches controlled by the switch operation signals S6~S10 are ON.

The switched capacitor voltage converter circuit 40 executes power conversion between the first voltage V1 and the second voltage V2 through periodically conducting the above-mentioned operations. In this embodiment, the ratio of the first voltage V1 to the second voltage V2 is equal to 4.

Note that, as one having ordinary skill in the art readily understands, that the resonant capacitor C2 and the non-resonant capacitor C1 are electrically connected in series "in a reversed direction", refers to that the voltage across the resonant capacitor C2 and the voltage across the non-resonant capacitor C1 are in opposite direction to each other (i.e., the direction from the positive end to the negative end of the capacitor C2 is opposite to the direction from the positive end to the negative end of the capacitor C1).

In the embodiment wherein the first voltage V1 is converted to the second voltage V2, during the second process, the first voltage V1 charges the non-resonant capacitor C1 and the resonant capacitor C3 which are electrically connected in series, whereas, the resonant capacitor C2 is discharged, to thereby supply power to the second voltage V2; that is, the resonant capacitor C2 charges a capacitor CV2 coupled to the second voltage V2. On the other hand, during the first process, the non-resonant capacitor C1 charges the resonant capacitor C2 and the second voltage V2.

In addition, in the embodiment wherein the second voltage V2 is converted to the first voltage V1, during the second process, the second voltage V2 charges the non-resonant capacitor C1 and the resonant capacitor C3 which are electrically connected in series and the second voltage V2 charges the resonant capacitor C2. On the other hand, during the first process, the second voltage V2 charges the resonant capacitor C3, and the second voltage V2 charges the non-resonant capacitor C1 via the resonant capacitor C2.

Through periodically conducting the above-mentioned operations, in this embodiment, in a steady state, the ratio of the voltage VC1 across the non-resonant capacitor C1 to the second voltage V2 is equal to 2. The ratio of the voltage VC3 across the resonant capacitor C3 to the second voltage V2 is equal to 1. And, the ratio of the voltage VC2 across the resonant capacitor C2 to the second voltage V2 is equal to 1. In an implementation wherein the second voltage V2 is equal to 12V, in a steady state, the voltage VC3 across the resonant capacitor C3 and the voltage VC2 across the resonant capacitor C2 are both equal to 12V. It is worthwhile noting that, because the present invention can ensure the voltage across a capacitor to be kept at a relatively lower voltage level in a steady state, the effective capacitance of such capacitor is actually higher. As a result, both the required voltage withstanding capability and the required size for such capacitor can be effectively reduced. Besides, under such situation, the resonant frequency of the present invention is relatively stabler and the transient response is better. Moreover, it is worthwhile noting that, because the output current (e.g., corresponding to the second current I2) of the present invention are provided by two channels, ripples can be reduced.

In the embodiment wherein the first voltage V1 is converted to the second voltage V2, the non-resonant capacitor CV1 coupled to the first voltage V1 and the non-resonant capacitor CV2 coupled to the second voltage V2 correspond to an input capacitor and an output capacitor, respectively. Or, in the embodiment wherein the second voltage V2 is converted to the first voltage V1, the non-resonant capacitor CV1 coupled to the first voltage V1 and the non-resonant capacitor CV2 coupled to the second voltage V2 correspond to an output capacitor and an input capacitor, respectively.

The switched capacitor 402 of this embodiment further includes an inductor L1 and an inductor L2. The inductor L1 is coupled between the second voltage V2 and a first switching node LX1, whereas, the inductor L2 is coupled between the second voltage V2 and a second switching node LX2. During the second process, the switches (e.g., the switches Q1~Q10) control the non-resonant capacitor C1 and the resonant capacitor C3 to be electrically connected in series to the inductor L1 via the first switching node LX1, and the series circuit formed by the non-resonant capacitor C1, the resonant capacitor C3 and the inductor L1 is electrically connected in series between the first voltage V1 and the second voltage V2; and the switches Q1~Q10 control the resonant capacitor C2 to be electrically connected in series to the inductor L2 via the second switching node LX2, and the series circuit formed by the resonant capacitor C2 and the inductor L2 is electrically connected in parallel to the second voltage V2. On the other hand, during the first process, the switches Q1~Q10 control the resonant capacitor C2 and the non-resonant capacitor C1 to be electrically connected in series to the inductor L2 via the second switching node LX2, and the series circuit formed by the resonant capacitor C2, the non-resonant capacitor C1 and the inductor L2 is electrically connected in series between the second voltage V2 and the ground potential; and the switches Q1~Q10 control the resonant capacitor C3 to be electrically connected in series to the inductor L1 via the first switching node LX1, and the series circuit formed by the resonant capacitor C3 and the inductor L1 is electrically connected in parallel to the second voltage V2. In one embodiment, both the inductor L1 and the inductor L2 operate in a continuous conduction mode, thereby further reducing the inrush current and ripple current.

In one embodiment, the capacitance of the non-resonant capacitor C1 is far greater than the capacitance of the resonant capacitor C3 and the capacitance of the resonant capacitor C2, so that a first resonant frequency of the resonant capacitor C3 and the inductor is far greater than a third resonant frequency of the non-resonant capacitor C1 and the inductor, and a second resonant frequency of the resonant capacitor C2 and the inductor is far more greater than a third resonant frequency of the non-resonant capacitor C1 and the inductor. In one embodiment, the first resonant frequency and the second resonant frequency are both greater than or equal to ten times of the third resonant frequency.

The control circuit 401 of this embodiment can be implemented by combining the control circuit structure of FIG. 2B with the control circuit structures of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 2C, and please refer to the detailed description of FIG. 2C.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 6:
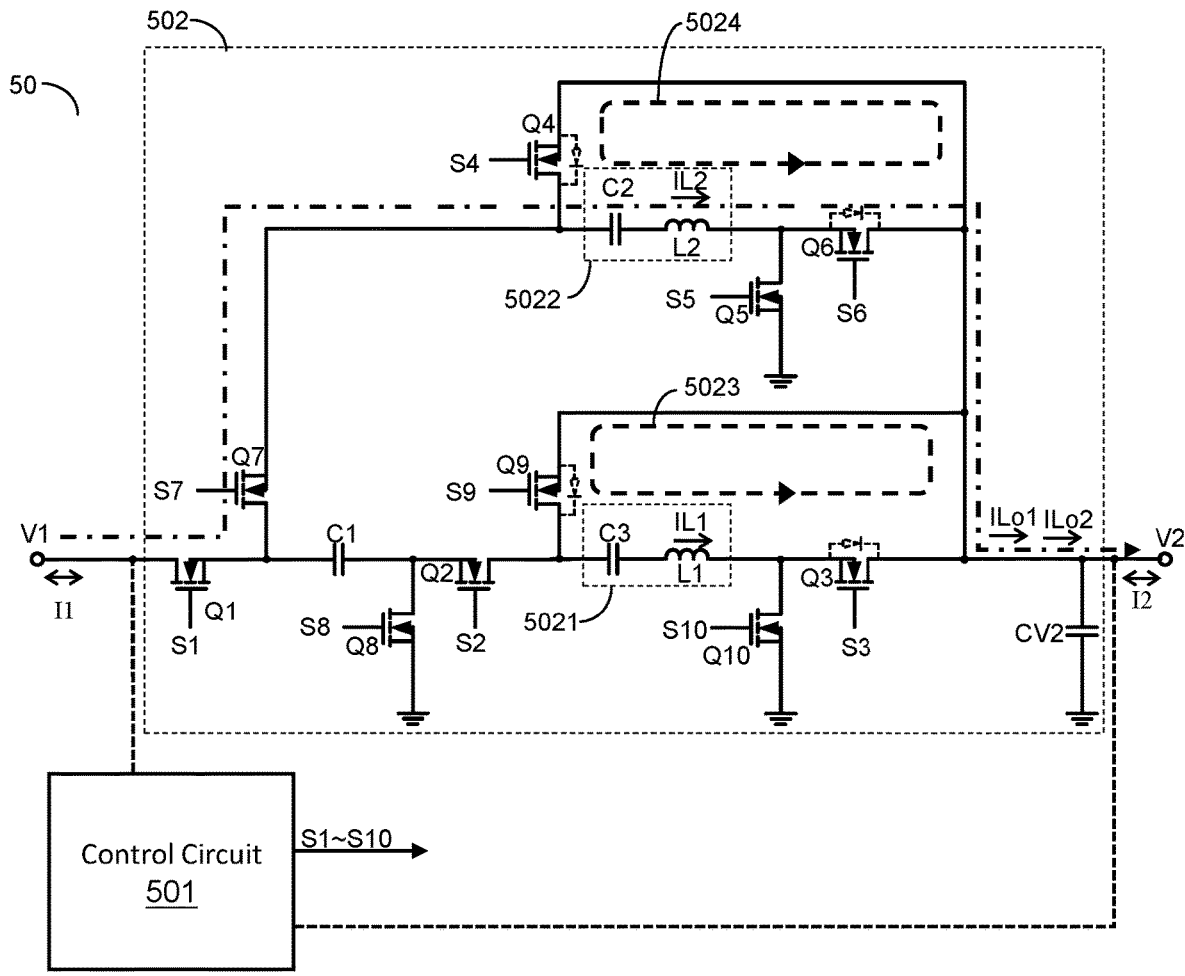
FIG. 6 shows a schematic circuit diagram of a switched capacitor voltage converter circuit according to yet another embodiment of the present invention.

FIG. 6 shows a schematic circuit diagram of a switched capacitor voltage converter circuit according to yet another embodiment of the present invention. The switched capacitor converter 502 of this embodiment is similar to the switched capacitor converter 302 of the embodiment shown in FIG. 4, but is different in that: the inductor L1 of the switched capacitor converter 502 is directly electrically connected in series to the resonant capacitor C3, so that the resonant capacitor C3 and the inductor L1 constitute a resonant tank 5021. The inductor L2 of the switched capacitor converter 502 is directly electrically connected in series to the resonant capacitor C2, so that the resonant capacitor C2 and the inductor L2 constitute a resonant tank 5022. In one embodiment, during a second process, the switches (e.g., the switches Q1~Q10) are configured to operably control the resonant tank 5021 and the non-resonant capacitor C1 to be electrically connected in series between the first voltage V1 and the second voltage V2, and operably control the resonant tank 5022 to be electrically connected in parallel to the second voltage V2. On the other hand, during the first process, the switches (e.g., the switches Q1~Q10) are configured to operably control the resonant tank 5022 and the non-resonant capacitor C1 to be electrically connected in series between the second voltage V2 and a ground potential, and operably control the resonant tank 5021 to be electrically connected in parallel to the second voltage V2. The switched capacitor converter 502 executes power conversion between the first voltage V1 and the second voltage V2 through periodically conducting the above-mentioned operations by resonant operation. In regard to operation details of the switches (e.g., the switches Q1~Q10), please refer to the embodiment shown in FIG. 4.

The control circuit 501 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C.

As shown in FIG. 6, in the unidirectional conduction process, when the switch operation signal S1~S10 control the switches (e.g., when the switch operation signal S1~S10 control switches Q1~Q10 to be non-conductive, respectively), the inductor currents IL1 and IL2 flowing through the corresponding inductors L1 and L2 respectively pass through the body diodes (as shown by the dashed line in FIG. 6) of at least one switch (e.g., the switches Q9 and Q3 and switches Q4 and Q6), and the currents IL1 and IL2 continue freewheeling respectively along the close loops 5023 and 5024 formed by the resonant tanks 5021 and 5022 and the body diodes (as shown by the dashed line in FIG. 6) of at least one switch (e.g., the switches Q9 and Q3 and switches Q4 and Q6), whereby the inductor currents ILo1 and ILo2 stop flowing toward the second voltage V2. As shown in FIG. 6, at least one resonant capacitor C3 and at least one inductor L1 form the resonant tank 5021, and at least one resonant capacitor C2 and at least one inductor L2 form the resonant tank 5022. In this case, the close loop currents (i.e., the inductor currents IL1 and IL2) do not result in a net current flowing into or out of the non-resonant capacitor CV2 (the non-resonant capacitor CV2 can be regarded as the output capacitor).

For example, by means of the conduction of the body diodes of the switches Q9 and Q3, the inductor current IL1 flowing through the corresponding inductor L1 keeps freewheeling along the close loop 5023 formed by the resonant tank 5021 and the body diodes of the switches Q9 and Q3, whereby the inductor current ILo1 stops flowing toward the second voltage V2. By means of the conduction of the body diodes in the switches Q4 and Q6, the inductor current IL2 flowing through the corresponding inductor L2 keeps freewheeling along the close loop 5024 formed by the resonant tank 5022 and the body diodes of the switches Q4 and Q6, whereby the inductor current ILo2 stops flowing toward the second voltage V2. In another embodiment, by means of the conduction of the switches Q9 and Q3, the inductor current IL1 flowing through the corresponding inductor L1 keeps freewheeling along the close loop 5023 formed by the resonant tank 5021 and the switches Q9 and Q3, whereby the inductor current ILo1 stops flowing toward the second voltage V2. Besides, in another embodiment, by means of the conduction of the switches Q4 and Q6, the inductor current IL2 flowing through the corresponding inductor L2 keeps freewheeling along the close loop 5024 formed by the resonant tank 5022 and the switches Q4 and Q6, whereby the inductor current ILo2 stops flowing toward the second voltage V2.

In another embodiment, when the unidirectional conduction process forms a unidirectional conduction path to the first voltage V1, the switch operation signal S1~S10 control the switches (e.g., the switches Q1, Q7 and Q6 are ON, whereas, the switches Q2~Q5 and Q8~Q10 are OFF), so that the inductor L2 and the resonant capacitor C2 are conducted to the first voltage V1 via at least one switch (e.g., the switches Q1, Q7 and Q6) (as indicated by dot-dash line in FIG. 6), and, the inductor L2 and the resonant capacitor C2 are connected in series between the first voltage V1 and the second voltage V2, whereby the inductor current ILo flowing toward the second voltage V2 is a resonant current having a third resonant frequency, wherein the above-mentioned third resonant frequency is different from the first resonant frequency in the first process and the second resonant frequency in the second process.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 7:
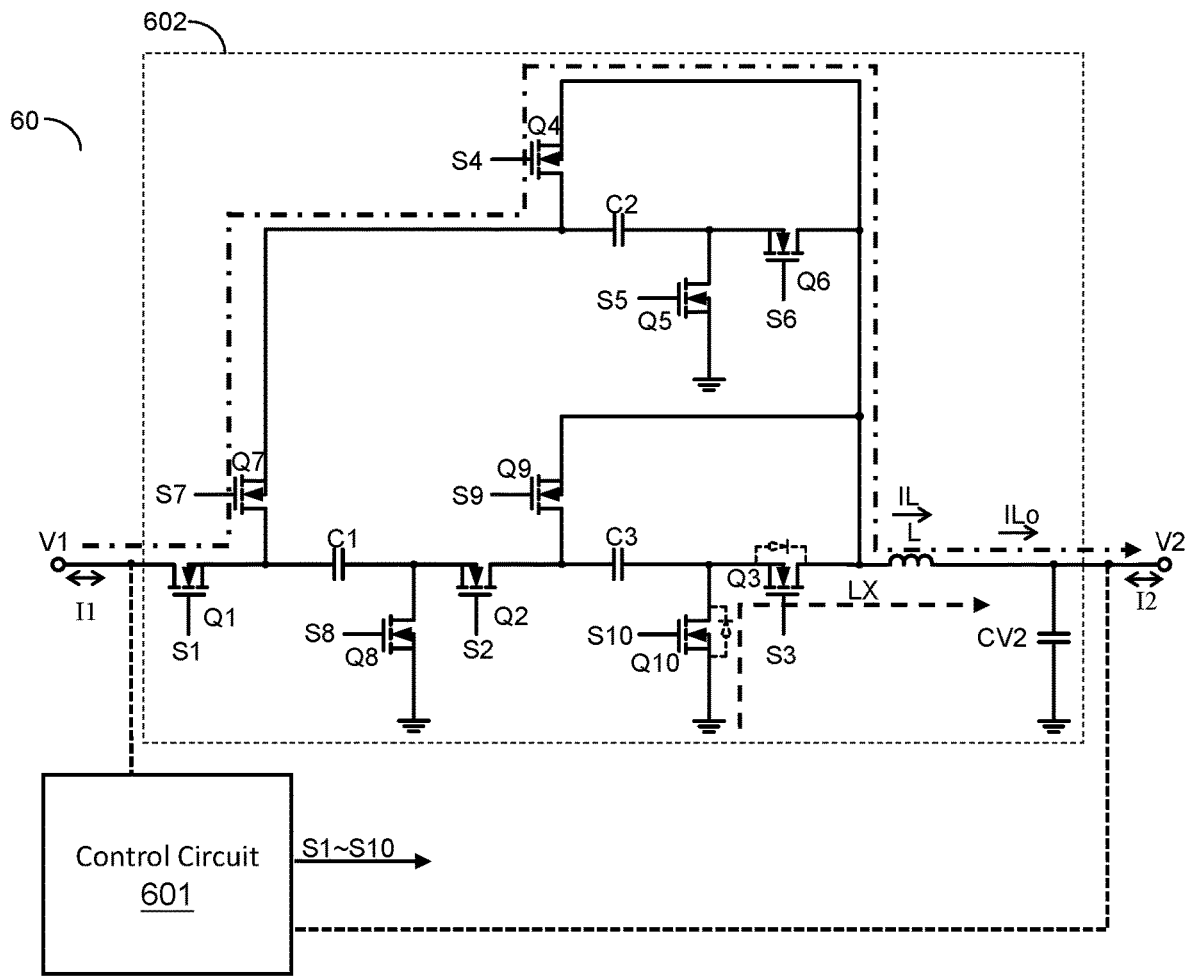
FIG. 7 shows a schematic circuit diagram of a switched capacitor voltage converter circuit according to still another embodiment of the present invention.

FIG. 7 shows a schematic circuit diagram of a switched capacitor voltage converter circuit according to still another embodiment of the present invention. The switched capacitor converter 602 of this embodiment is similar to the switched capacitor converter 402 of the embodiment shown in FIG. 5, but is different in that: the switched capacitor converter 602 shares an inductor L, and the inductor L is coupled between the second voltage V2 and the switching node LX. During a second process, the switches Q1~Q10 control the non-resonant capacitor C1 and the resonant capacitor C3 to be electrically connected in series to the inductor L via the switching node LX, and the series circuit formed by the non-resonant capacitor C1, the resonant capacitor C3 and the inductor L is electrically connected in series between the first voltage V1 and the second voltage V2; and the switches Q1~Q10 control the resonant capacitor C2 to be electrically connected in series to the inductor L via the switching node LX, and the series circuit formed by the resonant capacitor C2 and the inductor L is electrically connected in parallel to the second voltage V2. On the other hand, during a first process, the switches Q1~Q10 control the resonant capacitor C2 and the non-resonant capacitor C1 to be electrically connected in series to the inductor L via the switching node LX, and the series circuit formed by the resonant capacitor C2, the non-resonant capacitor C1 and the inductor L is electrically connected in series between the second voltage V2 and the ground potential; and the switches Q1~Q10 control the resonant capacitor C3 to be electrically connected in series to the inductor L via the switching node LX, and the series circuit formed by the resonant capacitor C3 and the inductor L is electrically connected in parallel to the second voltage V2. In this embodiment, the non-resonant capacitor C1, the resonant capacitor C2, and the resonant capacitor C3 operate together with the inductor L by resonant operation to execute power conversion between the first voltage V1 and the second voltage V2. In regard to operation details of the abovementioned switches Q1~Q10, please refer to the embodiment shown in FIG. 5.

The control circuit 601 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 2C, and please refer to the detailed description of FIG. 2C.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

It is worthwhile noting that, in this embodiment, the charging and discharging operations are executed by resonant operation by a capacitor (or capacitors) in cooperation with an inductor. As a result, this embodiment can effectively reduce surge currents in the charging and discharging operations. Besides, this embodiment can achieve zero current switching or zero voltage switching by the characteristics of resonant operation. The other embodiments which will be described later in the specification, if involving resonant operation, operate in the same way as this embodiment. The details will be explained later.

Figure 8:
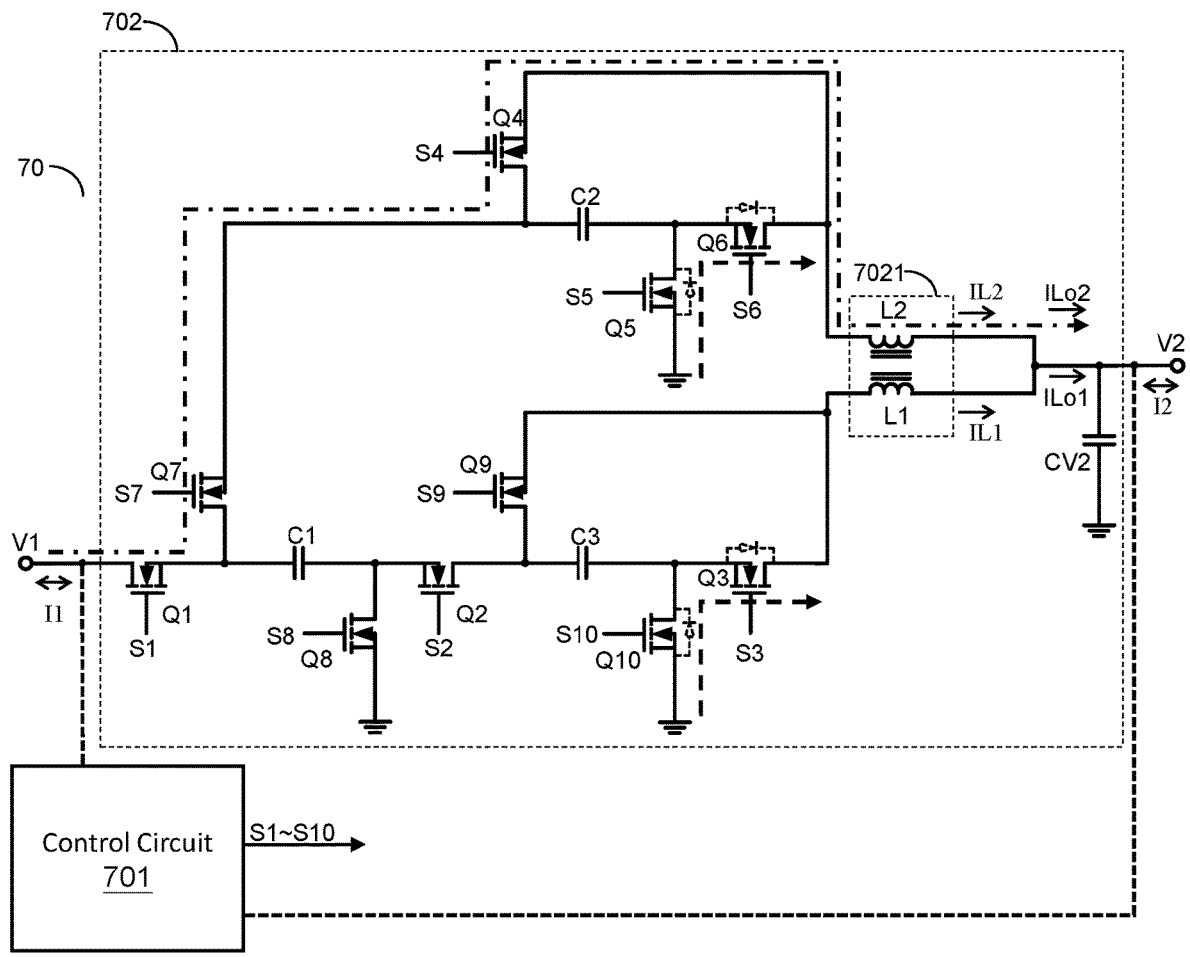
FIG. 8 shows a schematic circuit diagram of a switched capacitor voltage converter circuit according to still another embodiment of the present invention.

FIG. 8 shows a schematic circuit diagram of a switched capacitor voltage converter circuit according to still another embodiment of the present invention. The switched capacitor converter 702 of FIG. 8 is similar to the switched capacitor converter 402 of the embodiment shown in FIG. 5. In this embodiment, the inductor L1 and the inductor L2 of the switched capacitor converter 702 have coupled inductance (i.e., the inductances by interaction between the inductor L1 and the inductor L2); as a consequence, there is better current balance between the inductor current IL1 and the inductor current IL2 of the switched capacitor converter 702 and also a better voltage balance between the capacitor C3 and the capacitor C2 of the switched capacitor converter 702.

The control circuit 701 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 2C, and please refer to the detailed description of FIG. 2C.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

In one embodiment, the inductor L1 and the inductor L2 can be configured as coupled inductors or configured as a transformer (e.g., as shown by reference number 7021 in FIG. 8).

Figure 9:
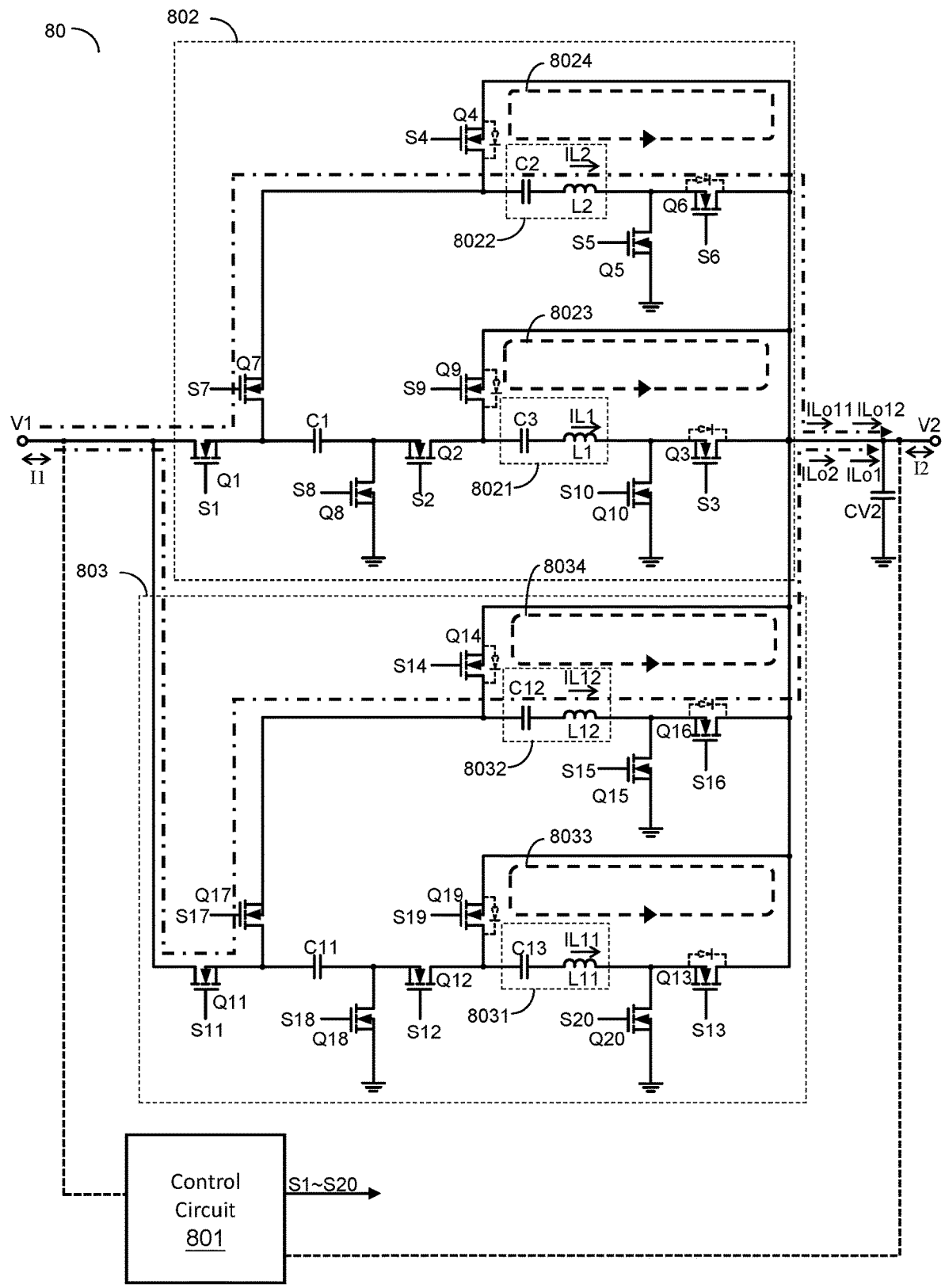
FIG. 9 shows a schematic circuit diagram of a switched capacitor voltage converter circuit according to still another embodiment of the present invention.

FIG. 9 shows a schematic circuit diagram of a switched capacitor voltage converter circuit according to still another embodiment of the present invention. In this embodiment, the switched capacitor voltage converter circuit 80 includes: a first switched capacitor converter 802 and a second switched capacitor converter 803. The first switched capacitor converter 802 and the second switched capacitor converter 803 are coupled in parallel between the first voltage V1 and the second voltage V2. In this embodiment, the first switched capacitor converter 802 and the second switched capacitor converter 803 correspond to, for example, the switched capacitor converter 502 of the embodiment shown in FIG. 6. In this embodiment, through operation of the switched capacitor converters (i.e., the first switched capacitor converter 802 and the second switched capacitor converter 803) coupled in parallel to each other, this embodiment can increase the output power or can reduce the ripples. That the switched capacitors are "coupled in parallel" means that the input ends of the switched capacitor converters are both electrically connected to for example the first voltage V1, whereas, the output ends of the switched capacitor converters are both electrically connected to for example the second voltage V2.

In one embodiment, the first switched capacitor converter 802 and the second switched capacitor converter 803 are configured to respectively control the switches therein in opposite phases, to execute power conversion in an alternating fashion. To elaborate in more detail, in this embodiment, as shown in FIG. 9, switch operation signals S1~S10 for controlling the switches Q1~Q10 of the first switched capacitor converter 802 are in phase with the switch operation signals S1~S10 for controlling the switches Q1~Q10 of the switched capacitor 502 of the embodiment shown in FIG. 6, whereas, switch operation signals S11~S20 for controlling the switches Q11~Q20 of the second switched capacitor converter 803 are in opposite phase with the switch operation signals S11~S20 for controlling the switches Q1~Q10 of the switched capacitor 502 of the embodiment shown in FIG. 6 (i.e., the switch operation signals S11~S20 for controlling the switches Q11~Q20 of the second switched capacitor converter 803 are in opposite phase with the switch operation signals S1~S10 for controlling the switches Q1~Q10 of the first switched capacitor converter 802).

The first switched capacitor converter 802 and the second switched capacitor converter 803 include: an inductor L1, an inductor L2, an inductor L11 and an inductor L12, which are electrically connected in series to a capacitor C3, a capacitor C2, a capacitor C13 and a capacitor C12, respectively, so as to constitute a resonant tank 8021, a resonant tank 8022, a resonant tank 8031 and a resonant tank 8032, respectively. The switched capacitor voltage converter circuit 80 of this embodiment operates the first switched capacitor converter 802 and the second switched capacitor converter 803 in an alternating fashion, so as to execute power conversion in an alternating fashion. Each of the first switched capacitor converter 802 and the second switched capacitor converter 803 is similar to the switched capacitor converter 502 of the embodiment shown in FIG. 6, to execute power conversion by resonant operation.

The control circuit 801 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 6, and please refer to the detailed description of FIG. 6.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 10:
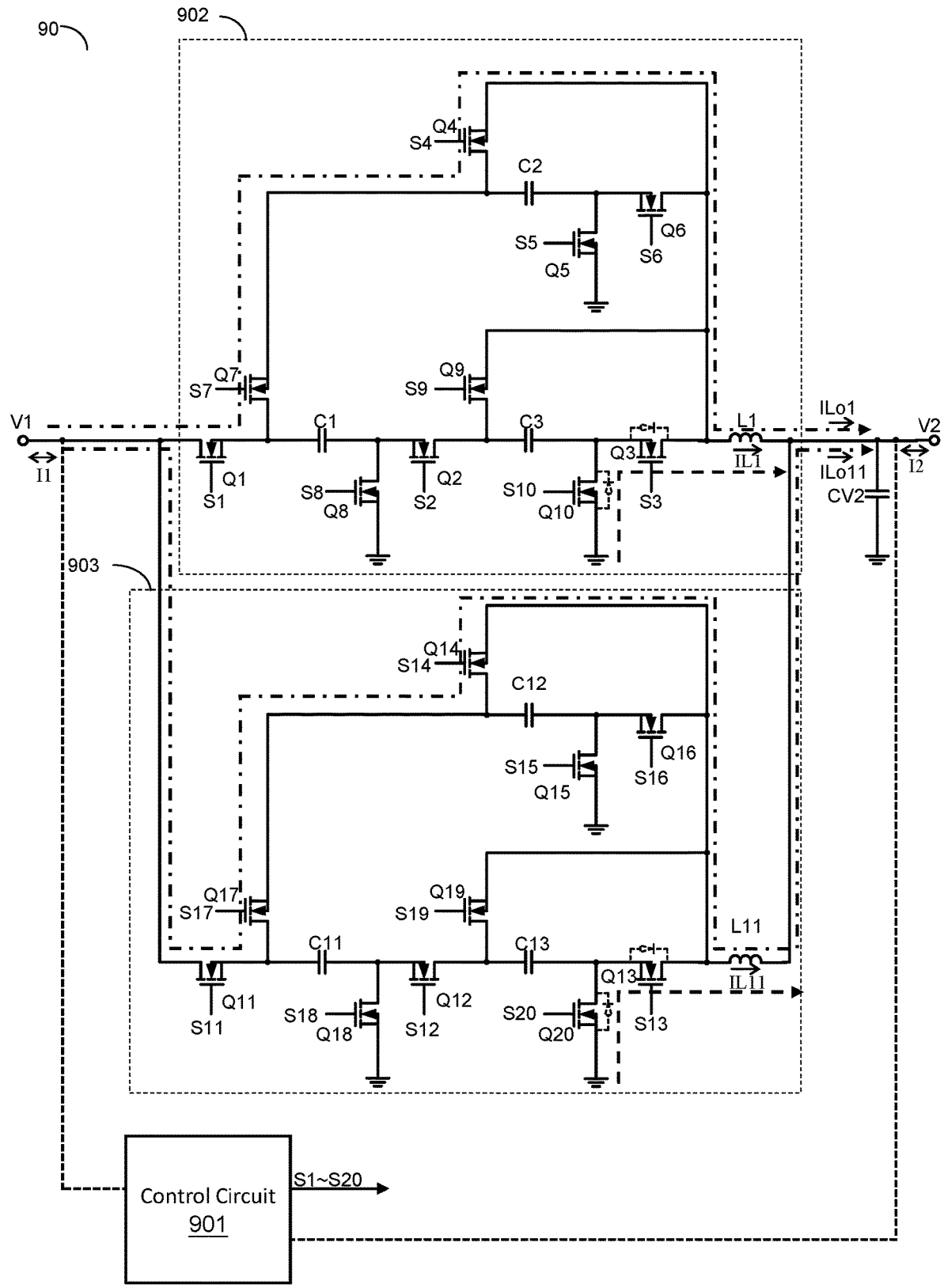
FIG. 10 shows a schematic circuit diagram of a switched capacitor voltage converter circuit according to still another embodiment of the present invention.

FIG. 10 shows a schematic circuit diagram of a switched capacitor voltage converter circuit according to still another embodiment of the present invention. The switched capacitor voltage converter circuit 90 of FIG. 10 is similar to the switched capacitor voltage converter circuit 80 of the embodiment shown in FIG. 9 (i.e., the switched capacitor voltage converter circuit 90 includes a first switched capacitor converter 902 and a second switched capacitor converter 903), but is different in that: the first switched capacitor converter 902 shares one inductor L1 and the second switched capacitor converter 903 shares one inductor L11. The capacitor C3 and the capacitor C2 form a parallel circuit which is electrically connected in series to the inductor L1 in a way similar to the embodiment shown in FIG. 7. The capacitor C13 and the capacitor C12 form a parallel circuit which is electrically connected in series to the inductor L11 in a way similar to the embodiment shown in FIG. 7. Similar to the switched capacitor voltage converter circuit 80 of the embodiment shown in FIG. 9, the switched capacitor voltage converter circuit 90 of this embodiment operates the first switched capacitor converter 902 and the second switched capacitor converter 903 in an alternating fashion, so as to execute power conversion in an alternating fashion. Each of the first switched capacitor converter 902 and the second switched capacitor converter 903 is similar to the switched capacitor 602 of the embodiment shown in FIG. 7, to execute power conversion by resonant operation.

The control circuit 901 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 2C, and please refer to the detailed description of FIG. 2C.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 11:
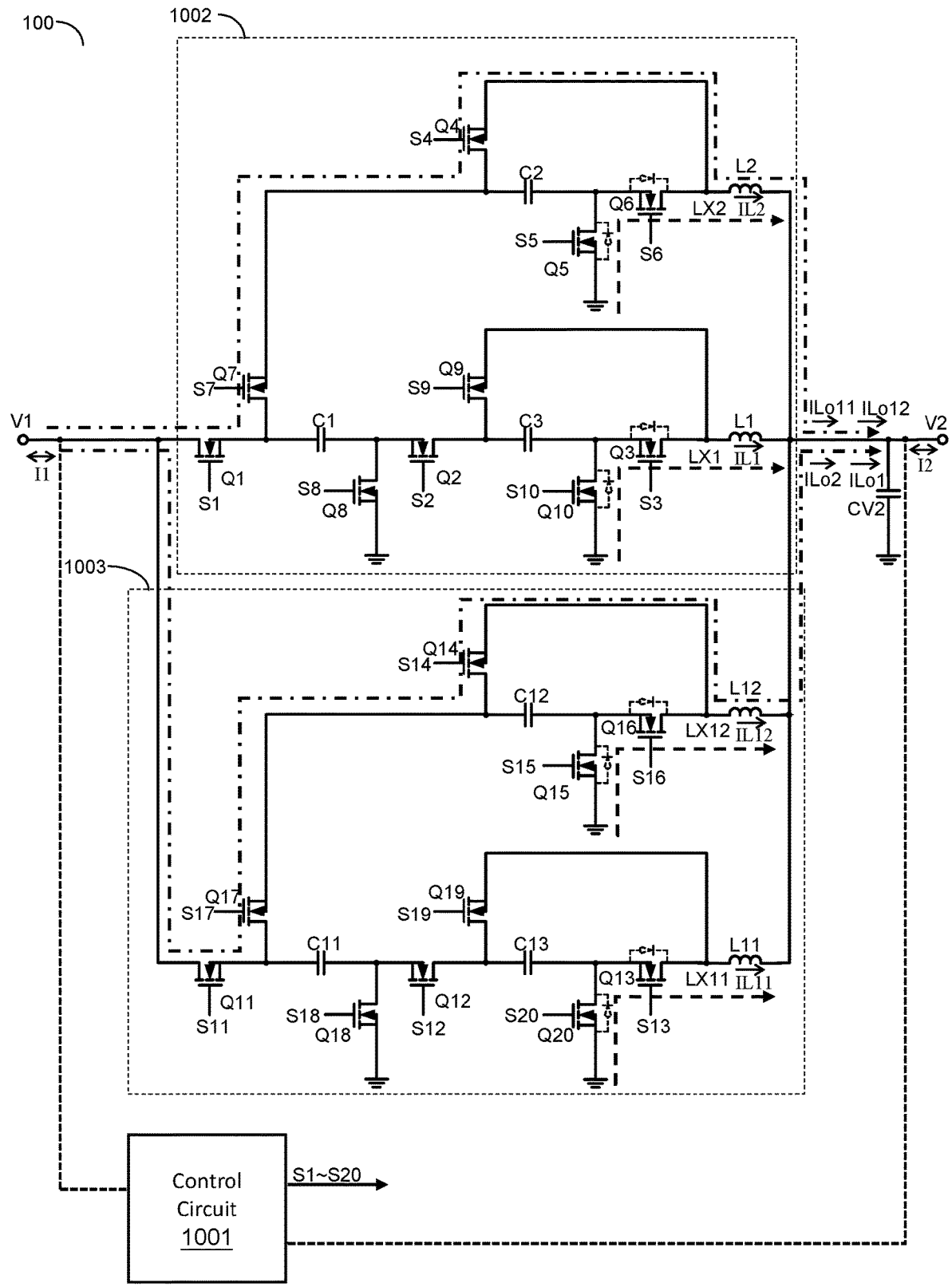
FIG. 11 shows a schematic circuit diagram of a switched capacitor voltage converter circuit according to still another embodiment of the present invention.

FIG. 11 shows a schematic circuit diagram of a switched capacitor voltage converter circuit according to still another embodiment of the present invention. The switched capacitor voltage converter circuit 100 of FIG. 11 is similar to the switched capacitor voltage converter circuit 80 of the embodiment shown in FIG. 9 (i.e., the switched capacitor voltage converter circuit 100 includes a first switched capacitor converter 1002 and a second switched capacitor converter 1003), but is different in that: the inductor L1, the inductor L2, the inductor L11 and the inductor L12 of the first switched capacitor converter 1002 and the second switched capacitor converter 1003 are not directly connected in series to the capacitor C3, the capacitor C2, the capacitor C13 and the capacitor C12, respectively, but are connected in series to the capacitor C3, the capacitor C2, the capacitor C13 and the capacitor C12 via the first switching node LX1, the second switching node LX2, the first switching node LX11 and the second switching node LX12, respectively. Similar to the switched capacitor voltage converter circuit 80 of the embodiment shown in FIG. 9, the switched capacitor voltage converter circuit 100 of FIG. 11 operates the first switched capacitor converter 1002 and the second switched capacitor converter 1003 in an alternating fashion, so as to execute power conversion in an alternating fashion. Each of the first switched capacitor converter 1002 and the second switched capacitor converter 1003 is similar to the switched capacitor converter 402 of the embodiment shown in FIG. 5, to execute power conversion by resonant operation.

The control circuit 1001 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 2C, and please refer to the detailed description of FIG. 2C.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 12:
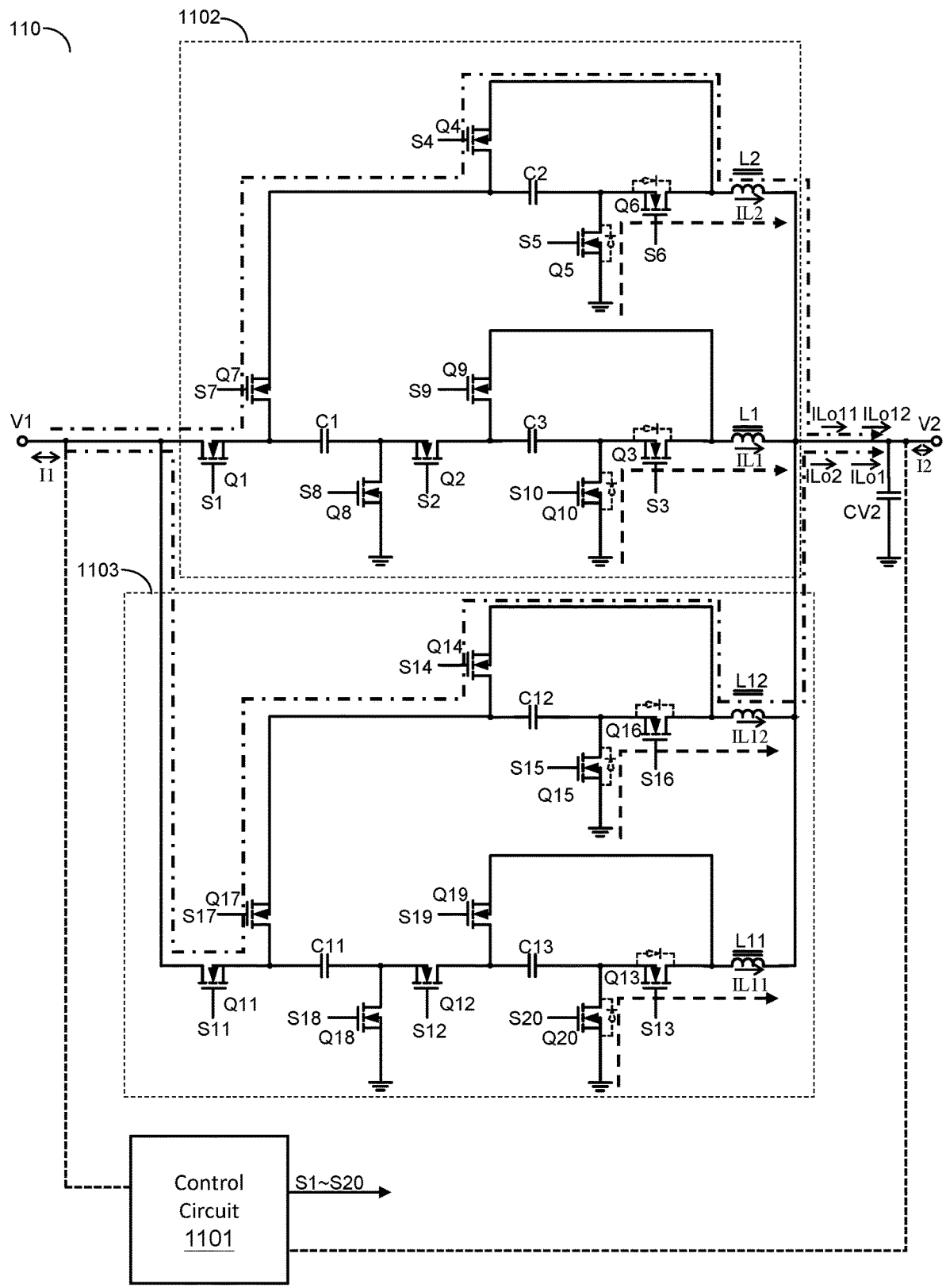
FIG. 12 shows a schematic circuit diagram of a switched capacitor voltage converter circuit according to still another embodiment of the present invention.

FIG. 12 shows a schematic circuit diagram of a switched capacitor voltage converter circuit according to still another embodiment of the present invention. The switched capacitor voltage converter circuit 110 of FIG. 12 is similar to the switched capacitor voltage converter circuit 100 of the embodiment shown in FIG. 11. The inductor L1, the inductor L2, the inductor L11 and the inductor L12 of the switched capacitor voltage converter circuit 110 have coupled inductance among one another. As the consequence, there is better current balance among the inductor current IL1, the inductor current IL2, the inductor current IL11 and the inductor current IL12 of the switched capacitor voltage converter circuit 110, and better voltage balance among the capacitor C3 the capacitor C2, the capacitor C13 and the capacitor C12 of the switched capacitor voltage converter circuit 110. In one embodiment, depending upon practical consideration, it can be arranged so that all four of the inductor L1, the inductor L2, the inductor L11 and the inductor L12 of the switched capacitor voltage converter circuit 110 have coupled inductance among one another or just a part of the above-mentioned four inductors have coupled inductance among one another. In one embodiment, the inductor L1, the inductor L2, the inductor L11 and the inductor L12 can be configured as at least one transformer.

The control circuit 1101 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 2C, and please refer to the detailed description of FIG. 2C.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 13:
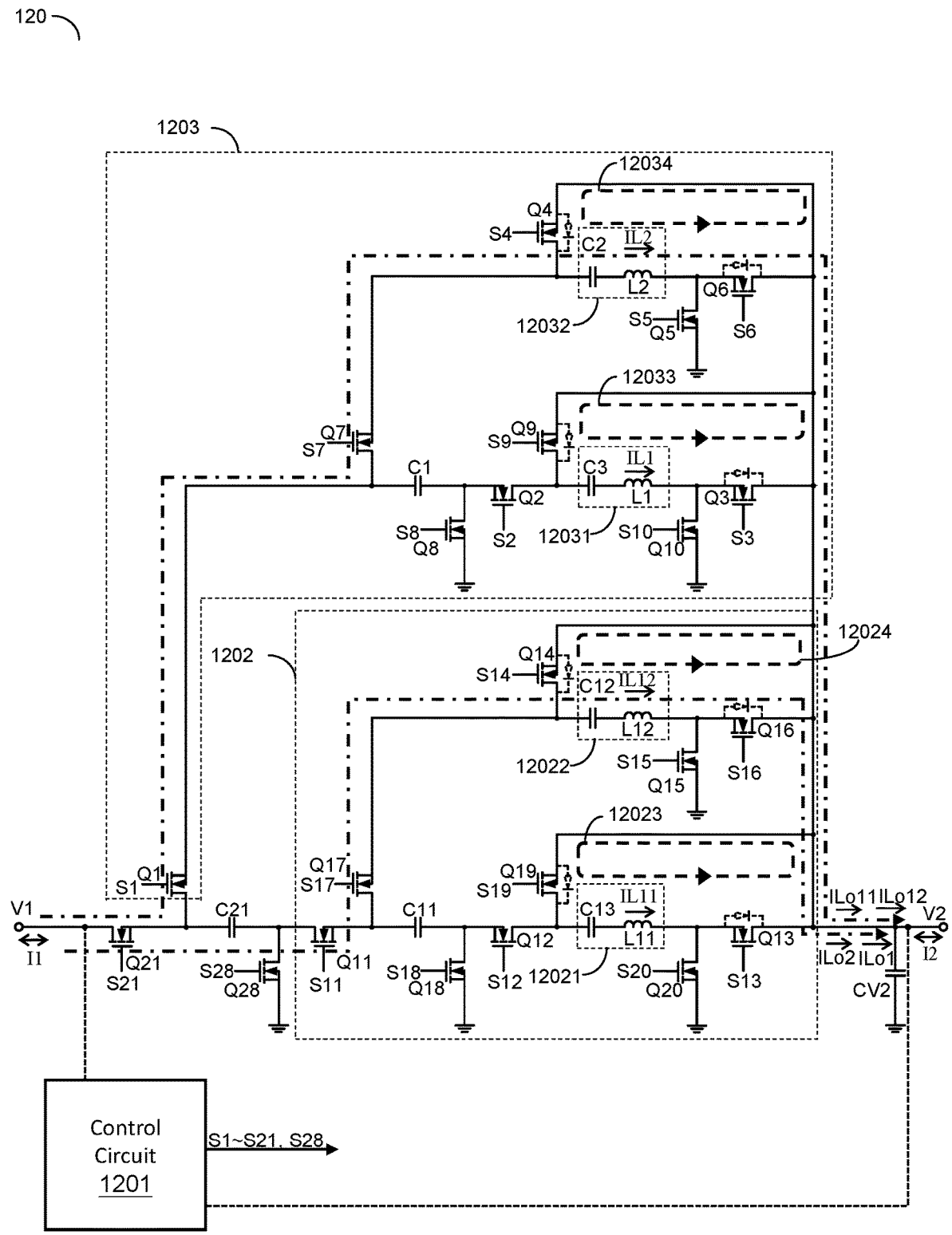
FIG. 13 shows a schematic circuit diagram of a switched capacitor voltage converter circuit according to still another embodiment of the present invention.

FIG. 13 shows a schematic circuit diagram of a switched capacitor voltage converter circuit according to still another embodiment of the present invention. The switched capacitor voltage converter circuit 120 shown in FIG. 13 includes: a first switched capacitor converter 1202, a second switched capacitor converter 1203, an upper layer capacitor (i.e., capacitor C21) and upper layer switches (i.e., switches Q21 and Q28). The first switched capacitor converter 1202 and the second switched capacitor converter 1203 correspond to, for example, the switched capacitor converter 502 of the embodiment shown in FIG. 6. From one perspective, the switched capacitor voltage converter circuit 120 shown in FIG. 13 is a multi-layer structure based on a basic configuration of the switched capacitor converter 502 shown in FIG. 6. To elaborate in more detail, in this embodiment, the upper layer capacitor (i.e., capacitor C21), the upper layer switches (i.e., switches Q21 and Q28), the first switched capacitor converter 1202 and the second switched capacitor converter 1203 are coupled to one another according to a fundamental topology. Please refer to FIG. 14, the "fundamental topology" refers to a structure unit including the upper layer capacitor (i.e., capacitor C21), the upper layer switches (i.e., switches Q21 and Q28), the first switched capacitor converter 1202 and the second switched capacitor converter 1203, and the coupling relationships among them. The details thereof will be described later.

The control circuit 1201 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 6, and please refer to the detailed description of FIG. 6.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 14:
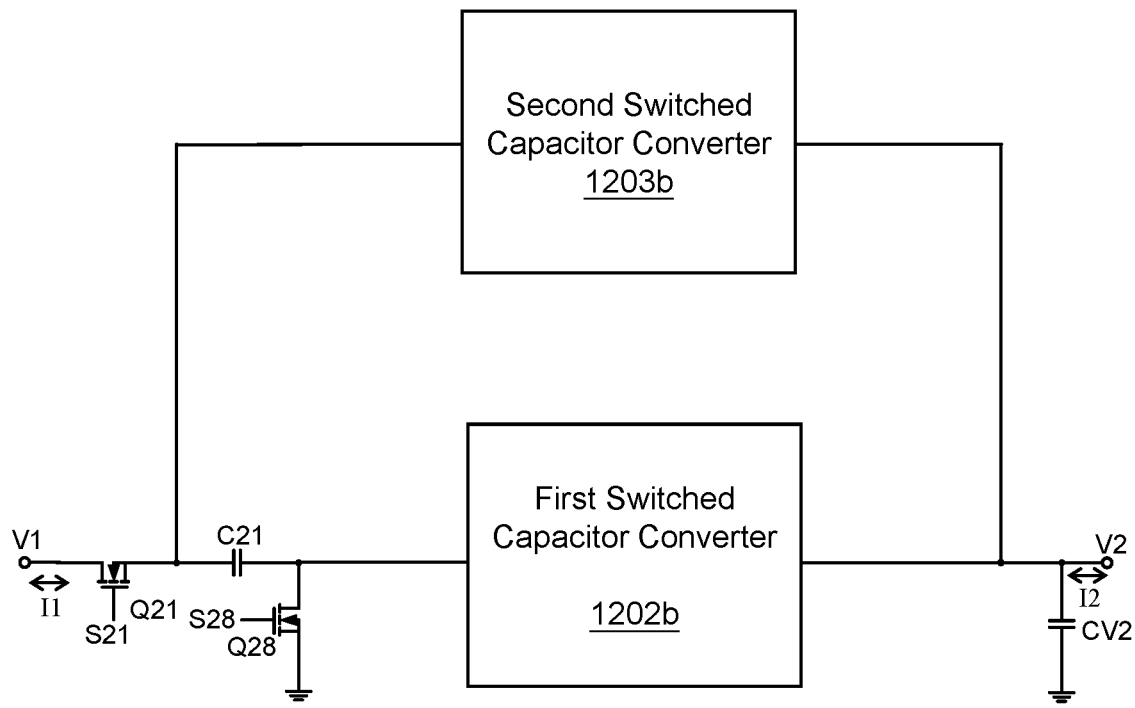
FIG. 14 shows a schematic circuit diagram of a switched capacitor voltage converter circuit according to still another embodiment of the present invention.

In one embodiment, based upon the above-mentioned fundamental topology, an input end of the first switched capacitor converter 1202 (corresponding to the first switched capacitor converter 1202b shown in FIG. 14) is electrically connected to one end of the upper layer capacitor (i.e., capacitor C21), whereas, an input end of the second switched capacitor converter 1203 (corresponding to the second switched capacitor converter 1203b shown in FIG. 14) is electrically connected to the other end of the upper layer capacitor (i.e., capacitor C21). Besides, an output end of the first switched capacitor converter 1202 and an output end of the second switched capacitor converter 1203 are both electrically connected to the second voltage V2.

During a second process (e.g., corresponding to a period wherein the switch operation signals S1~S5, S16~S20 and S28 are at disable level while the switch operation signals S6~S10, S11~S15 and S21 are at enable level), the upper layer switches (i.e., switches Q21 and Q28) and the switches (e.g., Q11~Q20) of the first switched capacitor converter 1202 control the upper layer capacitor (i.e., capacitor C21) to be electrically connected in series to the first switched capacitor converter 1202, so that at least one current path is formed between the first voltage V1 and the second voltage V2, and the upper layer switches (i.e., switches Q21 and Q28) and the switches (e.g., Q1~Q10) of the second switched capacitor converter 1203 control the upper layer capacitor (i.e., capacitor C21) to be disconnected from the second switched capacitor converter 1203, and the upper layer switches (i.e., switches Q21 and Q28) and the switches (e.g., Q1~Q10) of the second switched capacitor converter 1203 control the second switched capacitor converter 1203 to form at least one current path between the second voltage V2 and a ground potential.

On the other hand, during a first process (e.g., corresponding to a period wherein switch operation signals S1~S5, S16~S20 and S28 are at enable level while the switch operation signals S6~S10, S11~S15 and S21 are at disable level), the upper layer switches (i.e., switches Q21 and Q28) and the switches (e.g., Q1~Q10) of the second switched capacitor converter 1203 control the second switched capacitor converter 1203 and the upper layer capacitor (i.e., capacitor C21) to be electrically connected in series between the second voltage V2 and the ground potential, so that at least one current path is formed between the second voltage V2 and the ground potential, and the upper layer switches (i.e., switches Q21 and Q28) and the switches (e.g., Q11~Q20) of the first switched capacitor converter 1202 control the upper layer capacitor (i.e., capacitor C21) to be disconnected from the first switched capacitor converter 1202, and the upper layer switches (i.e., switches Q21 and Q28) and the switches (e.g., Q11~Q20) of the first switched capacitor converter 1202 control the first switched capacitor converter 1202 to form at least one current path between the second voltage V2 and the ground potential.

The above-mentioned current path refers to a current path formed by conductive switches corresponding to the switch operation signals S1~S5, S16~S20 and S28 which are at enable level or the switch operation signals S6~S10, S11~S15 and S21 which are at enable level.

The first switched capacitor converter 1202 and the second switched capacitor converter 1203 are equipped with the resonant tanks shown in the embodiment of FIG. 6, i.e., resonant tanks 12021, 12022, 12031 and 12032, to achieve power conversion between the first voltage V1 and the second voltage V2 by means of the resonant tanks 12021, 12022, 12031 and 12032 by resonant operation.

In this embodiment of FIG. 13, the ratio of the first voltage V1 to the second voltage V2 is equal to 8. To be more specific, in a steady state, the voltage across the resonant capacitor C21 is equal to 4*V2; the voltage across the non-resonant capacitor C1 and the voltage across the non-resonant capacitor C11 (both C1 and C11 correspond to the non-resonant capacitor in the aforementioned embodiment) are equal to 2*V2; the voltage across the resonant capacitor C3, the voltage across the resonant capacitor C13 (both C3 and C13 correspond to the resonant capacitor in the aforementioned embodiment), the voltage across the resonant capacitor C2 and the voltage across the resonant capacitor C12 (both C2 and C22 correspond to the resonant capacitor in the aforementioned embodiment) are equal to V2.

Please refer to FIG. 14. The present invention can recursively expand layers of the pipeline switched capacitor voltage converter circuit based on the fundamental topology shown in FIG. 14, so as to achieve higher scaling factor of conversion between the first voltage V1 and the second voltage V2. As shown in FIG. 14, any pipeline switched capacitor voltage converter circuit complying with the fundamental topology shown in FIG. 14 can be employed to replace the first switched capacitor converter 1202 and the second switched capacitor converter 1203 (e.g., each of the first switched capacitor converter 1202b and the second switched capacitor converter 1203b can be an N-layers pipeline switched capacitor voltage converter circuit shown in FIG. 14, wherein N is an integer greater than or equal to two), so that the pipeline switched capacitor voltage converter circuit have even more layers. That is, under such situation, the pipeline switched capacitor voltage converter circuit 120b will become a pipeline switched capacitor voltage converter circuit having (N+1) layers.

As an example, assuming that the first switched capacitor converter 1202b and the second switched capacitor converter 1203b shown in FIG. 14 are each replaced by a pipeline switched capacitor voltage converter circuit 120 shown in FIG. 13, then the pipeline switched capacitor voltage converter circuit 120b shown in FIG. 14 will become a pipeline switched capacitor voltage converter circuit having a conversion ratio of 16:1. Repeating such replacement recursively, the conversion ratio can be increased even more.

In this embodiment (i.e., a pipeline switched capacitor voltage converter circuit having a ratio of 16:1), the first switched capacitor converter 1202 and the second switched capacitor converter 1203 shown in FIG. 13 are regarded as a bottom layer (which is the first layer) of the pipeline switched capacitor voltage converter circuit, which has a configuration corresponding to, for example, the switched capacitor converter 502 of the embodiment shown in FIG. 6; the pipeline switched capacitor voltage converter circuit 120 shown in FIG. 13 can be regarded as a 2-layers pipeline switched capacitor voltage converter circuit; if each of the first switched capacitor converter 1202b and the second switched capacitor converter 1203b shown in FIG. 14 is replaced by a 2-layers pipeline switched capacitor voltage converter circuit 120 shown in FIG. 13, then the pipeline switched capacitor voltage converter circuit 120b shown in FIG. 14 will become a 3-layers pipeline switched capacitor voltage converter circuit.

Figure 15:
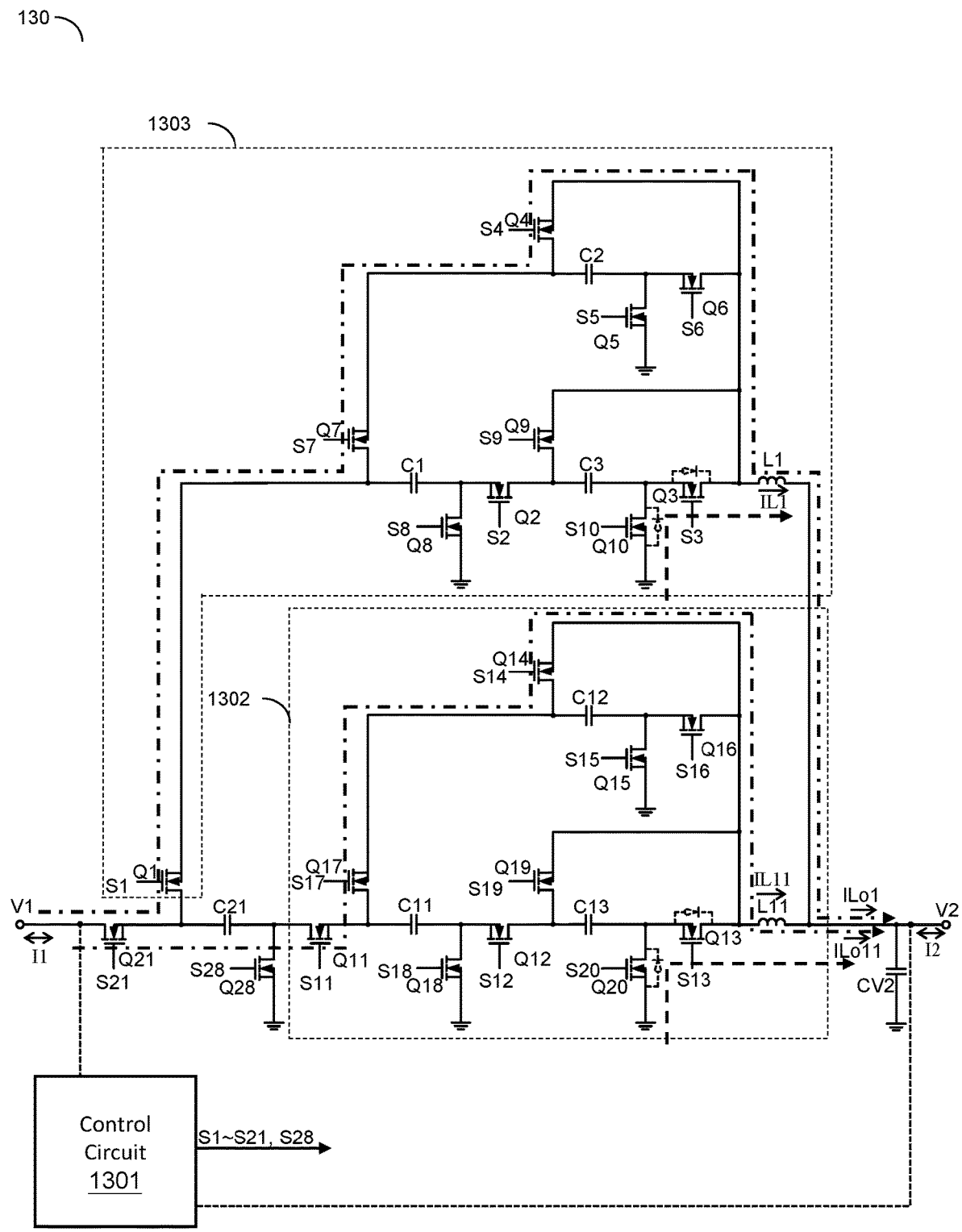
FIG. 15 shows a schematic circuit diagram of a switched capacitor voltage converter circuit according to still another embodiment of the present invention.

FIG. 15 shows a schematic circuit diagram of a switched capacitor voltage converter circuit according to still another embodiment of the present invention. The switched capacitor voltage converter circuit 130 shown in FIG. 15 is similar to the switched capacitor voltage converter circuit 120 shown in FIG. 13, but is different in that: the first switched capacitor converter 1302 shares the inductor L11, and the second switched capacitor converter 1303 shares the inductor L1. Similar to FIG. 7, the capacitors C3 and C2 are connected in parallel and the parallel circuit is connected in series with the inductor L1, and the capacitors C13 and C12 are connected in parallel and the parallel circuit is connected in series with the inductor L11. Similar to the switched capacitor voltage converter circuit 120 of FIG. 13, the present embodiment alternatingly operates the first switched capacitor converter 1302 and the second switched capacitor converter 1303 to perform power conversion, wherein each of the first switched capacitor converter 1302 and the second switched capacitor converter 1303 is similar to the switched capacitor converter 602 in FIG. 7, which performs power conversion by resonant operation.

The control circuit 1301 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 6, and please refer to the detailed description of FIG. 6.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 16:
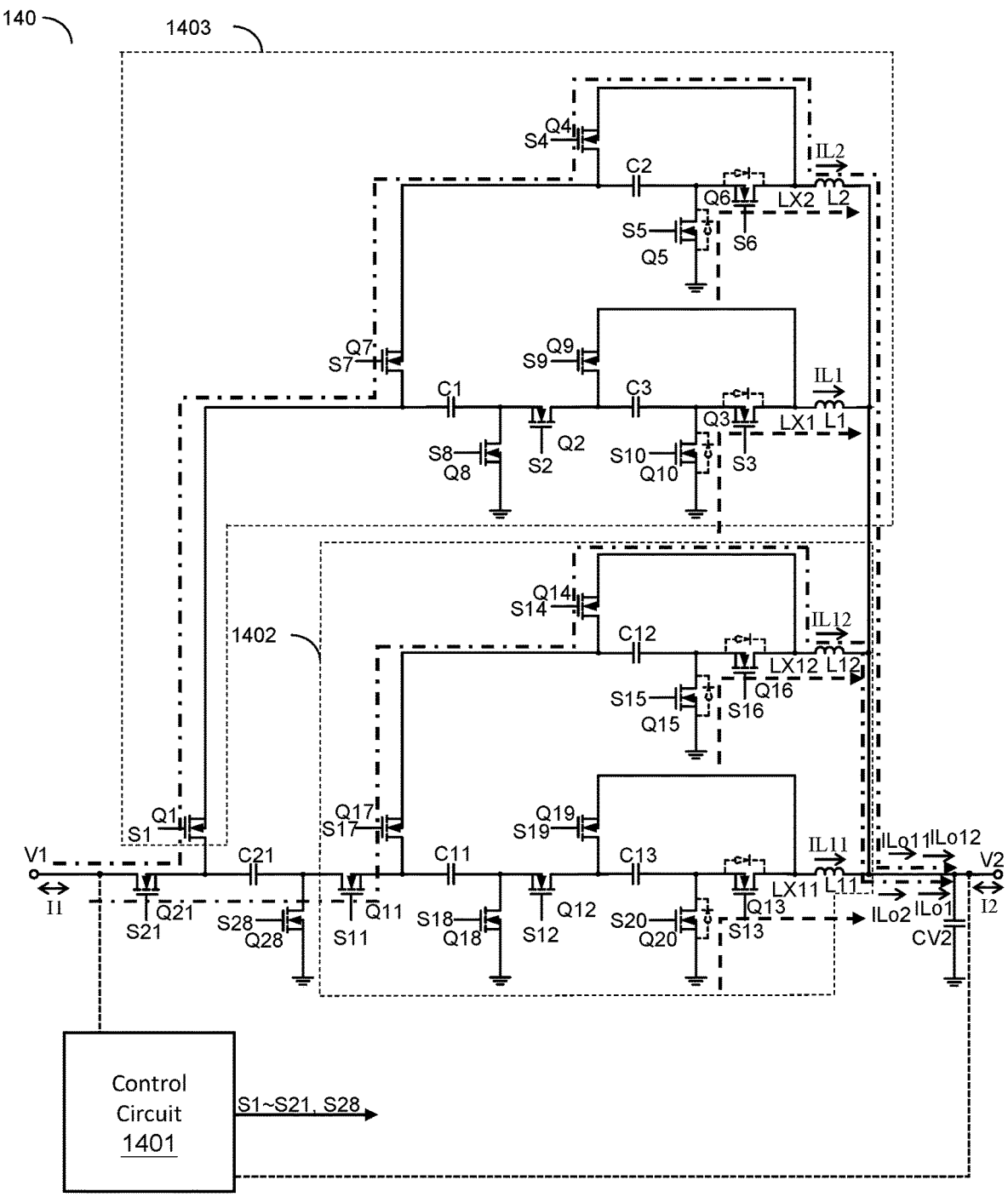
FIG. 16 shows a schematic circuit diagram of a switched capacitor voltage converter circuit according to still another embodiment of the present invention.

FIG. 16 shows a schematic circuit diagram of a switched capacitor voltage converter circuit according to still another embodiment of the present invention. The switched capacitor voltage converter circuit 140 of FIG. 16 is similar to the switched capacitor voltage converter circuit 120 of the embodiment shown in FIG. 13, but is different in that: the inductors L11 and L12 of the first switched capacitor converter 1402 and the inductors L1 and L2 of the second switched capacitor converter 1403 are not directly connected in series with the capacitors C3, C2, C13 and C12, but instead, these inductors are connected in series with the capacitors C3, C2, C13 and C12 through the first switching node LX1, the second switching node LX2, the first switching node LX11 and the second switching node LX12. The switched capacitor voltage converter circuit 140 executes power conversion between the first voltage V1 and the second voltage V2 by resonant operation which is similar to the switched capacitor voltage converter circuit 120 of the embodiment shown in FIG. 13 via the inductors L1, L2, L11 and L12 and the resonant capacitors corresponding to the inductors L1, L2, L11 and L12. In this embodiment, the ratio of the first voltage V1 of the first voltage V1 to the second voltage V2 of the second voltage V2 is also equal to 8.

The control circuit 1401 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 6, and please refer to the detailed description of FIG. 6.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 17:
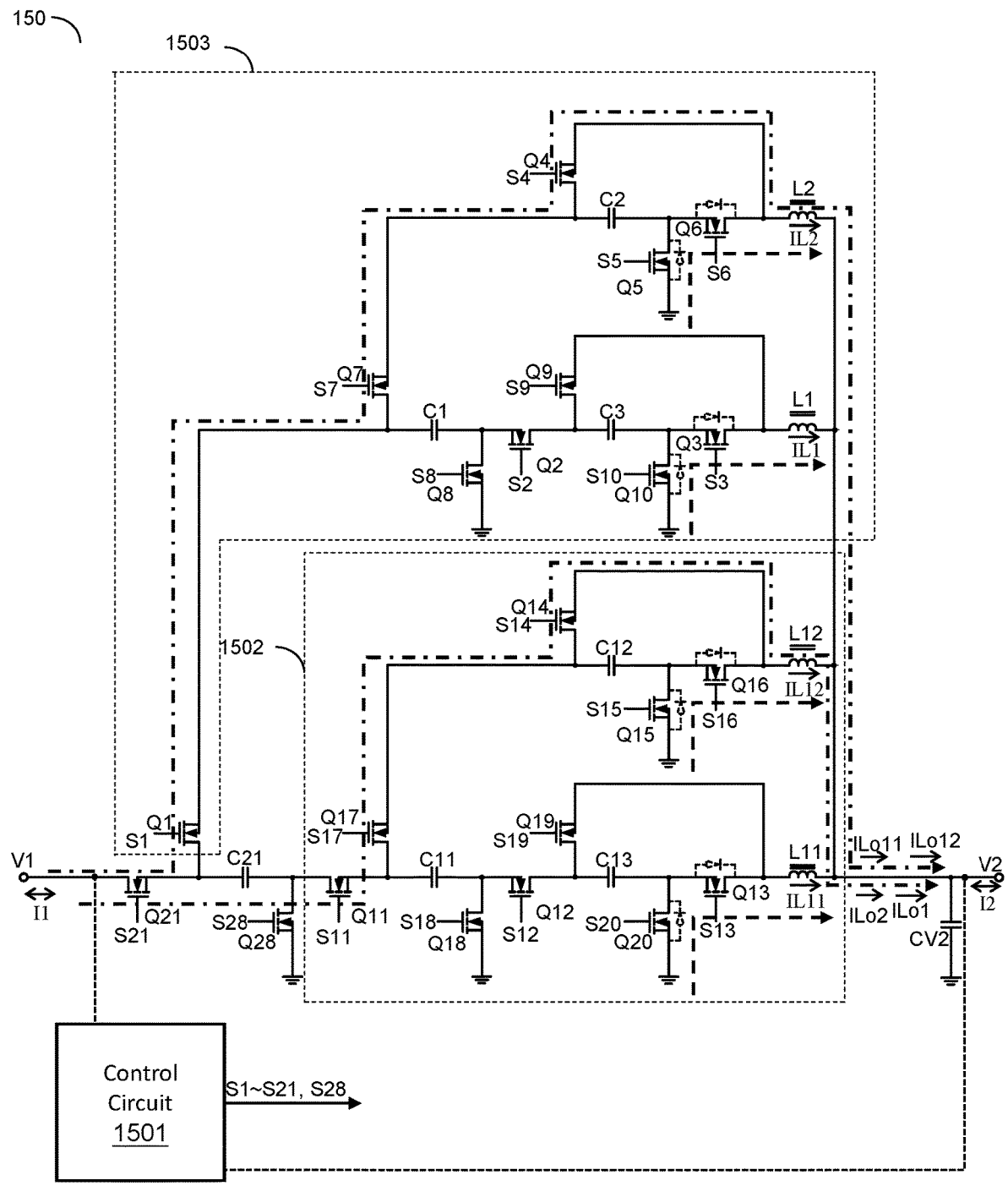
FIG. 17 shows a schematic circuit diagram of a switched capacitor voltage converter circuit according to still another embodiment of the present invention.

FIG. 17 shows a schematic circuit diagram of a switched capacitor voltage converter circuit according to still another embodiment of the present invention. The switched capacitor voltage converter circuit 150 of FIG. 17 is similar to the switched capacitor voltage converter circuit 140 of the embodiment shown in FIG. 16. The inductor L1, the inductor L2, the inductor L11 and the inductor L12 of the switched capacitor voltage converter circuit 150 have coupled inductance among one another; as a consequence, there is better current balance among the inductor current IL1, the inductor current IL2, the inductor current IL11 and the inductor current IL12 of the switched capacitor voltage converter circuit 150, and there is better voltage balance among the capacitor C1, the capacitor C2, the capacitor C11 and the capacitor C12 of the switched capacitor voltage converter circuit 150. In one embodiment, depending upon practical consideration, the switched capacitor voltage converter circuit 150 can arrange all of the inductor L1, the inductor L2, the inductor L11 and the inductor L12 to have coupled inductance among one another or just a part of the above-mentioned four inductors to have coupled inductance among one another. In one embodiment, the inductor L1, the inductor L2, the inductor L11 and the inductor L12 can be configured as at least one transformer.

The control circuit 1501 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 6, and please refer to the detailed description of FIG. 6.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 18A:
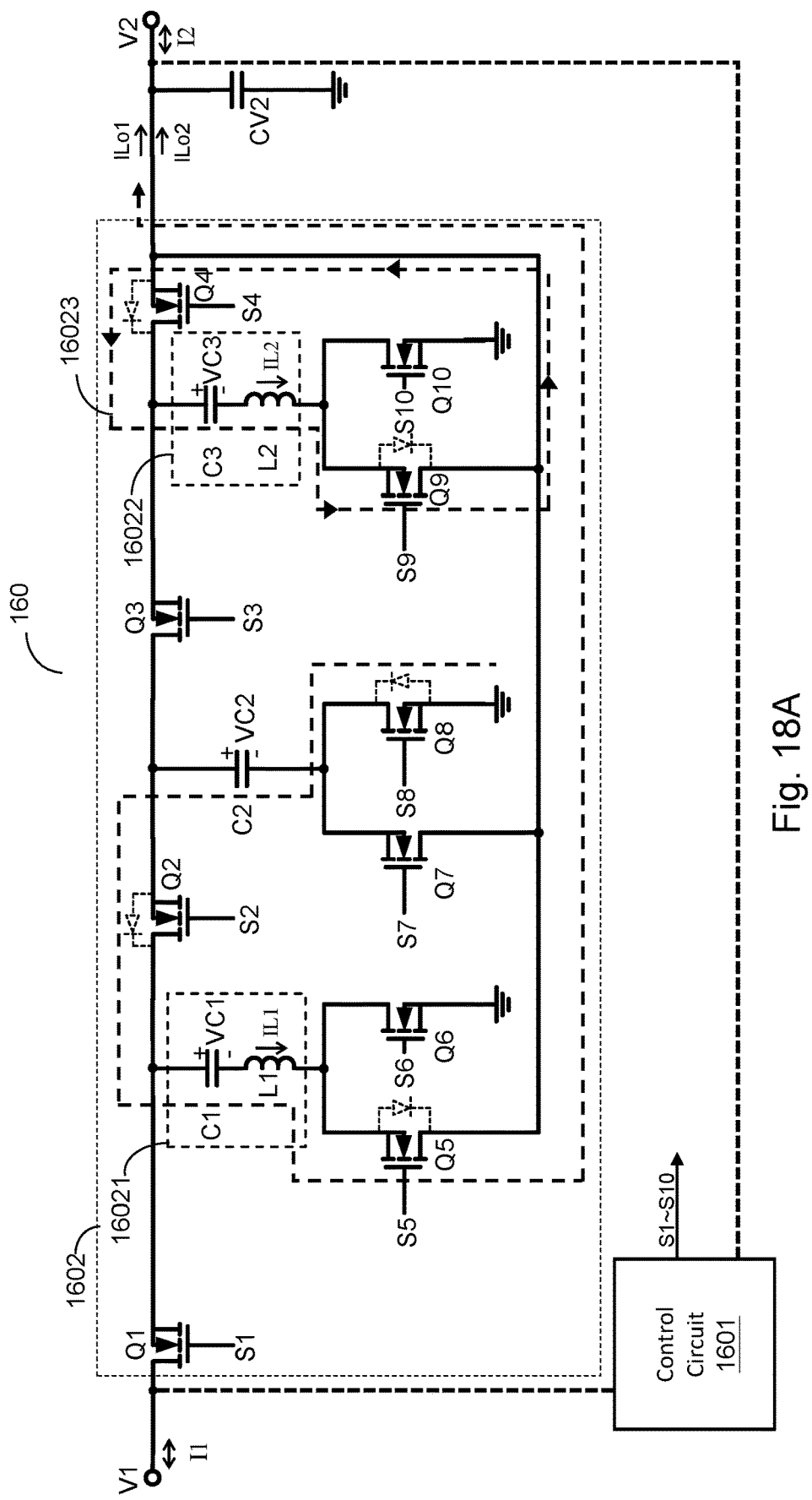
FIG. 18A shows a schematic circuit diagram of a switched capacitor voltage converter circuit according to still another embodiment of the present invention.

FIG. 18A shows a schematic circuit diagram of a switched capacitor voltage converter circuit according to still another embodiment of the present invention. As shown in FIG. 18A, the switched capacitor voltage converter circuit 160 includes resonant capacitors C1 and C3, at least one non-resonant capacitor C2, switches Q1~Q10, resonant inductors L1 and L2, and a control circuit 1601.

As shown in FIG. 18A, in one embodiment, the control circuit 1601 is configured to operably generate switch operation signals S1, S3, S5, S8 and S9 corresponding to a first resonant process and switch operation signals S2, S4, S6, S7 and S10 corresponding to a second resonant process, so as to operate the switches Q1~Q10 to switch electrical connection relationships of the resonant capacitors C1 and C3 and the at least one non-resonant capacitor C2. The switched capacitor voltage converter circuit 160 includes at least one resonant tank (e.g., resonant tanks 1602 and 1603), wherein the resonant tank 1602 includes a resonant capacitor C1 and a resonant inductor L1 which are connected in series to each other, whereas, the resonant tank 1603 includes a resonant capacitor C3 and a resonant inductor L2 which are connected in series to each other. The switches Q1~Q10 are coupled to the at least one resonator (e.g., resonant tanks 1602 and 1603). The switches Q1~Q10 are configured to operably switch electrical connection relationships of the resonant tanks 1602 and 1603 according to the switch operation signals S1, S3, S5, S8 and S9 and the switch operation signals S2, S4, S6, S7 and S10 in correspondence to the second process and the first process, respectively. In the second process, a resonant charging operation is performed on the resonant tanks 1602 and 1603. In the first process, a resonant discharging operation is performed on the resonant tanks 1602 and 1603. The at least one non-resonant capacitor C2 is coupled to the at least one resonator (e.g., resonant tanks 1602 and 1603). The electrical connection relationship of the non-resonant capacitor C2 with the at least one resonator (e.g., resonant tanks 1602 and 1603) is controlled according to the switch operation signals S1, S3, S5, S8 and S9 and the switch operation signals S2, S4, S6, S7 and S10. The voltage across the at least one non-resonant capacitor C2 has a constant ratio to the first voltage V1 of the first voltage V1. For example, in this embodiment, the voltage across the at least one non-resonant capacitor C2 is ½ of the first voltage V1. The first process and the second process are performed sequentially and repetitively, to convert the first voltage V1 to the second voltage V2 or to convert the second voltage V2 to the first voltage V1. The switch operation signals S1, S3, S5, S8 and S9 and the switch operation signals S2, S4, S6, S7 and S10 have respective ON periods which do not overlap one another, so that the first process and the second process do not overlap each other.

In the second process, according to the switch operation signals S1, S3, S5, S8 and S9 and the switch operation signals S2, S4, S6, S7 and S10, the switches Q1, Q3, Q5, Q8 and Q9 are controlled to be ON, whereas, the switches Q2, Q4, Q6, Q7 and Q10 are controlled to be OFF, so that a series connection of the resonant capacitor C1 of the resonant tank 1602 and the resonant inductor L1 is formed between the first voltage V1 and the second voltage V2 and so that a series connection of the non-resonant capacitor C2 and the resonant capacitor C3 and the resonant inductor L2 of the resonant tank 1603 is formed between a ground potential and the second voltage V2, and to thereby charge the resonant capacitors C1 and C3 and to thereby discharge the non-resonant capacitor C2. In the first process, according to the switch operation signals S1, S3, S5, S8 and S9 and the switch operation signals S2, S4, S6, S7 and S10, the switches Q2, Q4, Q6, Q7 and Q10 are controlled to be ON, whereas, the switches Q1, Q3, Q5, Q8 and Q9 are controlled to be OFF, so that a series connection of the non-resonant capacitor C2 and the resonant capacitor C1 and the resonant inductor L1 of the resonant tank 1602 is formed between a ground potential and the second voltage V2 and so that a series connection of the resonant capacitor C3 and the resonant inductor L2 of the resonant tank 1603 is formed between a ground potential and the second voltage V2, and to thereby discharge the resonant capacitors C1 and C3 and to thereby charge the non-resonant capacitor C2.

Figure 18B:
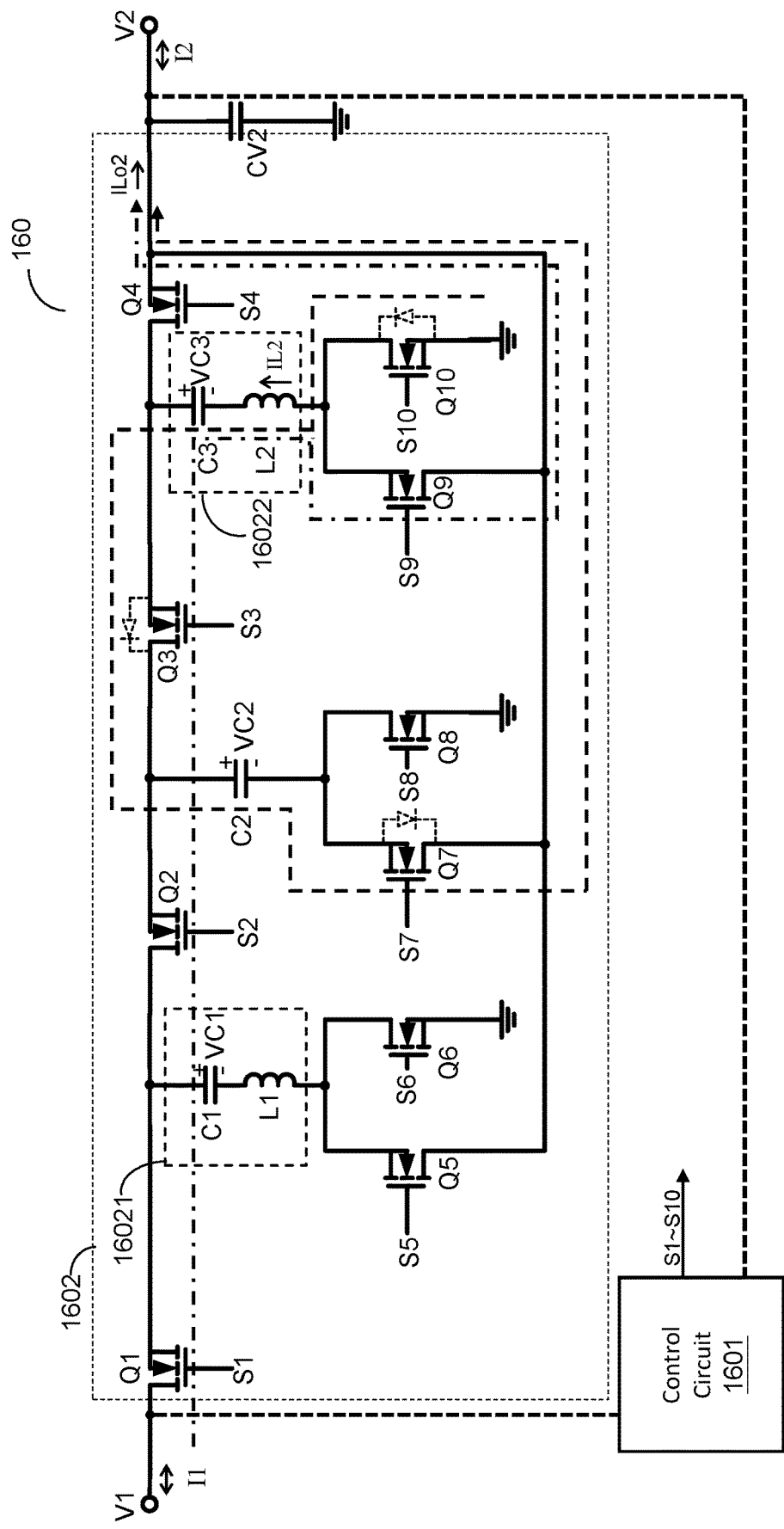
FIG. 18B shows a schematic circuit diagram of a switched capacitor voltage converter circuit according to still another embodiment of the present invention.

In regard to how the resonant tanks 1602 and 1603 of the switched capacitor voltage converter circuit 150 shown in FIGS. 18A and 18B operate, this is well known to those skilled in the art, so the details thereof are not redundantly explained here.

The control circuit 1601 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C.

As shown in FIG. 18A, in the unidirectional conduction process, when the switch operation signals S1~S10 control the switches (e.g., when the switch operation signals S1~S10 control switches Q1~Q10 to be non-conductive, respectively), one end of the inductor L1 is conducted by the body diodes (as shown by the dashed line in FIG. 18A) of at least one switch (such as switches Q8 and Q2) to a DC potential, so that the inductor currents ILo1 flowing toward the second voltage V2 is a resonant current having a third resonant frequency, wherein the above-mentioned third resonant frequency is different from the first resonant frequency in the first process and the second resonant frequency in the second process. In the example of this embodiment, the inductor La is connected in series between the second voltage V2 and the ground potential through the body diodes of the switches Q8, Q2, and Q5. Thus, the inductor current IL1 keeps freewheeling according to the current directions shown by the dashed arrow in FIG. 18A.

Please continue referring to FIG. 18A, in the unidirectional conduction process, when the switch operation signal S1~S10 control the switches (e.g., when the switch operation signal S1~S10 control switches Q1~Q10 to be non-conductive, respectively), the inductor current IL2 flowing through the corresponding inductor L2 is conducted by the body diodes (as shown by the dashed line in FIG. 18A) of at least one switch (e.g., the switches Q4 and Q9), and the inductor current IL2 keeps freewheeling along a close loop 16023 formed by the resonant tank 16022 and the body diodes (as shown by the dashed line in FIG. 18A) of at least one switch (e.g., the switches Q4 and Q9), whereby the inductor current ILo2 stops flowing toward the second voltage V2. Under such circumstance, the close loop current (i.e., the inductor current IL2) does not result in a net current flowing into or out of the non-resonant capacitor CV2 (the non-resonant capacitor CV2 can be regarded as the output capacitor).

Referring to FIG. 18B, in the unidirectional conduction process, when the switch operation signals S1~S10 control the switches (e.g., when the switch operation signals S1~S10 control switches Q1~Q10 to be non-conductive, respectively), one end of the corresponding inductor L2 is conducted by the body diode (as shown by the dashed line in FIG. 18B) of at least one switch (such as the switch Q10) to a DC potential, so that the inductor current ILo2 flowing toward the second voltage V2 is a resonant current having a third resonant frequency, wherein the above-mentioned third resonant frequency is different from the first resonant frequency in the first process and the second resonant frequency in the second process. In the example of this embodiment, the inductor L2 is connected in series between the second voltage V2 and the ground potential through the body diodes of the switches Q10, Q3 and Q7. Thus, the inductor current IL2 keeps freewheeling according to the current direction shown by the dashed arrow in FIG. 18B. In another embodiment, when the unidirectional conduction process forms a unidirectional conduction path to the first voltage V1, the unidirectional conduction process is performed in a way similar to that described with reference to FIG. 6, and please refer to the detailed description of FIG. 6.

Figure 19:
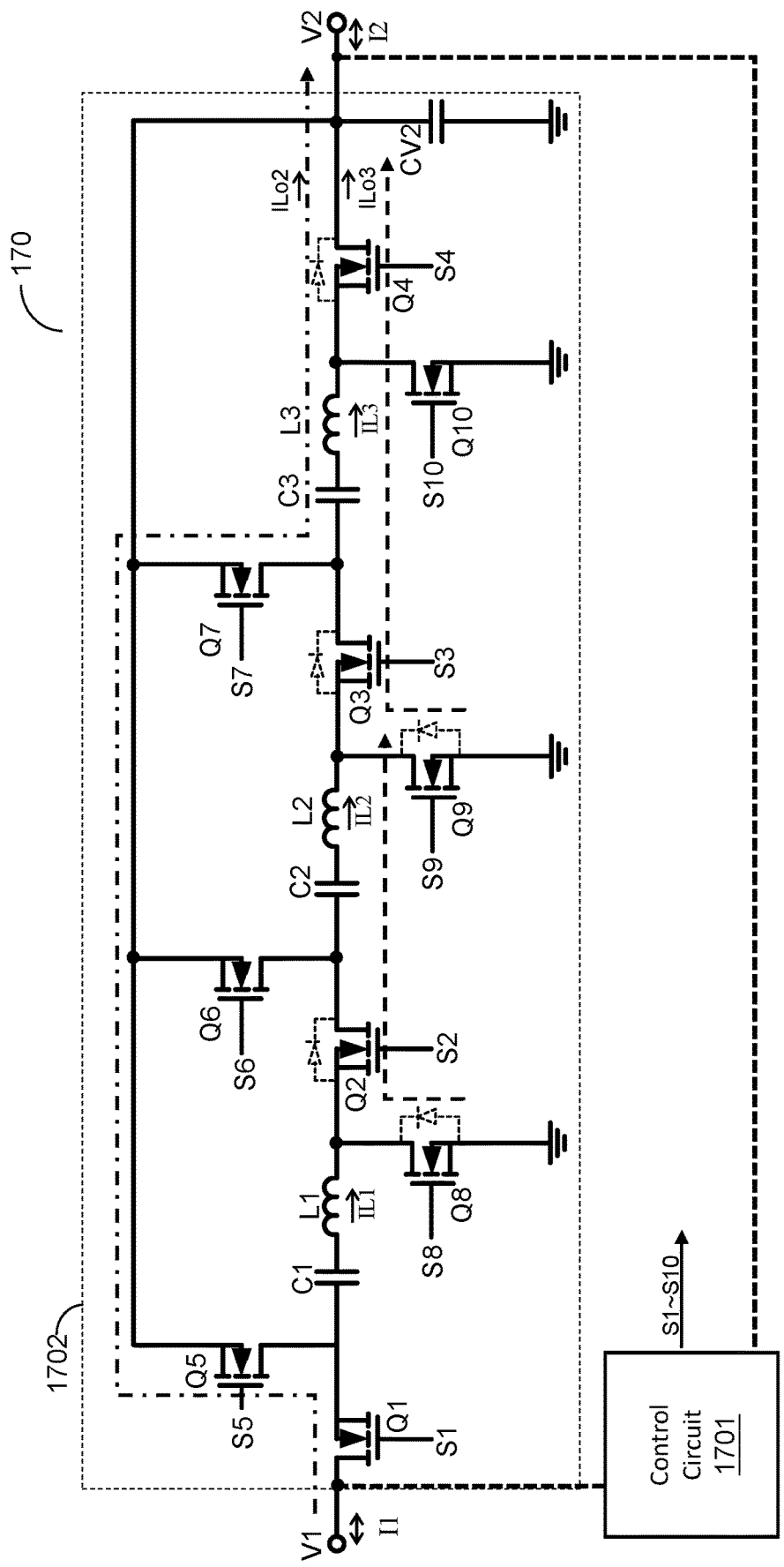
FIG. 19 shows a schematic circuit diagram of a switched capacitor voltage converter circuit according to still another embodiment of the present invention.

FIG. 19 shows a schematic circuit diagram of a switched capacitor voltage converter circuit according to still another embodiment of the present invention. As shown in FIG. 19, the switched capacitor voltage converter circuit 170 of the present invention comprises: capacitors C1~C3, switches Q1~Q10, and inductors L1~L3. The switches Q1, Q2 and Q3 are connected in series to the corresponding capacitors C1, C2 and C3, respectively. Certainly, it should be understood that the implementation of the number of the capacitors of the switched capacitor voltage converter circuit as three in the above-mentioned preferred embodiment is only an illustrative example, but not for limiting the broadest scope of the present invention. In other embodiments, it is also practicable and within the scope of the present invention that the number of the capacitors of the switched capacitor voltage converter circuit can be any plural number other than three. Likely, the number of the inductors of the switched capacitor voltage converter circuit also can be any plural number other than three.

The switches Q1~Q10 can switch electrical connection relationships between the capacitors C1~C3 with the inductors L1~L3 according to corresponding operation signals. In the second process, the switches Q1~Q4 are ON, whereas, the switches Q5-Q10 are OFF, so that a series connection of the capacitors C1~C3 and the inductors L1~L3 is formed between the first voltage V1 and the second voltage V2, so as to form a second current path, and to thereby execute a charging process. In the first process, the inductors L1~L3 function as discharging inductors; the switches Q5-Q10 are ON, whereas, the switches Q1~Q4 are OFF. As a result, a series connection of the resonant capacitor C1 and the inductors L1 is formed between the second voltage V2 and the ground potential; a series connection of the resonant capacitor C2 and the inductors L2 is formed between the second voltage V2 and the ground potential; and a series connection of the resonant capacitor C3 and the inductors L3 is formed between the second voltage V2 and the ground potential, so that plural first current paths in parallel are formed, and to thereby execute a discharging process. It is noteworthy that, the above-mentioned first process and second process are performed at different periods in an alternating manner. That is, the above-mentioned first process and second process are not performed at the same time. In one embodiment, the first process and the second process are arranged in alternating and repetitive manner, wherein the first process and the second process are sequentially arranged as a combination, and the combination is repeated, so as to convert the first voltage V1 to the second voltage V2 or to convert the second voltage V2 to the first voltage V1. In this embodiment, the DC bias voltages of the capacitors C1, C2 and C3 all are the second voltage V2, so the capacitors C1, C2 and C3 of this embodiment will only need to withstand a relatively lower rated voltage. Hence, this embodiment can utilize capacitors having a smaller size.

The control circuit 1701 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C.

As shown in FIG. 19, in the unidirectional conduction process, when the switch operation signals S1~S10 control the switches (e.g., when the switch operation signals S1~S10 control switches Q1~Q10 to be non-conductive, respectively), one end of the inductor L2 and one end of the inductor L3 are conducted by the body diodes (as shown by the dashed line in FIG. 19) of at least one switch (such as the switches Q8 and Q2, and the switches Q9 and Q3) to a DC potential, so that the inductor currents ILo2 and ILo3 flowing toward the second voltage V2 are resonant currents having a third resonant frequency and having a fourth resonant frequency, respectively, wherein the above-mentioned third resonant frequency and fourth resonant frequency are both different from the first resonant frequency in the first process and the second resonant frequency in the second process. In the example of this embodiment, the inductor L2 is connected in series between the second voltage V2 and the ground potential through the body diodes of the switches Q8, Q2, Q3 and Q4; the inductor L3 is connected in series between the second voltage V2 and the ground potential through the body diodes of the switches Q9, Q3, and Q4. Thus, the inductor current IL2 and inductor current IL3 keep freewheeling according to the current directions shown by the dashed arrow in FIG. 19. In another embodiment, when the unidirectional conduction process forms a unidirectional conduction path to the first voltage V1, the unidirectional conduction process is performed in a way similar to that described with reference to FIG. 6, and please refer to the detailed description of FIG. 6.

In one embodiment, the above-mentioned first process has a first resonant frequency and the above-mentioned second process has a second resonant frequency. In one preferable embodiment, the first resonant frequency and the second resonant frequency are the same.

Figure 20:
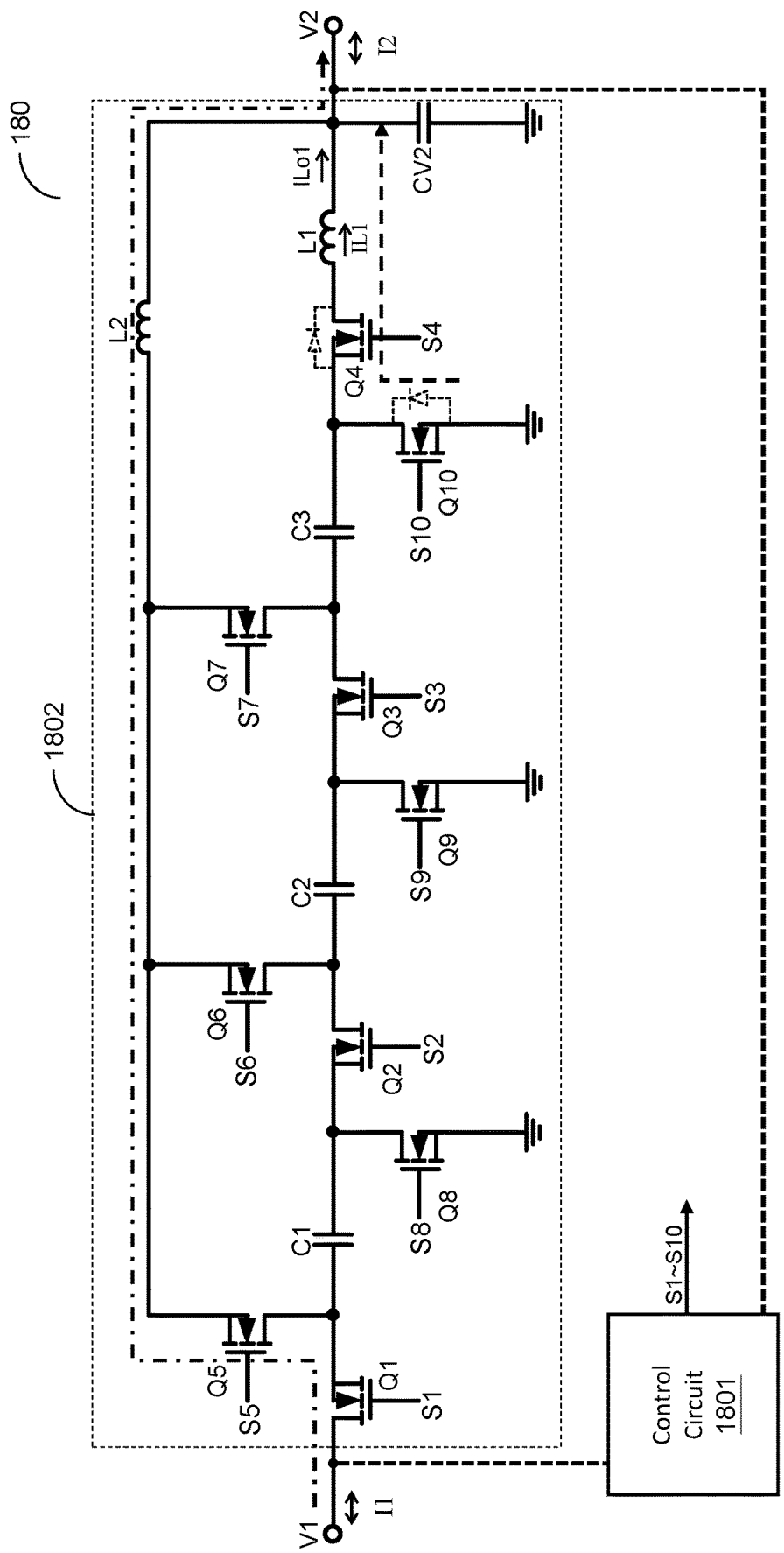
FIG. 20 shows a schematic circuit diagram of a switched capacitor voltage converter circuit according to still another embodiment of the present invention.

FIG. 20 shows a schematic circuit diagram of a switched capacitor voltage converter circuit according to still another embodiment of the present invention. This embodiment of FIG. 20 is different from the previous embodiment of FIG. 19 in that: this embodiment comprises plural resonant capacitors but they share one charging inductor and one discharging inductor. In this embodiment, there is only one charging inductor and only one discharging inductor regardless how many number the resonant capacitors is. This embodiment provides a benefit of reducing the number of the inductors. As shown in FIG. 20, the switched capacitor voltage converter circuit 180 of the present invention comprises: resonant capacitors C1~C3, switches Q1~Q10, and inductors L1~L2. The switches Q1, Q2 and Q3 are connected in series to the corresponding resonant capacitors C1, C2 and C3, respectively. The switch Q4 is connected in series to the inductor L1. Certainly, it should be understood that the implementation of the number of the capacitors of the switched capacitor voltage converter circuit as three in the above-mentioned preferred embodiment is only an illustrative example, but not for limiting the broadest scope of the present invention. In other embodiments, it is also practicable and within the scope of the present invention that the number of the capacitors of the switched capacitor voltage converter circuit can be any plural number other than three.

The switches Q1~Q10 can switch electrical connection relationships between the resonant capacitors C1~C3 with the inductor L1 and the inductor L2 according to corresponding operation signals. In the second process, the switches Q1~Q4 are ON, whereas, the switches Q5-Q10 are OFF, so that a series connection of the resonant capacitors C1~C3 which is further connected in series to the charging inductor L1 is formed between the first voltage V1 and the second voltage V2, so as to form a second current path for charging operation. In the first process, the switches Q5-Q10 are ON, whereas, the switches Q1~Q4 are OFF, so that a parallel connection of the capacitors C1, C2 and C3 is connected in series to the inductor L2, so as to form plural first current paths for discharging operation. It is noteworthy that, in one embodiment, the above-mentioned first process and second process are performed at different periods in an alternating manner, that is, the above-mentioned first process and second process are not performed at the same time, to convert the first voltage V1 to the second voltage V2 or to convert the second voltage V2 to the first voltage V1. In this embodiment, the DC bias voltages of the capacitors C1, C2 and C3 all are the second voltage V2. Thus, the capacitors C1, C2 and C3 of this embodiment will only need to withstand a relatively lower rated voltage. Hence, this embodiment can utilize capacitors having a smaller size.

The control circuit 1801 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 2C, and please refer to the detailed description of FIG. 2C.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

In one embodiment, the above-mentioned first process has a first resonant frequency and the above-mentioned second process has a second resonant frequency. In one preferable embodiment, the first resonant frequency and the second resonant frequency are the same. In another embodiment, the first resonant frequency and the second resonant frequency are different. In one embodiment, the inductance of the inductor L1 and the inductance of the inductor L2 are the same. In another embodiment, the inductance of the inductor L1 and the inductance of the inductor L2 are different.

Figure 21:
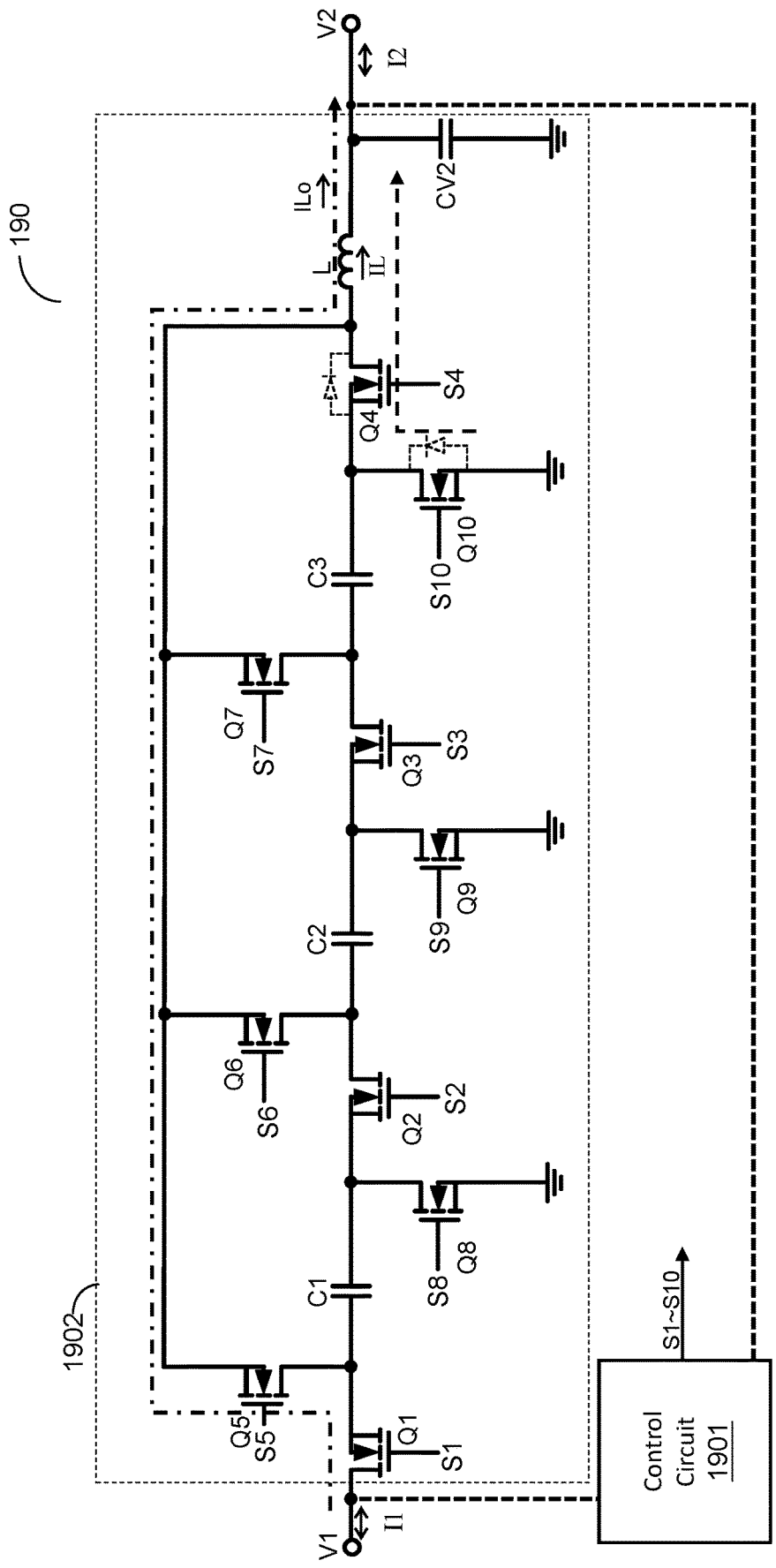
FIG. 21 shows a schematic circuit diagram of a switched capacitor voltage converter circuit according to still another embodiment of the present invention.

FIG. 21 shows a schematic circuit diagram of a switched capacitor voltage converter circuit according to still another embodiment of the present invention. In this embodiment, one same single inductor L serves as both the charging inductor and the discharging inductor; such implementation can reduce the required inductor number to minimum. As shown in FIG. 21, the switched capacitor voltage converter circuit 190 of the present invention comprises: resonant capacitors C1~C3, switches Q1~Q10, and one inductor L. The switches Q1, Q2 and Q3 are connected in series to the corresponding resonant capacitors C1, C2 and C3, respectively. The switch Q4 is connected in series to the inductor L. Certainly, it should be understood that the implementation of the number of the capacitors of the switched capacitor voltage converter circuit 170 as three in the above-mentioned preferred embodiment is only an illustrative example, but not for limiting the broadest scope of the present invention. In other embodiments, it is also practicable and within the scope of the present invention that the number of the capacitors of the switched capacitor voltage converter circuit 190 can be any multiple number other than three.

It is noteworthy that, in this embodiment, one same single inductor L serves as the charging inductor and the discharging inductor. In the first process, by switching the switches Q1~Q10, the resonant capacitors C1~C3 are connected in parallel and the parallel connection is connected to the same single inductor L. As one of average skill in the art readily understands by the description above, when the charging inductor and the discharging inductor are one same single inductor L, during each of the second (charging) process and the first (discharging) process, the inductor current IL flows only through this one same inductor L1 and the inductor current IL does not flow through any other inductor.

The switches Q1~Q10 can respectively switch electrical connection relationships between the corresponding resonant capacitors C1~C3 and the inductor L according to corresponding operation signals. In the second process, according to the switch operation signals S1~S4 and S5~S10, the switches Q1~Q4 are ON, whereas, the switches Q5-Q10 are OFF, so that a series connection of the resonant capacitors C1~C3 and the inductor L is formed between the first voltage V1 and the second voltage V2, which forms a second current path for charging operation. In the first process, according to the switch operation signals S1~S4 and S5~S10, the switches Q5-Q10 are ON, whereas, the switches Q1~Q4 are OFF, so that the resonant capacitors C1, C2 and C3 form a parallel connection, which is connected to the inductor L, to form plural second current paths for discharging operation. It is noteworthy that, in one embodiment, the above-mentioned first process and second process are arranged at different periods in a repeated, alternating manner, that is, the above-mentioned first process and second process are not performed at the same time, to convert the first voltage V1 to the second voltage V2 or to convert the second voltage V2 to the first voltage V1. In this embodiment, the DC bias voltages of the capacitors C1, C2 and C3 all are the second voltage V2. Thus, the capacitors C1, C2 and C3 of this embodiment will only need to withstand a relatively lower rated voltage. Hence, this embodiment can utilize capacitors having a smaller size.

The control circuit 1901 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 2C, and please refer to the detailed description of FIG. 2C.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 22:
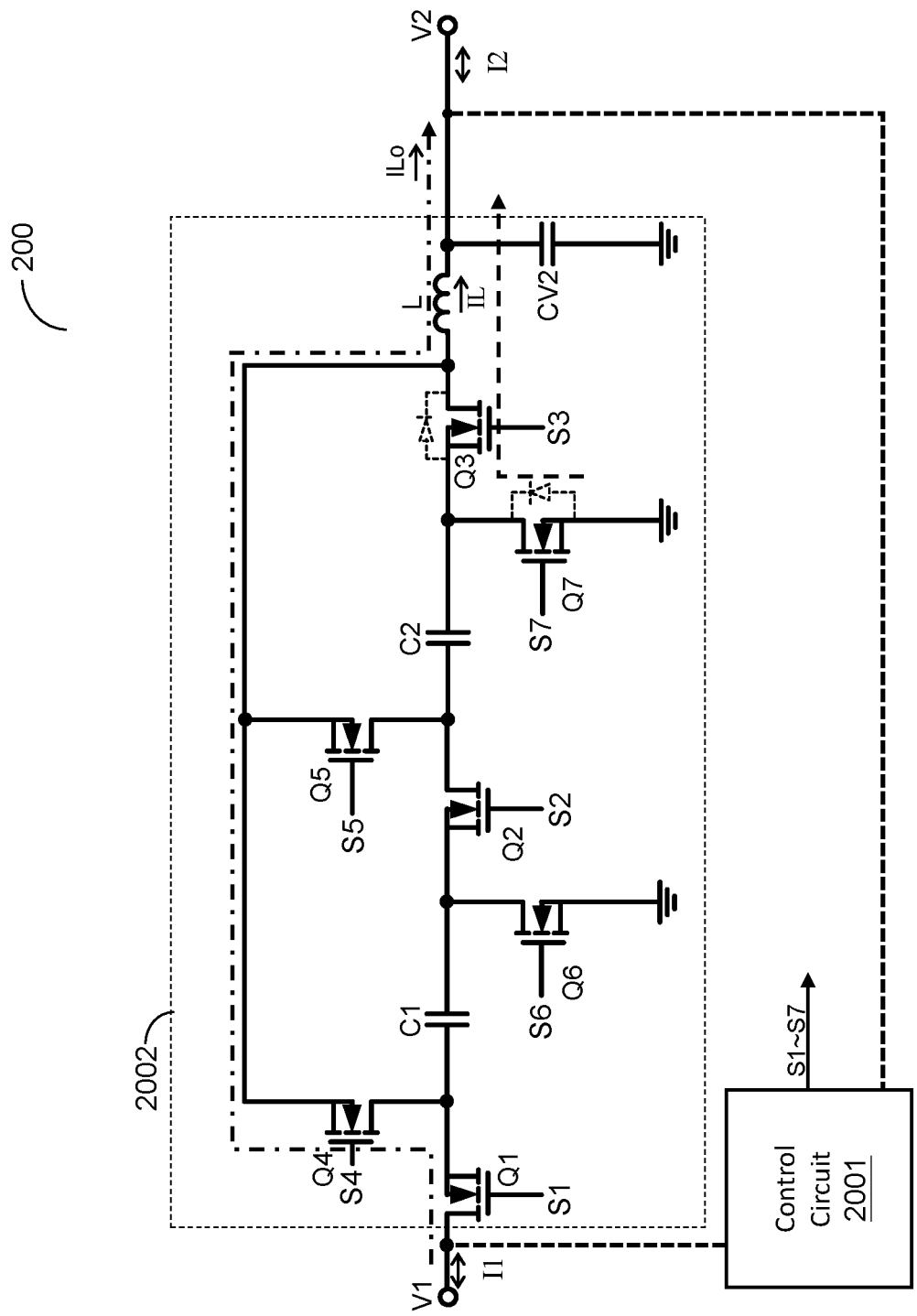
FIG. 22 shows a schematic circuit diagram of a switched capacitor voltage converter circuit according to still another embodiment of the present invention.

FIG. 22 shows a schematic circuit diagram of a switched capacitor voltage converter circuit according to still another embodiment of the present invention. As shown in FIG. 22, the switched capacitor voltage converter circuit 200 of the present invention includes resonant capacitors C1~C2, switches Q1~Q7, and an inductor L. The switches Q1~Q2 are connected in series with the corresponding resonant capacitors C1~C2, respectively, and the switch Q3 is connected in series with the inductor L.

The switches Q1~Q7 can switch the coupling relationships of the resonant capacitors C1~C2 with the inductor L according to corresponding operation signals. In the second process, according to the switch operation signals S1~S3 and S4~S7, the switches Q1~Q3 are turned ON and the switches Q4~Q7 are turned OFF, so that resonant capacitors C1~C2 are connected in series with each other, and the series connection of the resonant capacitors C1~C2 is further connected in series with the inductor L between the first voltage V1 and second voltage V2, to form a second current path for the charging operation. In the first process, according to the switch operation signals S1~S3 and S4~S7, the switches Q4~Q7 are turned ON and the switches Q1~Q3 are turned OFF, so that the resonant capacitors C1~C2 are connected in parallel with each other, and the parallel connection of the resonant capacitors C1~C2 is further connected in series with the inductor L between the second voltage V2 and ground potential, to form plural first current paths for the discharging operation. It should be noted that the above-mentioned first process and the above-mentioned second process are performed in a repeated, alternating manner, in different time periods rather than concurrently, to convert the first voltage V1 to second voltage V2 or to convert the second voltage V2 to first voltage V1. In this embodiment, the DC bias voltages of the capacitors C1 and C2 all are the second voltage V2, so the capacitors C1 and C2 of this embodiment will only need to withstand a relatively lower rated voltage. Hence, this embodiment can utilize capacitors having a smaller size.

The control circuit 2001 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 2C, and please refer to the detailed description of FIG. 2C.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 23:
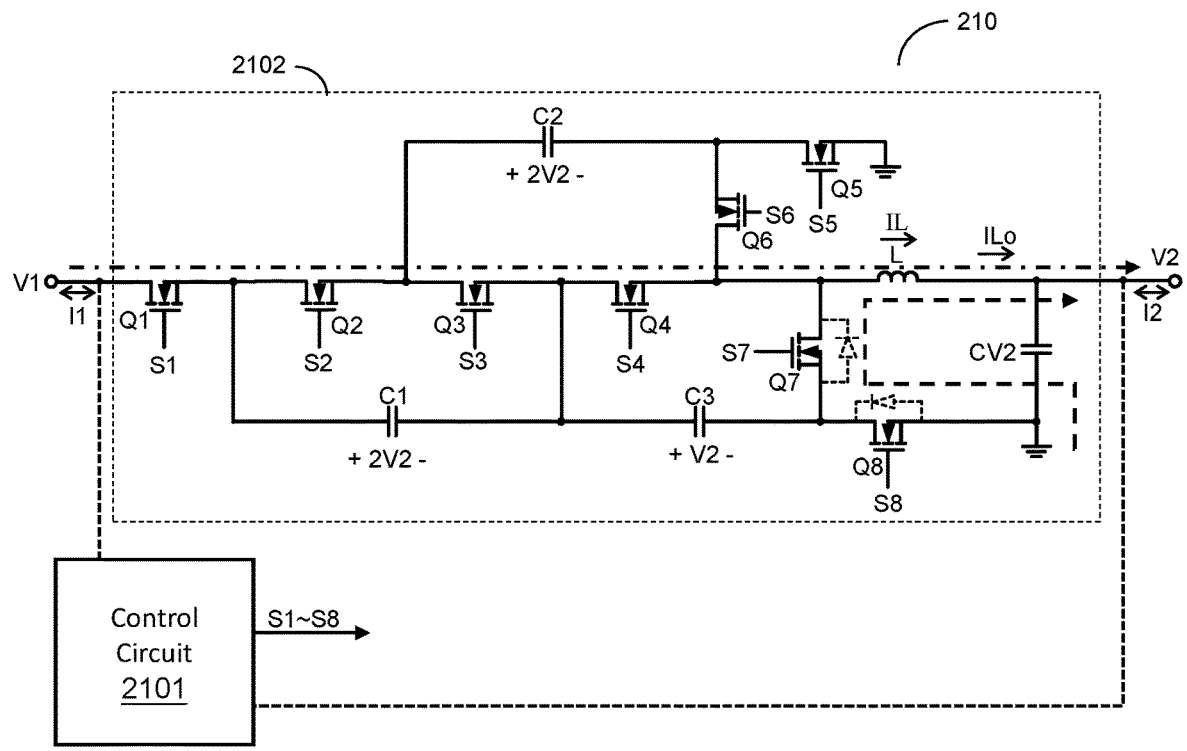
FIG. 23 shows a schematic circuit diagram of a switched capacitor voltage converter circuit according to still another embodiment of the present invention.

FIG. 23 shows a schematic circuit diagram of a switched capacitor voltage converter circuit according to still another embodiment of the present invention. As shown in FIG. 23, the switched capacitor voltage converter circuit 210 of the present invention includes: a resonant capacitor C3, non-resonant capacitors C1~C2, switches Q1~Q8, and an inductor L.

The switches Q1~Q8 can switch the coupling relationships of the resonant capacitor C3 and non-resonant capacitors C1~C2 with the inductor L according to corresponding operation signals. In the second process, according to the switch operation signals S1~S8, the switches Q1, Q3, Q5, and Q7 are turned ON, whereas, the switches Q2, Q4, Q6, and Q8 are turned OFF, whereby the non-resonant capacitor C1, resonant capacitor C3, and inductor L are connected in series between the first voltage V1 and second voltage V2, and one end of the non-resonant capacitor C2 is coupled between the non-resonant capacitor C1 and resonant capacitor C3, whereas, the other end of non-resonant capacitor C2 is coupled to the ground potential to, form a second current path for the charging operation. In the first process, according to the switch operation signals S1~S8, the switches Q2, Q4, Q6, and Q8 are turned ON, whereas, the switches Q1, Q3, Q5, and Q7 are turned OFF, whereby the resonant capacitor C3 and inductor L are connected in series between the second voltage V2 and ground potential to form a first current path for the discharging operation. It should be noted that the above-mentioned first process and the above-mentioned second process are performed in a repeated, alternating manner, in different time periods rather than concurrently, to convert the first voltage V1 to second voltage V2 or to convert the second voltage V2 to first voltage V1.

The control circuit 2101 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 2C, and please refer to the detailed description of FIG. 2C.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 24:
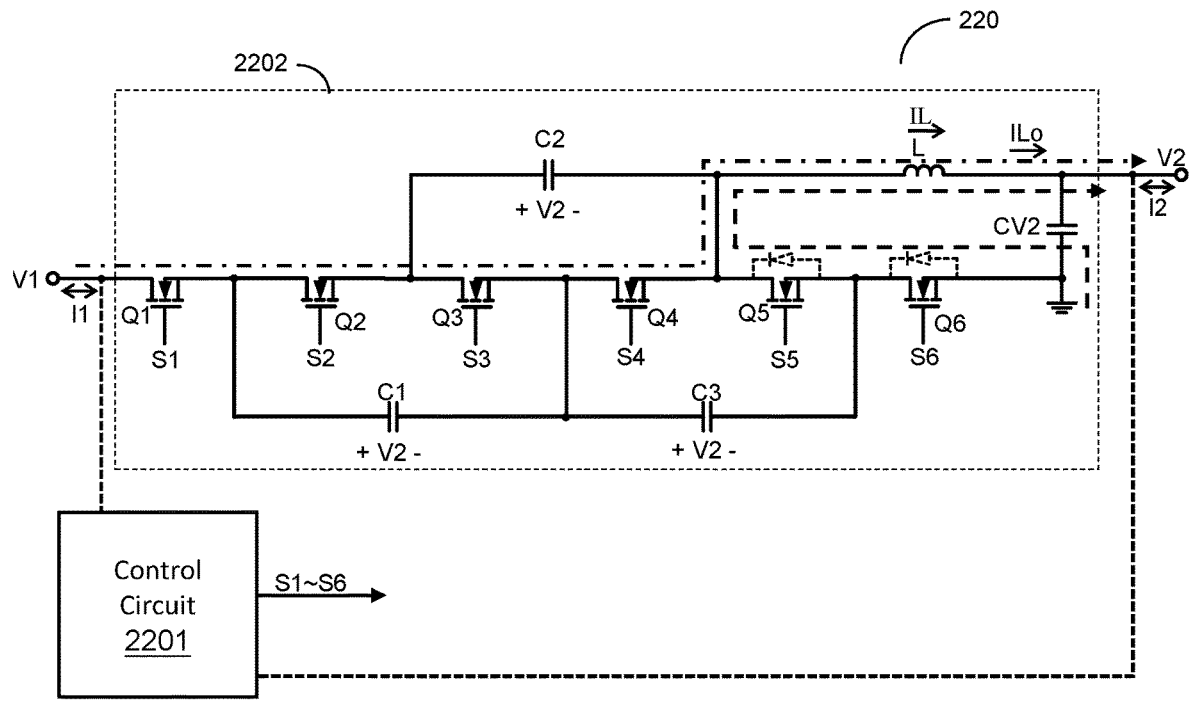
FIG. 24 shows a schematic circuit diagram of a switched capacitor voltage converter circuit according to still another embodiment of the present invention.

FIG. 24 shows a schematic circuit diagram of a switched capacitor voltage converter circuit according to still another embodiment of the present invention. As shown in FIG. 24, the switched capacitor voltage converter circuit 220 of the present invention includes: a resonant capacitor C3, non-resonant capacitors C1~C2, switches Q1~Q6, and an inductor L.

The switches Q1~Q6 can switch the coupling relationships of the resonant capacitor C3 and non-resonant capacitors C1~C2 with the inductor L according to corresponding operation signals. In the second process, according to the switch operation signals S1~S6, the switches Q1, Q3, and Q5 are turned ON, whereas, the switches Q2, Q4, and Q6 are turned OFF, whereby the non-resonant capacitor C2 and the resonant capacitor C3 are connected in parallel, and the parallel connection of the non-resonant capacitor C2 and the resonant capacitor C3 is connected in series with the non-resonant capacitor C1 and inductor L between the first voltage V1 and second voltage V2, to form a second current path for the charging operation. In the first process, according to the switch operation signals S1~S6, the switches Q2, Q4, and Q6 are turned ON, and the switches Q1, Q3, and Q5 are turned OFF, so that the resonant capacitor C3 and inductor L are connected in series between the second voltage V2 and ground potential, to form a first current path for the discharging operation. It should be noted that the above-mentioned first process and the above-mentioned second process are performed in a repeated, alternating manner, in different time periods rather than concurrently, to convert the first voltage V1 to second voltage V2 or to convert the second voltage V2 to first voltage V1.

The control circuit 2201 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 2C, and please refer to the detailed description of FIG. 2C.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 25:
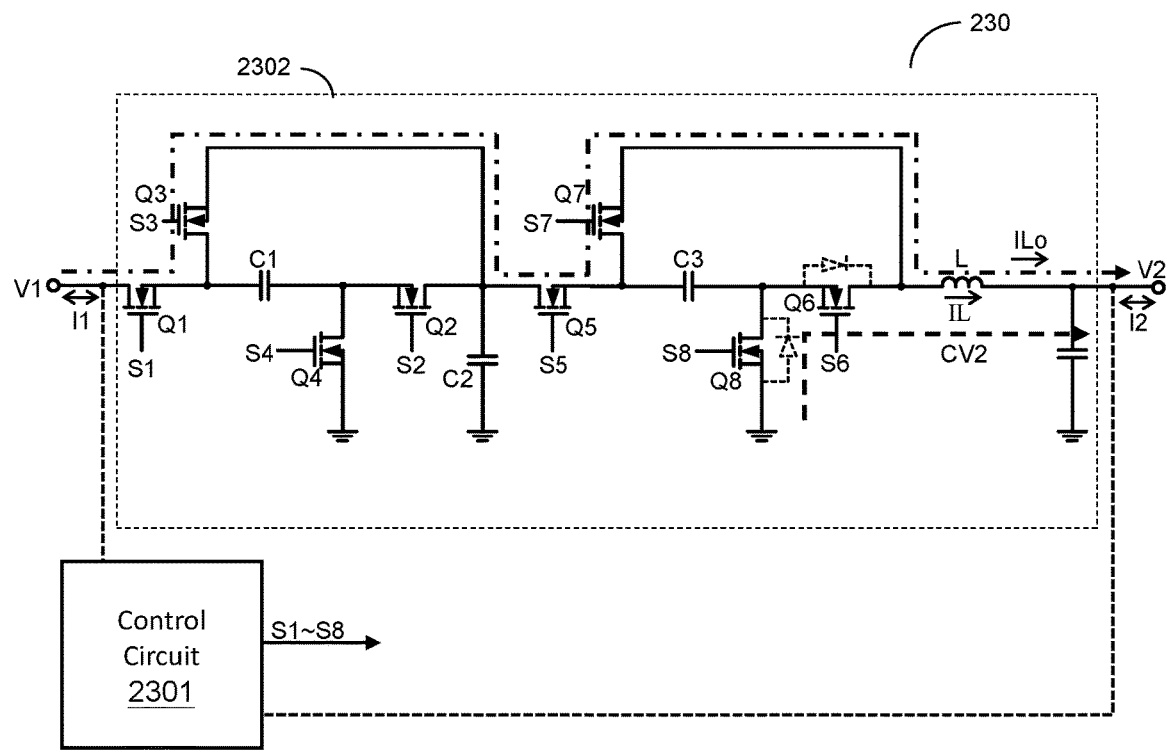
FIG. 25 shows a schematic circuit diagram of a switched capacitor voltage converter circuit according to still another embodiment of the present invention.

FIG. 25 shows a schematic circuit diagram of a switched capacitor voltage converter circuit according to still another embodiment of the present invention. As shown in FIG. 25, the switched capacitor voltage converter circuit 230 of the present invention includes: a resonant capacitor C3, non-resonant capacitors C1~C2, switches Q1~Q8, and an inductor L.

The switches Q1~Q8 can switch the coupling relationships of the corresponding resonant capacitor C3 and the non-resonant capacitors C1~C2 with inductor L according to corresponding operation signals. In the second process, according to the switch operation signals S1~S8, the switches Q1, Q2, Q5, and Q6 are turned ON, whereas, the switches Q3, Q4, Q7, and Q8 are turned OFF, whereby the non-resonant capacitor C1, resonant capacitor C3, and inductor L are connected in series between the first voltage V1 and second voltage V2, and one end of the non-resonant capacitor C2 is coupled between the non-resonant capacitor C1 and resonant capacitor C3, whereas the other end of the non-resonant capacitor C2 is coupled to the ground potential, to form a second current path for the charging operation. In the first process, according to the switch operation signals S1~S8, the switches Q3, Q4, Q7, and Q8 are turned ON, whereas, the switches Q1, Q2, Q5, and Q6 are turned OFF, whereby the resonant capacitor C3 and inductor L are connected in series between the second voltage V2 and ground potential, to form a second current path for the discharging operation. It should be noted that the above-mentioned first process and the above-mentioned second process are performed in a repeated, alternating manner, in different time periods rather than concurrently, to convert the first voltage V1 to second voltage V2 or to convert the second voltage V2 to first voltage V1.

The control circuit 2301 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 2C, and please refer to the detailed description of FIG. 2C.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

Figure 26:
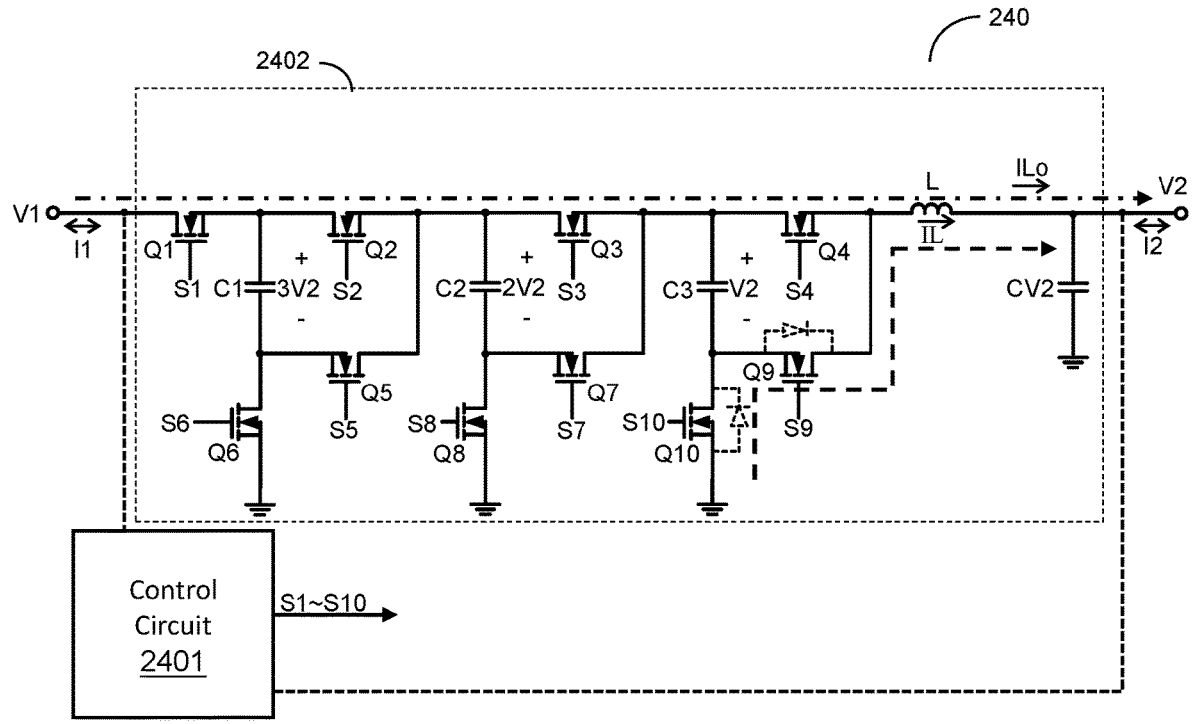
FIG. 26 shows a schematic circuit diagram of a switched capacitor voltage converter circuit according to still another embodiment of the present invention.

FIG. 26 shows a schematic circuit diagram of a switched capacitor voltage converter circuit according to still another embodiment of the present invention. As shown in FIG. 26, the switched capacitor voltage converter circuit 240 of the present invention includes resonant capacitors C1~C3, switches Q1~Q10, and an inductor L.

The switches Q1~Q10 can switch the coupling relationships of the resonant capacitor C1~C3 with the inductor L according to corresponding operation signals. In the second process, according to the switch operation signals S1~S10, the switches Q1, Q3, Q5, Q8, and Q9 are turned ON, whereas, the switches Q2, Q4, Q6, Q7, and Q10 are turned OFF, whereby the resonant capacitor C1, resonant capacitor C3 and inductor L are connected in series between the first voltage V1 and second voltage V2, and one end of the resonant capacitor C2 is coupled between the resonant capacitor C1 and resonant capacitor C3, whereas, the other end of the resonant capacitor C2 is coupled to the ground potential, to form a second current path for the charging operation. In the first process, according to the switch operation signals S1~S10, the switches Q2, Q4, Q6, Q7, and Q10 are turned ON, whereas, the switches Q1, Q3, Q5, Q8, and Q9 are turned OFF, whereby the resonant capacitor C1 and resonant capacitor C2 are connected in series, and the series connection of the resonant capacitor C1 and resonant capacitor C2 is connected in parallel with the resonant capacitor C3, and the parallel connection is further connected in series with the inductor L between the second voltage V2 and the ground potential, to form a first current path for discharging operation. It should be noted that the above-mentioned first process and the above-mentioned second process are performed in a repeated, alternating manner, in different time periods rather than concurrently, to convert the first voltage V1 to second voltage V2 or to convert the second voltage V2 to first voltage V1.

The control circuit 2401 of this embodiment can be implemented by combining the control circuit structure of FIG. 2B with the control circuit structure of FIG. 3A, FIG. 3C~3F, FIG. 4A or FIG. 4C; please refer to the detailed descriptions of FIG. 2B, FIG. 3A, FIG. 3C~3F, FIG. 4A and FIG. 4C. The implementation of the unidirectional conduction process is similar to that described with reference to FIG. 2C, and please refer to the detailed description of FIG. 2C.

In one embodiment, when the unidirectional conduction process forms a unidirectional conduction path to the first voltage V1, the switching period Tsw can include a combination of the unidirectional conduction process, the second process and the first process in the listing order, or, the switching period Tsw can include a combination of the unidirectional conduction process, the first process and the second process in the listing order. In another embodiment, when the unidirectional conduction process forms a unidirectional conduction path to the first voltage V1, the switching period Tsw can include a combination of the unidirectional conduction process, the second process, the unidirectional conduction process and the first process in the listing order, or, the switching period Tsw can include a combination of the unidirectional conduction process, the first process, the unidirectional conduction process and the second process in the listing order. In yet another embodiment, when the unidirectional conduction process executes unidirectional conduction to the DC potential (e.g., ground potential), the switching period Tsw can include a combination of the second process, the unidirectional conduction process and the first process in the listing order, or, the switching period Tsw can include a combination of the first process, the unidirectional conduction process and the second process in the listing order. In still another embodiment, when the unidirectional conduction process forms a unidirectional conduction path to the DC potential (e.g., ground potential), the switching period Tsw can include a combination of the first process, the unidirectional conduction process, the second process and the unidirectional conduction process in the listing order, or, the switching period Tsw can include a combination of the second process, the unidirectional conduction process, the first process and the unidirectional conduction process in the listing order.

The present invention has provided switched capacitor voltage converter circuit as described above. Advantages of the present invention include: that, it is not required for the present invention to balance the voltage of a resonant capacitor to ½-fold of an input voltage; and that, the present invention can achieve zero current switching and zero voltage switching to reduce switching loss; and that, the present invention can adopt an inductor having a relatively smaller size, to reduce component size and cost; and that, switches, resonant capacitors and inductors of the present invention are subject to a relatively lower voltage stress; and that, as compared to a resonant switched capacitor converter circuit having a constant voltage conversion ratio, the present invention can adjust the output voltage and has a relatively higher efficiency.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switched capacitor voltage converter circuit, which is configured to convert a first voltage to a second voltage or convert the second voltage to the first voltage, the switched capacitor voltage converter circuit comprising:
a switched capacitor converter coupled between the first voltage and the second voltage; and
a control circuit, which is configured to generate a pulse width modulation (PWM) signal according to the first voltage or the second voltage, and to generate a control signal according to the PWM signal and a zero current detection signal, so as to control the switched capacitor converter, thus converting the first voltage to the second voltage or converting the second voltage to the first voltage;
wherein the switched capacitor converter includes:
at least one resonant capacitor;
a plurality of switches coupled to the at least one resonant capacitor; and
at least one inductor;
wherein when the switched capacitor voltage converter circuit converts the first voltage to the second voltage, the control signal includes: a unidirectional conduction operation signal, a first operation signal and a second operation signal, which correspond to a unidirectional conduction process, a first process and a second process, respectively, wherein the unidirectional conduction operation signal, the first operation signal and the second operation signal are configured to operate the plurality of switches in the unidirectional conduction process, in the first process and in the second process, respectively, so as to switch electrical connection relationships of the at least one inductor;
wherein when the switched capacitor voltage converter circuit converts the first voltage to the second voltage, the control circuit is configured to generate the PWM signal according to the second voltage, and wherein the switched capacitor voltage converter circuit performs a combination of processes including the unidirectional conduction process, the first process and the second process as following:
in the unidirectional conduction process, the unidirectional conduction operation signal being configured to control the plurality of switches, so as to form a unidirectional conduction path between a first DC potential and the second voltage, so that an inductor current flowing through the at least one inductor flows toward the second voltage via the unidirectional conduction path;
in the first process, the first operation signal being configured to control the plurality of switches, so that the at least one resonant capacitor and the at least one inductor are connected in series between the second voltage and a second DC potential, so as to form a first current path, so that the inductor current flowing through the at least one inductor and flowing toward the second voltage is a first resonant current having a first resonant frequency;
in the second process, the second operation signal being configured to control the plurality of switches, so that the at least one resonant capacitor and the at least one inductor are connected in series between the first voltage and the second voltage, so as to form a second current path, so that the inductor current flowing through the at least one inductor and flowing toward the second voltage is a second resonant current having a second resonant frequency;
wherein the unidirectional conduction operation signal, the first operation signal and the second operation signal have ON periods which do not overlap one another, so that the unidirectional conduction process, the first process and the second process do not overlap one another;
wherein the unidirectional conduction process, the first process and the second process are performed sequentially and repetitively, so that the at least one inductor executes an inductive power conversion through the unidirectional conduction process, the first process and the second process, thereby converting the first voltage to the second voltage;
wherein the control circuit is further configured to generate the zero current detection signal according to a time point at which the inductor current reaches zero;
wherein the control circuit includes:
a PWM circuit, wherein the PWM circuit is configured to generate the PWM signal according to the second voltage when the first voltage is converted to the second voltage, and the PWM circuit is configured to generate the PWM signal according to the first voltage when the second voltage is converted to the first voltage;
a zero current detection circuit, which is configured to generate the zero current detection signal at the time point at which the inductor current reaches zero; and
a control signal generation circuit, which is configured to generate the control signal according to the PWM signal and the zero current detection signal, wherein the control signal generation circuit is configured to generate a plurality of switch operation signals corresponding to the plurality of switches according to the control signal in the unidirectional conduction process, the first process and the second process;
wherein the PWM circuit includes:
a lock-up circuit, which is configured to lock-up the second voltage at a reference voltage, so as to generate a voltage lock-up signal;
a ramp circuit, which is configured to generate a ramp signal;
a comparison circuit, which is configured to compare the voltage lock-up signal with the ramp signal, to generate the PWM signal; and
a reset circuit, which is configured to reset the ramp signal according to the control signal or a clock signal;
wherein the control signal adjusts the ON period of the first process or the second process, to achieve zero voltage switching or zero current switching of soft switching; and
wherein the zero current detection circuit includes:
a current sensing circuit, which is configured to sense a current flowing through the at least one inductor, to generate at least one corresponding current sensing signal; and
a comparator coupled to the current sensing circuit, wherein the comparator is configured to compare the at least one corresponding current sensing signal with a reference signal, so as to generate the zero current detection signal, wherein the zero current detection signal indicates the time point at which the inductor current reaches zero.

2. The switched capacitor voltage converter circuit of claim 1, wherein the unidirectional conduction process, the first process and the second process constitute a switching period, and in the switching period, the unidirectional conduction process, the first process and the second process are performed in any order, wherein an ending time point of an earliest process in the switching period is determined by the PWM signal, and ending time points of the processes other than the earliest process in the switching period are determined by the zero current detection signal.

3. The switched capacitor voltage converter circuit of claim 2, wherein the switching period is a constant period.

4. The switched capacitor voltage converter circuit of claim 3, wherein after the unidirectional conduction process, the first process and the second process in the switching period have all ended, the plurality of switches are kept OFF for a zero current period until the constant period ends.

5. The switched capacitor voltage converter circuit of claim 1, wherein in the unidirectional conduction process, the inductor current is one of the following:
the inductor current is a third resonant current having a third resonant frequency; or
the inductor current is a non-resonant current;
wherein when the inductor current is the non-resonant current, the inductor current is a linear ramp current which gradually decreases or another linear ramp current which gradually increases.

6. The switched capacitor voltage converter circuit of claim 5, wherein in the unidirectional conduction process, in a case where the inductor current is the non-resonant current and the inductor current is the linear ramp current which gradually decreases, the unidirectional conduction path includes a body diode of at least one of the plurality of switches which is in an OFF state and the inductor current flows through the body diode.

7. The switched capacitor voltage converter circuit of claim 5, wherein in the unidirectional conduction process, the unidirectional conduction path includes at least one of the plurality of switches which is in an ON state and the inductor current flows through the at least one of the plurality of switches.

8. The switched capacitor voltage converter circuit of claim 1, wherein the first DC potential is the first voltage or a ground potential, whereas, the second DC potential is the first voltage or the ground potential.

9. The switched capacitor voltage converter circuit of claim 1, further comprising:
a non-resonant capacitor coupled to the at least one resonant capacitor, wherein a voltage across the non-resonant capacitor is kept as a constant DC voltage in the first process and in the second process.

10. The switched capacitor voltage converter circuit of claim 1, wherein when the switched capacitor voltage converter circuit converts the second voltage to the first voltage, the control circuit is configured to generate the PWM signal according to the first voltage, to generate the control signal, thus converting the second voltage to the first voltage;
wherein when the switched capacitor voltage converter circuit converts the second voltage to the first voltage, the control signal includes: a reverse-unidirectional conduction operation signal, a third operation signal and a fourth operation signal, which correspond to a reverse-unidirectional conduction process, a third process and a fourth process, respectively, wherein the reverse-unidirectional conduction operation signal, the third operation signal and the fourth operation signal are configured to operate the plurality of switches in the reverse-unidirectional conduction process, in the third process and in the fourth process, respectively, so as to switch electrical connection relationships of the at least one inductor;
wherein when the switched capacitor voltage converter circuit converts the second voltage to the first voltage, the switched capacitor voltage converter circuit performs a second combination of processes including the reverse-unidirectional conduction process, the third process and the fourth process as following:
in the reverse-unidirectional conduction process, the reverse-unidirectional conduction operation signal being configured to control the plurality of switches, so as to form a reverse-unidirectional conduction path between a third DC potential and the first voltage, so that a second inductor current flowing through the at least one inductor flows toward the first voltage via the reverse-unidirectional conduction path;
in the third process, the third operation signal being configured to control the plurality of switches, so that the at least one resonant capacitor and the at least one inductor are connected in series between the first voltage and a fourth DC potential, so as to form a third current path, so that the second inductor current flowing through the at least one inductor and flowing toward the first voltage is a fourth resonant current having a fourth resonant frequency;
in the fourth process, the fourth operation signal being configured to control the plurality of switches, so that the at least one resonant capacitor and the at least one inductor are connected in series between the first voltage and the second voltage, so as to form a fourth current path, so that the second inductor current flowing through the at least one inductor and flowing toward the first voltage is a fifth resonant current having a fifth resonant frequency;
wherein the reverse-unidirectional conduction operation signal, the third operation signal and the fourth operation signal have respective ON periods which do not overlap one another, so that the reverse-unidirectional conduction process, the third process and the fourth process do not overlap one another; and
wherein the unidirectional conduction process, the first process and the second process are performed sequentially and repetitively, so that the at least one inductor executes the inductive power conversion through the unidirectional conduction process, the first process and the second process, thereby converting the second voltage to the first voltage.

11. The switched capacitor voltage converter circuit of claim 10, wherein the third DC potential is the second voltage or a ground potential, whereas, the fourth DC potential is the second voltage or the ground potential.

12. The switched capacitor voltage converter circuit of claim 1, wherein the switched capacitor converter includes: a distributed switched capacitor converter, a series-parallel switched capacitor converter, a Dickson switched capacitor converter, a ladder switched capacitor converter, a doubler switched capacitor converter, a Fibonacci switched capacitor converter, a pipelined switched capacitor converter, or a switched tank converter.

13. The switched capacitor voltage converter circuit of claim 1, wherein the switched capacitor converter includes: a 2-to-1 series-parallel switched capacitor converter, a 3-to-1 series-parallel switched capacitor converter or a 4-to-1 series-parallel switched capacitor converter.

14. The switched capacitor voltage converter circuit of claim 1, wherein the combination of processes includes: the unidirectional conduction process and another unidirectional conduction process, the first process and the second process, wherein the unidirectional and the another unidirectional conduction processes, the first process and the second process constitute a switching period, wherein in the switching period, the unidirectional and the another unidirectional conduction processes, the first process and the second process are performed in any order, wherein an ending time point of an earliest process in the switching period is determined by the PWM signal, and ending time points of the processes other than the earliest process in the switching period are determined by the zero current detection signal.

15. A switched capacitor converter control method, configured to convert a first voltage to a second voltage or convert the second voltage to the first voltage, the switched capacitor converter control method comprising:

generating a pulse width modulation (PWM) signal according to the first voltage or the second voltage;

generating a zero current detection signal according to a time point at which an inductor current reaches zero; and generating a control signal according to the PWM signal and the zero current detection signal, so as to control a switched capacitor converter, thus converting the first voltage to the second voltage or converting the second voltage to the first voltage;

generating a plurality of switch operation signals corresponding to a plurality of switches according to the control signal in a unidirectional conduction process, a first process and a second process;

wherein when the first voltage is converted to the second voltage, the PWM signal is generated according to the second voltage and the control signal includes: a unidirectional conduction operation signal, a first operation signal and a second operation signal, which correspond to the unidirectional conduction process, the first process and the second process, respectively, wherein the unidirectional conduction operation signal, the first operation signal and the second operation signal are configured to operate the plurality of switches in the unidirectional conduction process, in the first process and in the second process, respectively, so as to switch electrical connection relationships of at least one inductor;

wherein when the first voltage is converted to the second voltage, a combination of processes including the unidirectional conduction process, the first process and the second process are performed as following:

in the unidirectional conduction process, the unidirectional conduction operation signal being configured to control the plurality of switches, so as to form a unidirectional conduction path between a first DC potential and the second voltage, so that an inductor current flowing through the at least one inductor flows toward the second voltage via the unidirectional conduction path;

in the first process, the first operation signal being configured to control the plurality of switches, so that at least one resonant capacitor and the at least one inductor are connected in series between the second voltage and a second DC potential, so as to form a first current path, so that the inductor current flowing through the at least one inductor and flowing toward the second voltage is a first resonant current having a first resonant frequency;

in the second process, the second operation signal being configured to control the plurality of switches, so that the at least one resonant capacitor and the at least one inductor are connected in series between the first voltage and the second voltage, so as to form a second current path, so that the inductor current flowing through the at least one inductor and flowing toward the second voltage is a second resonant current having a second resonant frequency;

wherein the unidirectional conduction operation signal, the first operation signal and the second operation signal have ON periods which do not overlap with one another, so that the unidirectional conduction process, the first process and the second process do not overlap with one another;

wherein the unidirectional conduction process, the first process and the second process are performed sequentially and repetitively, so that the at least one inductor executes an inductive power conversion through the unidirectional conduction process, the first process and the second process, thereby converting the first voltage to the second voltage;

wherein the step of generating the pulse width modulation (PWM) signal according to the first voltage or the second voltage includes:

generating the PWM signal according to the second voltage when the first voltage is converted to the second voltage, and generating the PWM signal according to the first voltage when the second voltage is converted to the first voltage;

wherein the step of generating the PWM signal according to the second voltage when the first voltage is converted to the second voltage, and generating the PWM signal according to the first voltage when the second voltage is converted to the first voltage includes:

locking-up the second voltage at a reference voltage, so as to generate a voltage lock-up signal;

generating a ramp signal;

comparing the voltage lock-up signal with the ramp signal, to generate the PWM signal; and resetting the ramp signal according to the control signal or a clock signal;

wherein the control signal adjusts the ON period of the first process or the second process, to achieve zero voltage switching or zero current switching of soft switching; and wherein the step of generating the zero current detection signal according to the time point at which the inductor current reaches zero includes:

sensing a current flowing through the at least one inductor, to generate at least one corresponding current sensing signal; and comparing the at least one corresponding current sensing signal with a reference signal, so as to generate the zero current detection signal, wherein the zero current detection signal indicates the time point at which the inductor current reaches zero.

16. The switched capacitor converter control method of claim 15, wherein when the second voltage is converted to the first voltage, the PWM signal is generated according to the first voltage, and the control signal includes: a reverse-unidirectional conduction operation signal, a third operation signal and a fourth operation signal, which correspond to a reverse-unidirectional conduction process, a third process and a fourth process, respectively, wherein the reverse-unidirectional conduction operation signal, the third operation signal and the fourth operation signal are configured to operate the plurality of switches in the reverse-unidirectional conduction process, in the third process and in the fourth process, respectively, so as to switch electrical connection relationships of the at least one inductor;

wherein when the second voltage is converted to the first voltage, a second combination of processes including the reverse-unidirectional conduction process, the third process and the fourth process are performed as following:
in the reverse-unidirectional conduction process, the reverse-unidirectional conduction operation signal being configured to control the plurality of switches, so as to form a reverse-unidirectional conduction path between a third DC potential and the first voltage, so that a second inductor current flowing through the at least one inductor flows toward the first voltage via the reverse-unidirectional conduction path;
in the third process, the third operation signal being configured to control the plurality of switches, so that the at least one resonant capacitor and the at least one inductor are connected in series between the first voltage and a fourth DC potential, so as to form a third current path, so that the second inductor current flowing through the at least one inductor and flowing toward the first voltage is a fourth resonant current having a fourth resonant frequency;
in the fourth process, the fourth operation signal being configured to control the plurality of switches are controlled by the fourth operation signal, so that the at least one resonant capacitor and the at least one inductor are connected in series between the first voltage and the second voltage, so as to form a fourth current path, so that the second inductor current flowing through the at least one inductor and flowing toward the first voltage is a fifth resonant current having a fifth resonant frequency;
wherein the reverse-unidirectional conduction operation signal, the third operation signal and the fourth operation signal have respective ON periods which do not overlap one another, so that the reverse-unidirectional conduction process, the third process and the fourth process do not overlap one another; and
wherein the unidirectional conduction process, the first process and the second process are performed sequentially and repetitively, so that the at least one inductor executes the inductive power conversion through the unidirectional conduction process, the first process and the second process, thereby converting the second voltage to the first voltage.

17. The switched capacitor converter control method of claim 16, wherein the reverse-unidirectional conduction process, the third process and the fourth process constitute a switching period, wherein in the switching period, the reverse-unidirectional conduction process, the third process and the fourth process are performed in any order, wherein an ending time point of an earliest process in the switching period is determined by the PWM signal, and ending time points of the processes other than the earliest process in the switching period are determined by the zero current detection signal.

18. The switched capacitor converter control method of claim 17, wherein the switching period is a constant period, wherein after the reverse-unidirectional conduction process, the third process and the fourth process in the switching period have all ended, the plurality of switches are kept OFF for a zero current period until the constant period ends.

19. The switched capacitor converter control method of claim 16, wherein in the reverse-unidirectional conduction process, the second inductor current is one of the following:
the second inductor current is a sixth resonant current having a sixth resonant frequency; or
the second inductor current is a non-resonant current;
wherein when the second inductor current is the non-resonant current, the second inductor current is a linear ramp current which gradually decreases or another linear ramp current which gradually increases.

20. The switched capacitor converter control method of claim 16, wherein the third DC potential is the second voltage or a ground potential, whereas, the fourth DC potential is the second voltage or the ground potential.

21. The switched capacitor converter control method of claim 15, wherein the unidirectional conduction process, the first process and the second process constitute a switching period, and in the switching period, the unidirectional conduction process, the first process and the second process are performed in any order, wherein an ending time point of an earliest process in the switching period is determined by the PWM signal, and ending time points of the processes other than the earliest process in the switching period are determined by the zero current detection signal.

22. The switched capacitor converter control method of claim 21, wherein the switching period is a constant period, wherein after the unidirectional conduction process, the first process and the second process in the switching period have all ended, the plurality of switches are kept OFF for a zero current period until the constant period ends.

23. The switched capacitor converter control method of claim 15, wherein in the unidirectional conduction process, the inductor current is one of the following:
the inductor current is a third resonant current having a third resonant frequency; or
the inductor current is a non-resonant current;
wherein when the inductor current is the non-resonant current, the inductor current is a linear ramp current which gradually decreases or another linear ramp current which gradually increases.

24. The switched capacitor converter control method of claim 15, wherein the first DC potential is the first voltage or a ground potential, whereas, the second DC potential is the first voltage or the ground potential.

25. The switched capacitor converter control method of claim 15, wherein the combination of processes includes:
the unidirectional conduction process and another unidirectional conduction process, the first process and the second process, wherein the unidirectional and the another unidirectional conduction processes, the first process and the second process constitute a switching period, wherein in the switching period, the unidirectional and the another unidirectional conduction processes, the first process and the second process are performed in any order, wherein an ending time point of an earliest process in the switching period is determined by the PWM signal, and ending time points of the processes other than the earliest process in the switching period are determined by the zero current detection signal.

* * * * *